United States Patent
Qiao et al.

(10) Patent No.: US 12,095,576 B2
(45) Date of Patent: *Sep. 17, 2024

(54) ETHERNET TYPE PACKET DATA UNIT SESSION COMMUNICATIONS

(71) Applicant: Comcast Cable Communications, LLC, Philadelphia, PA (US)

(72) Inventors: Weihua Qiao, Herndon, VA (US); Esmael Hejazi Dinan, McLean, VA (US); Kyungmin Park, Herndon, VA (US); Peyman Talebi Fard, Sterling, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 250 days.

This patent is subject to a terminal disclaimer.

(21) Appl. No.: 17/161,215

(22) Filed: Jan. 28, 2021

(65) Prior Publication Data
US 2021/0226807 A1 Jul. 22, 2021

Related U.S. Application Data

(63) Continuation of application No. 16/155,597, filed on Oct. 9, 2018, now Pat. No. 10,951,427, which is a
(Continued)

(51) Int. Cl.
*H04L 12/14* (2024.01)
*H04L 9/40* (2022.01)
(Continued)

(52) U.S. Cl.
CPC ...... *H04L 12/1407* (2013.01); *H04L 12/1435* (2013.01); *H04L 12/1492* (2013.01);
(Continued)

(58) Field of Classification Search
CPC ....... H04W 80/10; H04W 4/08; H04W 12/06; H04L 12/1407; H04L 67/14; H04L 63/0263; H04L 67/143
See application file for complete search history.

(56) References Cited

U.S. PATENT DOCUMENTS 10,251,147 B2 4/2019 Park et al.
10,264,506 B2 4/2019 Faccin et al.
(Continued)

FOREIGN PATENT DOCUMENTS

CN 101414940 B 12/2011
EP 3094155 A1 11/2016
(Continued)

OTHER PUBLICATIONS

R2-1710864 3GPP TSG RAN WG2 Meeting #99bis, Prague, Czech Republic, Oct. 9-13, 2017, Source: Mediatek Inc., Title: Basic Framework for Bandwidth Part Operation.
(Continued)

*Primary Examiner* — Dao Q Ho
(74) *Attorney, Agent, or Firm* — Banner & Witcoff, Ltd.

(57) ABSTRACT

Systems, apparatuses, and methods are described for wireless communications. A session management function may provide to a user plane function one or more messages comprising an Ethernet packet filter set and/or information for at least one policy rule. The user plane function may apply the at least one policy rule to a data flow to provide an Ethernet packet data unit session for a wireless device.

30 Claims, 36 Drawing Sheets

Related U.S. Application Data continuation of application No. 16/155,378, filed on Oct. 9, 2018, now Pat. No. 10,938,583.

(60) Provisional application No. 62/569,935, filed on Oct. 9, 2017, provisional application No. 62/569,927, filed on Oct. 9, 2017, provisional application No. 62/569,910, filed on Oct. 9, 2017.

(51) Int. Cl.
| | |
|---|---|
| *H04L 41/0893* | (2022.01) |
| *H04L 41/50* | (2022.01) |
| *H04L 47/20* | (2022.01) |
| *H04L 47/24* | (2022.01) |
| *H04M 15/00* | (2006.01) |
| *H04W 4/24* | (2018.01) |
| *H04L 43/028* | (2022.01) |
| *H04W 76/12* | (2018.01) |

(52) U.S. Cl.
CPC .......... *H04L 41/0893* (2013.01); *H04L 41/50* (2013.01); *H04L 47/20* (2013.01); *H04L 47/24* (2013.01); *H04L 63/0245* (2013.01); *H04L 63/0254* (2013.01); *H04L 63/20* (2013.01); *H04M 15/00* (2013.01); *H04M 15/66* (2013.01); *H04M 15/8016* (2013.01); *H04M 15/8228* (2013.01); *H04W 4/24* (2013.01); *H04L 43/028* (2013.01); *H04W 76/12* (2018.02)

(56) References Cited

U.S. PATENT DOCUMENTS

| | | | |
|---|---|---|---|
| 10,951,427 | B2 | 3/2021 | Qiao et al. |
| 2013/0139221 | A1 | 5/2013 | Gundavelli et al. |
| 2014/0204927 | A1 | 7/2014 | Horn et al. |
| 2014/0219267 | A1 | 8/2014 | Eyuboglu et al. |
| 2015/0063331 | A1 | 3/2015 | Scahill et al. |
| 2016/0345170 | A1 | 11/2016 | Mann |
| 2016/0345178 | A1 | 11/2016 | Bronowich |
| 2017/0289019 | A1 | 10/2017 | Faccin et al. |
| 2017/0303189 | A1 | 10/2017 | Hampel et al. |
| 2018/0192390 | A1* | 7/2018 | Li ................... H04W 12/06 |
| 2018/0270782 | A1 | 9/2018 | Park et al. |
| 2018/0270888 | A1 | 9/2018 | Faccin |
| 2018/0332523 | A1 | 11/2018 | Faccin et al. |
| 2019/0116520 | A1 | 4/2019 | Chaponniere et al. |
| 2019/0150219 | A1 | 5/2019 | Wang et al. |
| 2019/0166647 | A1 | 5/2019 | Velev et al. |
| 2019/0182895 | A1 | 6/2019 | Di Girolamo et al. |
| 2019/0200264 | A1 | 6/2019 | Kim et al. |
| 2019/0261159 | A1 | 8/2019 | Wang et al. |
| 2019/0274178 | A1 | 9/2019 | Salkintzis et al. |
| 2019/0306758 | A1 | 10/2019 | Ma et al. |
| 2019/0313473 | A1 | 10/2019 | Kim et al. |
| 2019/0335366 | A1 | 10/2019 | Jin et al. |
| 2019/0364496 | A1 | 11/2019 | Jin |
| 2019/0364541 | A1* | 11/2019 | Ryu ................... H04W 80/10 |
| 2019/0380104 | A1 | 12/2019 | Vrzic et al. |
| 2019/0387428 | A1* | 12/2019 | Ahmad ................ H04W 28/12 |
| 2020/0053131 | A1* | 2/2020 | Li ..................... H04L 61/5007 |
| 2020/0084657 | A1* | 3/2020 | Lee ........................ H04W 8/04 |
| 2021/0075865 | A1 | 3/2021 | Zhu et al. |

FOREIGN PATENT DOCUMENTS

| | | |
|---|---|---|
| EP | 3337284 A1 | 6/2018 |
| EP | 3425993 A1 | 1/2019 |
| WO | 2009052749 A1 | 4/2009 |
| WO | 2014011008 A1 | 1/2014 |
| WO | 2014094287 A1 | 6/2014 |
| WO | 2016091298 A1 | 6/2016 |
| WO | 2017030420 A1 | 2/2017 |
| WO | 2017171514 A1 | 10/2017 |
| WO | 2018006017 A1 | 1/2018 |
| WO | 2018130968 A1 | 7/2018 |

OTHER PUBLICATIONS

R2-1710965 3GPP TSG RAN WG2 Meeting #99bis, Prague, Czech Republic, Oct. 9-13, 2017, Source: vivo, Title: Discussion on bandwidth part operation.
R2-1711065 3GPP TSG RAN WG2 Meeting #99bis, Prague, Czech Republic, Oct. 9-13, 2017, Source: Nokia, Nokia Shanghai Bell, Title: Cell and BWP relation.
R2-1711187 3GPP TSG RAN WG2 Meeting #99bis, Prague, Czech Republic, Oct. 9-13, 2017, Source: Samsung, Title: Framework to support bandwidth parts in NR.
R2-1711188 3GPP TSG RAN WG2 Meeting #99bis, Prague, Czech Republic, Oct. 9-13, 2017, Source: Samsung, Title: Signaling to support bandwidth part.
R2-1711189 3GPP TSG RAN WG2 Meeting #99bis, Prague, Czech Republic, Oct. 9-13, 2017, Source: Samsung, Title: Activation/ deactivation of bandwidth parts in NR.
R2-1711388 3GPP TSG RAN WG2 Meeting #99bis, Prague, Czech Republic, Oct. 9-13, 2017, Source: LG Electronics Inc., Title: RRC Procedures for BWP Configuration.
R2-1711595 3GPP TSG RAN WG2 Meeting #99bis, Prague, Czech Republic, Oct. 9-13, 2017, Source: Samsung, Title: The impact of bandwidth part on RAN2: Overview and Issues.
R2-1711607 3GPP TSG RAN WG2 Meeting #99bis, Prague, Czech Republic, Oct. 9-13, 2017, Source: Samsung, Title: Scenarios of Measurement Gap Considering Bandwidth Part.
R2-1711640 3GPP TSG RAN WG2 Meeting #99bis, Prague, Czech Republic, Oct. 9-13, 2017, Source: ZTE Corporation, Sane Chips, Title: Initial discussion on the impacts of BWP on RAN2.
R2-1712101 3GPP TSG RAN WG2 Meeting #100, Reno, USA, Nov. 27-Dec. 1, 2017, Source: ETSI MCC, Title: Report of 3GPP TSG RAN2 #99bis Meeting in Prague.
3GPP TS 23.501 V15.2.0 (Jun. 2018); Technical Specification; 3rd Generation Partnership Project; Technical Specification Group Services and System Aspects; System Architecture for the 5G System; Stage 2 (Release 15).
S2-183494 3GPP TSG RAN WG2 Meeting #127, Sanya, China, Apr. 16-20, 2018, Source: Nokia, Nokia Shanghai Bell, China Mobile, Title: Controlled Support of (AF) Session Binding for Ethernet PDU Session Type.
S2-173117 3GPP TSG RAN WG2 Meeting #121, Hangzhou, China, May 15-19, 2017, Source: Qualcomm Incorporated, Title: Options on Packet Filters Extension for PDU Sessions of Type Ethernet and Unstructured in 5GS.
Mar. 21, 2019—EP Extended Search Report—EP 18201708.7.
C1-174177 3GPP TSG-CT Wg1 Meeting #106, Kochi, India, Oct. 23-27, 2017, Source: LG Electronics, Ericsson, Title: Corrections on PDU session type and PDU type.
R3-161353 3GPP TSG RAN WG3 Meeting #92, Nanjing, China, May23-27, 2016, Source: Nokia, Alcatel-Lucent Shanghai Bell, Title: Proposal for RAN-CN Functional Split.
S2-177144 3GPP SA WG2 Meeting #123, Ljubljana, Slovenia, Oct. 23-27, 2017, Source: Huawei, HiSilicon, Title: Clarification on Ethernet PDU session.
C1-173155 3GPP TSG-CT WG1 Meeting #105, Krakow, Poland, Aug. 21-25, 2017, Source: Nokia, Alcatel-Lucent Shanghai Bell, Title: Pseudo-CR on support of 5GSM PDU session types.
3GPP TS 36.323 V14.3.1 (Jun. 2017), Technical Specification, 3rd Generation Partnership Project; Technical Specification Group Radio Access Network; Evolved Universal Terrestrial Radio Access (E-UTRA); Packet Data Convergence Protocol (PDCP) specification (Release 14).
3GPP TS 36.331 V14.3.0 (Jun. 2017), Technical Specification, 3rd Generation Partnership Project; Technical Specification Group Radio Access Network; Evolved Universal Terrestrial Radio Access (E-UTRA); Radio Resource Control (RCC); Protocol Specification (Release 14).

(56) References Cited

OTHER PUBLICATIONS

3GPP TS 38.300 V1.0.1 (Oct. 2017), Technical Specification, 3rd Generation Partnership Project; Technical Specification Group Radio Access Network; NR; NR and NG-RAN Overall Description; Stage 2 (Release 15).
3GPP TS 38.323 V0.3.0 (Aug. 2017), Technical Specification, 3rd Generation Partnership Project; Technical Specification Group Radio Access Network; NR; Packet Data Convergence Protocol (PDCP) specification (Release 15).
Cisco, Next-Generation Enterprise WAN: Cisco ISRs with 4G LTE Deployment Guide, May 2014.
Effnet Platform, Effnet EthHC™, 2017.
Wikipedia, "Ethernet frame", last edited Sep. 24, 2017.
Wikipedia, "EtherType", last edited Aug. 10, 2017.
Wikipedia, "IEEE 802.1Q", last edited Aug. 7, 2017.
S2-177974 3GPP SA WG2 Meeting #123, Ljubljana, Slovenia, Oct. 23-27, 2017, Source: Huawei, HiSilicon, Title: Classification on Ethernet PDU session.
S2-178029 3GPP SA WG2 Meeting #123, Ljubljana, Slovenia, Oct. 23-27, 2017, Source: Nokia, Nokia Shanghai Bell, Title: Corrections and Improvements for Ethernet PDU Session Type.
3GPP TS 36.211 V14.4.0 (Sep. 2017), Technical Specification, 3rd Generation Partnership Project; Technical Specification Group Radio Access Network; Evolved Universal Terrestrial Radio Access (E-UTRA); Physical Channels and Modulation (Release 14).
3GPP TS 36.212 V14.4.0 (Sep. 2017), Technical Specification, 3rd Generation Partnership Project; Technical Specification Group Radio Access Network; Evolved Universal Terrestrial Radio Access (E-UTRA); Multiplexing and Channel Coding (Release 14).
3GPP TS 36.300 V14.4.0 (Sep. 2017), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 14).
3GPP TS 36.321 V14.4.0 (Sep. 2017), Technical Specification, 3rd Generation Partnership Project; Technical Specification Group Radio Access Network; Evolved Universal Terrestrial Radio Access (E-UTRA); Medium Access Control (MAC) protocol Specification (Release 14).
3GPP TS 36.331 V14.4.0 (Sep. 2017), Technical Specification, 3rd Generation Partnership Project; Technical Specification Group Radio Access Network; Evolved Universal Terrestrial Radio Access (E-UTRA); Radio Resource Control (RCC); Protocol Specification (Release 14).
3GPP TS 36.213 V14.4.0 (Sep. 2017), Technical Specification, 3rd Generation Partnership Project; Technical Specification Group Radio Access Network; Evolved Universal Terrestrial Radio Access (E-UTRA); Physical Layer Procedures (Release 14).
S2-184514 3GPP TSG-SA WG2 Meeting #127, Sanya, China, Apr. 16-20, 2018, Source: Qualcomm Incorporated, Spreadtrum Communications, Ericsson, Title: Consolidation of UE Network Capabilities.
S2-183522 3GPP TSG-SA WG2 Meeting #127, Sanya, China, Apr. 16-20, 2018, Source: Qualcomm Incorporated, Title: Consolidation of UE Network Capabilities.
R1-1719301 3GPP TSG RAN WG1 Meeting #91, Reno, USA, Source: MCC Support, Title: Final Report of 3GPP TSG RAN WG1 #90bis v1.0.0 (Prague, Czech Republic, Oct. 9-13, 2017).
R1-1717057 3GPP TSG RAN WG1 Meeting #90bis, Prague, Czech Republic, Oct. 9-13, 2017, Source: Huawei, HiSilicon, Title: On initial active bandwidth part.
R1-1717077 3GPP TSG RAN WG1 Meeting #90bis, Prague, Czech Republic, Oct. 9-13, 2017, Source: Huawei, HiSilicon, Title: Remaining issues on bandwidth part.
R1-1717400 3GPP TSG RAN WG1 Meeting #90bis, Prague, Czech Republic, Oct. 9-13, 2017, Source: Intel Corporation, Title: Remaining details for bandwidth parts.
R1-1717504 3GPP TSG RAN WG1 Meeting #90bis, Prague, Czech Republic, Oct. 9-13, 2017, Source: vivo, Title: Remaining details for bandwidth part operation.
R1-1717675 3GPP TSG RAN WG1 Meeting #90bis, Prague, Czech Republic, Oct. 9-13, 2017, Source: Samsung, Title: On Bandwidth Part Operation.
R1-1717839 3GPP TSG RAN WG1 Meeting #90bis, Prague, Czech Republic, Oct. 9-13, 2017, Source: CATT, Title: Remaining aspects of BWP operation.
R1-1717905 3GPP TSG RAN WG1 Meeting #90bis, Prague, Czech Republic, Oct. 9-13, 2017, Source: Huawei, HiSilicon, Title: Bandwidth part activation and adaptation.
R1-1717972 3GPP TSG RAN WG1 Meeting #90bis, Prague, Czech Republic, Oct. 9-13, 2017, Source: LG Electronics, Title: Remaining issues on bandwidth parts.
R1-1718050 3GPP TSG RAN WG1 Meeting #90bis, Prague, Czech Republic, Oct. 9-13, 2017, Source: OPPO, Title: Remaining issues on bandwidth part configuration and activation.
R1-1718223 3GPP TSG RAN WG1 Meeting #90bis, Prague, Czech Republic, Oct. 9-13, 2017, Source: NTT DOCOMO, INC., Title: Remaing issues on bandwidth parts for NR.
R1-1718327 3GPP TSG RAN WG1 Meeting #90bis, Prague, Czech Republic, Oct. 9-13, 2017, Source: MediaTek Inc., Title: Remaining Details on Bandwidth Part Operation in NR.
R1-1718365 3GPP TSG RAN WG1 Meeting #90bis, Prague, Czech Republic, Oct. 9-13, 2017, Source: InterDigital, Inc., Title: Remaining details of BWP.
R1-1718404 3GPP TSG RAN WG1 Meeting #90bis, Prague, Czech Republic, Oct. 9-13, 2017, Source: AT&T, Title: Remaining details for bandwidth parts.
R1-1718523 3GPP TSG RAN WG1 Meeting #90bis, Prague, Czech Republic, Oct. 9-13, 2017, Source: Ericsson, Title: On bandwidth parties.
R1-1718580 3GPP TSG RAN WG1 Meeting #90bis, Prague, Czech Republic, Oct. 9-13, 2017, Source: Qualcomm Incorporated, Title: Open Issues on BWP.
R1-1718607 3GPP TSG RAN WG1 Meeting #90bis, Prague, Czech Republic, Oct. 9-13, 2017, Source: Nokia, Nokia Shanghai Bell, Title: On remaining aspects of BWPs.
R1-1718901 3GPP TSG RAN WG1 Meeting 90bis, Prague, Czech Republic, Oct. 9-13, 2017, Source: MediaTek Inc., Title: Summary of Bandwidth Part Operation.
R2-1710091 3GPP TSG RAN WG2 Meeting #99bis, Prague, Czech Republic, Oct. 9-13, 2017, Source: Samsung, Title: Random Access in RRC Connected: Bandwidth Part Aspects.
R2-1710125 3GPP TSG RAN WG2 Meeting #99bis, Prague, Czech Republic, Oct. 9-13, 2017, Source: OPPO, Title: Impact of BWP on CA.
R2-1710126 3GPP TSG RAN WG2 Meeting #99bis, Prague, Czech Republic, Oct. 9-13, 2017, Source: OPPO, Title: Timer based BWP switching.
R2-1710217 3GPP TSG RAN WG2 Meeting #99bis, Prague, Czech Republic, Oct. 9-13, 2017, Source: Huawei, HiSilicon, Title: User plane impacts for Bandwidth Parts.
R2-1710274 3GPP TSG RAN WG2 Meeting #99bis, Prague, Czech Republic, Oct. 9-13, 2017, Source: CATT, Title: Modeling Bandwidth Parts in MAC.
R2-1710275 3GPP TSG RAN WG2 Meeting #99bis, Prague, Czech Republic, Oct. 9-13, 2017, Source: CATT, Title: BWP model.
R2-1710457 3GPP TSG RAN WG2 Meeting #99bis, Prague, Czech Republic, Oct. 9-13, 2017, Source: Huawei, HiSilicon, Title: Control plane impacts for Bandwidth Parts.
R2-1710592 3GPP TSG RAN WG2 Meeting #99bis, Prague, Czech Republic, Oct. 9-13, 2017, Source: Intel Corporation, Title: Overall impact in RAN2 for BWP.
Nokia et al: "Update on policy control for QoS control functionalities" 3GPP Draft; 3rd Generation Partnership Project (3GPP), Mobile Competence Centre; San Jose Del Cabo, Mexico; Jul. 3, 2017.
Ericsson: "5G System details for PCC" 3GPP Draft; San Jose Del Cabo; Jun. 20, 2017.
Jun. 9, 2021—European Search Report—EP 21157697.0.
Jun. 24, 2022—European Office Action—EP App. No. 21157697.0.
Feb. 22, 2024—European Office Action—EP App. No. 21157697.0.

\* cited by examiner

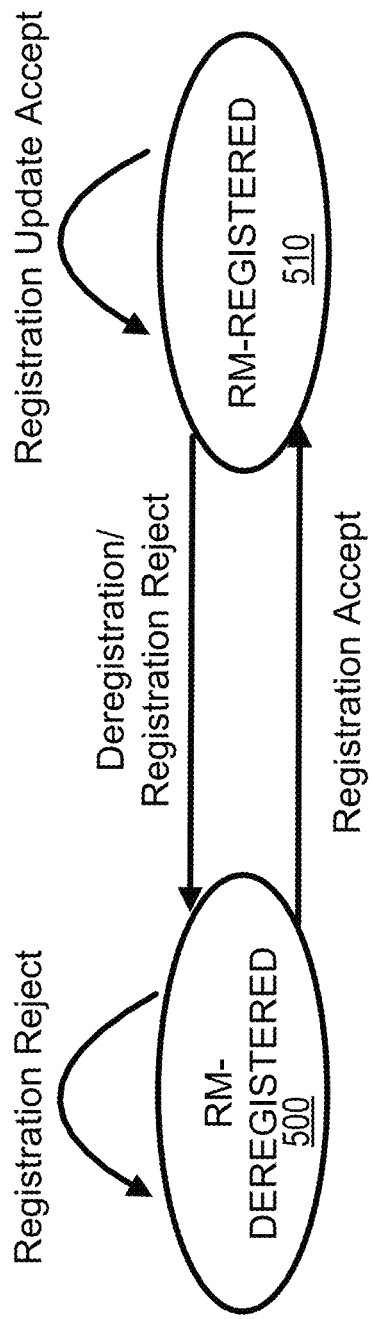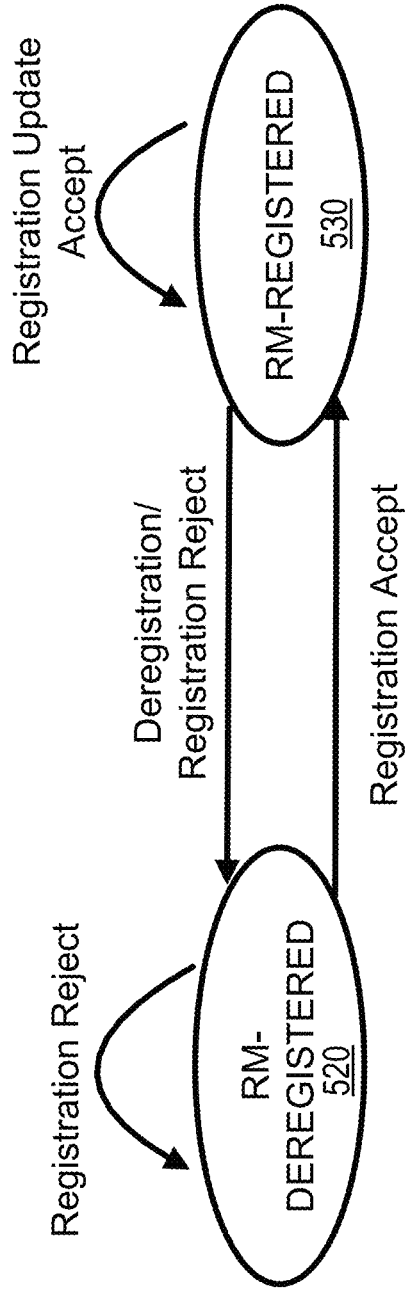
FIG. 5

802.3 Ethernet packet and frame structure

| Layer | Preamble | Start of frame delimiter | MAC destination | MAC source | 802.1Q tag (optional) | Ethertype (Ethernet II) or length (IEEE 802.3) | Payload | Frame check sequence (32-bit CRC) | Interpacket gap |
|---|---|---|---|---|---|---|---|---|---|
| | 7 octets | 1 octet | 6 octets | 6 octets | (4 octets) | 2 octets | 46-1500 octets | 4 octets | 12 octets |
| Layer 2 Ethernet frame | | | ←──────────── 64-1522 octets ────────────→ | | | | | | |
| Layer 1 Ethernet packet & IPG | ←──────────── 64-1522 octets ────────────→ | | | | | | | | ←12 octets→ |

FIG. 9

ETHERNET TYPE PACKET DATA UNIT SESSION COMMUNICATIONS

CROSS-REFERENCE TO RELATED APPLICATIONS

This application is a is a continuation of U.S. application Ser. No. 16/155,597, filed Oct. 9, 2018, which is a continuation of U.S. application Ser. No. 16/155,378, filed Oct. 9, 2018, which claims the benefit of U.S. Provisional Application No. 62/569,910, filed Oct. 9, 2017, U.S. Provisional Application No. 62/569,927, filed Oct. 9, 2017, and U.S. Provisional Application No. 62/569,935, filed Oct. 9, 2017, all of the above disclosures of which are hereby incorporated by reference in their entirety for all purposes.

BACKGROUND

A wireless communications system may not be able to provide an Ethernet over wireless communications for a wireless device due to insufficient information known by the system about the wireless device. For example, some network devices may not have wireless device specific information that may be necessary to serve Ethernet over wireless communications for a wireless device. As a result, difficulties may arise for a wireless device to obtain desired services using Ethernet over wireless communications.

SUMMARY

The following summary presents a simplified summary of certain features. The summary is not an extensive overview and is not intended to identify key or critical elements.

Systems, apparatuses, and methods are described for Ethernet packet data unit (PDU) session communications. A data network may provide one or more addresses to a session management function for an Ethernet PDU session. A wireless device may provide one or more Ethernet packet filter sets to the session management function to request an Ethernet PDU session. The session management function may provide to a user plane function one or more messages comprising the one or more Ethernet packet filter sets, the one or more addresses, and/or at least one policy rule. The user plane function may apply the at least one policy rule to a data flow to provide the requested Ethernet PDU session for the wireless device.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5 shows examples of registration management state models for a wireless device and an access and mobility management function (AMF).
FIG. 9 shows an example of an Ethernet packet and frame structure.

DETAILED DESCRIPTION

Figure 1:
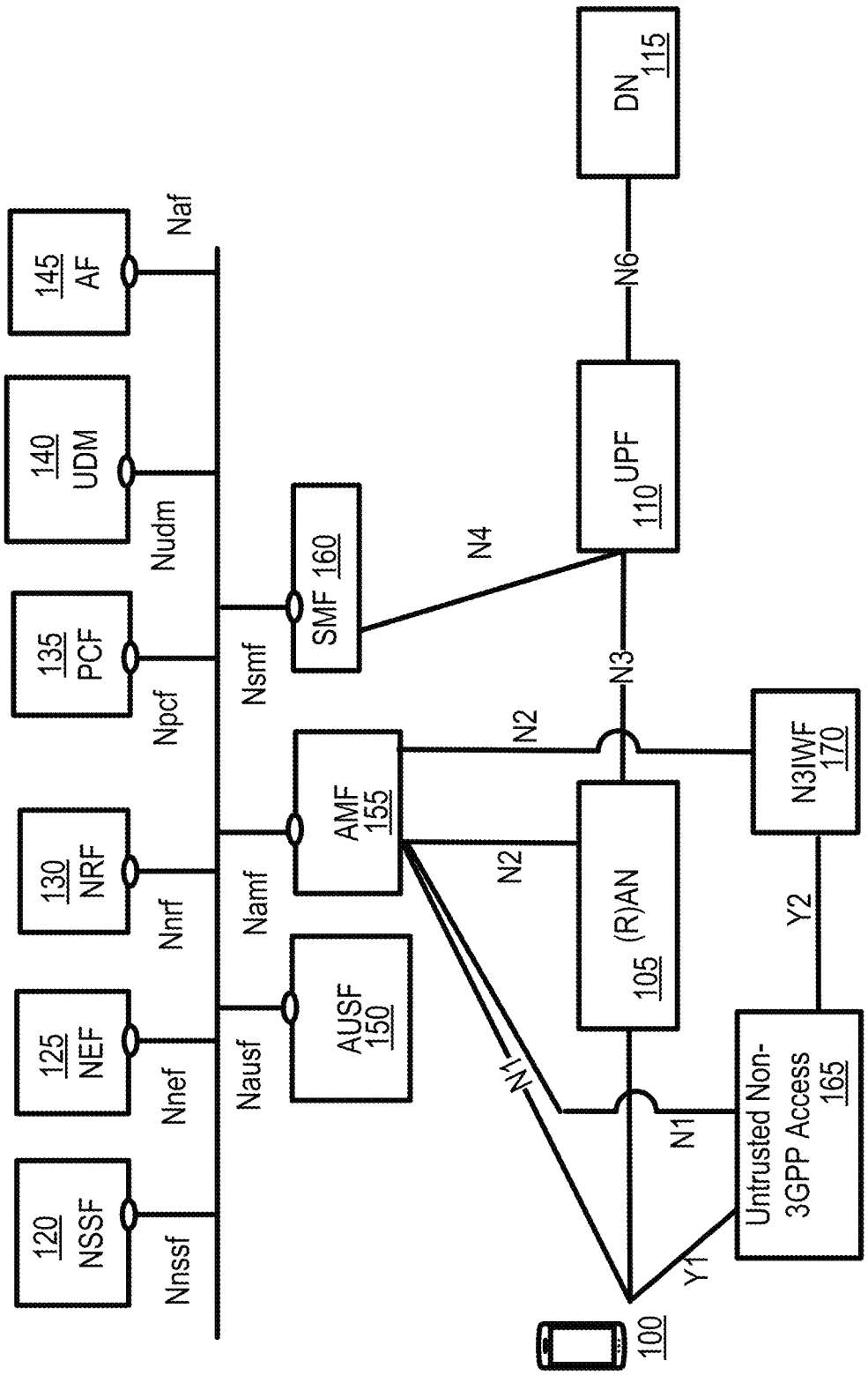
FIG. 1 shows an example 5G system architecture.

The accompanying drawings, which form a part hereof, show examples of the disclosure. It is to be understood that the examples shown in the drawings and/or discussed herein are non-exclusive and that there are other examples of how the disclosure may be practiced.

Examples of enhanced features and functionalities in networks, such as 5G networks, or other systems are provided. The technology disclosed herein may be employed in the technical field of networks, such as 5G systems, and Ethernet type PDU sessions for communication systems. More particularly, the technology disclosed herein may relate to for Ethernet PDU type sessions in communication systems such as 5GC, 5G, or other systems. The communication systems may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices.

The following acronyms are used throughout the present disclosure, provided below for convenience although other acronyms may be introduced in the detailed description.

Figure 2:
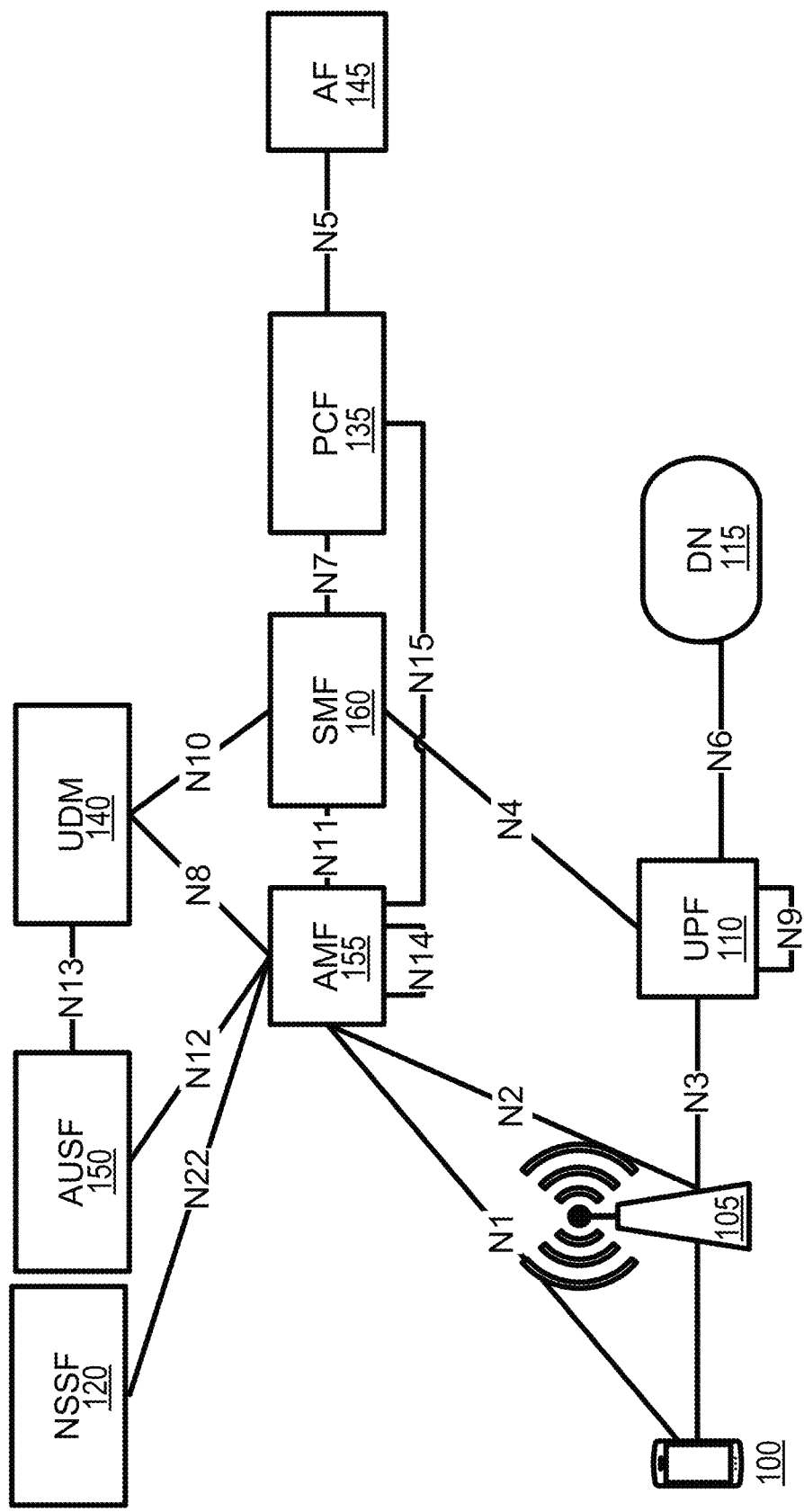
FIG. 2 shows an example 5G system architecture.

5G 5th generation mobile networks
5GC 5G Core Network
5GS 5G System
5QI 5G QoS Indicator
AF Application Function
AMF Access and Mobility Management Function
AN Access Network
ARP Allocation and Retention Priority
AUSF Authentication Server Function
CN Core Network
DL Downlink
DN Data Network
DN-AAA Data Network Authentication Authorization and Accounting
DNN Data Network Name
eNB Evolved Node B
ESP Encapsulating Security Protocol
gNB Next Generation Node B or NR Node B
IETF Internet Engineering Task Force
IP Internet Protocol
L2 Layer 2 (data link layer)
L3 Layer 3 (network layer)
LADN Local Area Data Network
LI Lawful Intercept
MICO Mobile Initiated Connection Only
N3IWF Non-3GPP InterWorking Function
NAS Non Access Stratum
NEF Network Exposure Function
NF Network Function
NG-RAN NR Radio Access Network
NR New Radio
NRF Network Repository Function
NSSAI Network Slice Selection Assistance Information
PCC Policy and Charging Control
PCF Policy Control Function
PDCP Packet Data Convergence Protocol
PDU Packet Data Unit
PEI Permanent Equipment Identifier
PLMN Public Land Mobile Network
(R)AN (Radio) Access Network
RAT Radio Access Technology
RFC Request For Comments
RLC Radio Link Control
ROHC Robust Header Compression
RRC Radio Resource Control
QFI QoS Flow Identity
QoS Quality of Service
RM Registration Management
SMF Session Management Function
SN Sequence Number
S-NSSAI Single Network Slice Selection Assistance information
UDM Unified Data Management
UE User Equipment
UL Uplink
UPF User Plane Function
VPLMN Visited Public Land Mobile Network FIG. 1 and FIG. 2 show examples 5G system architecture. A 5G access network may comprise an access network connecting to a 5GC. An access network may comprise an AN 105 (e.g., NG-RAN such as in FIG. 1, or any access node as in FIG. 2) and/or non-3GPP AN 165 which may be an untrusted AN. An example 5GC may connect to one or more 5G access networks (e.g., a 5G AN) and/or NG-RANs. The 5GC may comprise functional elements or network functions as in example FIG. 1 and example FIG. 2, where interfaces may be employed for communication among the functional elements and/or network elements. A network function may be a processing function in a network that has a functional behavior and interfaces. A network function may be implemented as a network element on a dedicated hardware, a base station, and/or as a software instance running on a dedicated hardware, shared hardware, and/or as a virtualized function instantiated on an appropriate platform.

The access and mobility management function AMF 155 may comprise one or more of the following functionalities: termination of (R)AN CP interface (N2), termination of NAS (N1), NAS ciphering and integrity protection, registration management, connection management, reachability management, mobility management, lawful intercept (for AMF events and interface to LI system), transport for session management, SM messages between a wireless device 100 and an SMF 160, transparent proxy for routing SM messages, access authentication, access authorization, transport for short message service (SMS) messages between wireless device 100 and an SMS function (SMSF), security anchor function (SEA) interaction with the AUSF 150 and the wireless device 100, receiving an intermediate key established as a result of the wireless device 100 authentication process, security context management (SCM), and/or receiving a key from the SEA to derive access network specific keys. A variety of these functionalities may be supported in a single instance of an AMF 155 and/or in multiple instances of AMF 155 as appropriate.

The AMF 155 may support non-3GPP access networks via an N2 interface with N3IWF 170, NAS signaling with a wireless device 100 over N3IWF 170, authentication of wireless devices connected over N3IWF 170, management of mobility, authentication, and separate security context state(s) of a wireless device 100 connected via non-3GPP access 165 or connected via 3GPP access 105 and non-3GPP accesses 165 simultaneously, support of a coordinated RM context valid over 3GPP access 105 and non-3GPP access 165, and/or support of context management (CM) management contexts for the wireless device 100 for connectivity over non-3GPP access. Some functionalities described above may be supported in an instance of a network slice. An AMF 155 region may comprise of one or multiple AMF 155 sets. AMF 155 set may comprise of some AMFs 155 that serve a given area and/or network slice(s). Multiple AMF 155 sets may be per AMF 155 region and/or network slice(s). Application identifiers may be mapped to one or more specific application traffic detection rules. A configured NSSAI may be a NSSAI that has been provisioned in a wireless device 100. DN 115 access identifier (DNAI), for a DNN, may be an identifier of a user plane access to a DN 115. Initial registration may be related to a wireless device 100 registration in a RM-DEREGISTERED state. N2AP wireless device 100 association may be a logical per wireless device 100 association between a 5G AN node and an AMF 155. Wireless device 100 may comprise a N2AP wireless device-TNLA-binding, which may be a binding between a N2AP wireless device 100 association and a specific transport network layer (TNL) association for a given wireless device 100.

The session management function (SMF) 160 may comprise one or more of the following functionalities: session management (e.g., session establishment, modify and release, comprising tunnel maintain between UPF 110 and AN 105 node), wireless device IP address allocation & management (comprising optional authorization), selection and control of user plane function(s), configuration of traffic steering at UPF 110 to route traffic to its proper destination, termination of interfaces towards policy control functions, control part of policy enforcement and QoS, lawful intercept (for SM events and interface to LI system), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI system), and/or support for interaction with external DN 115 for transport of signaling for PDU session authorization/authentication by external DN 115. One or more of these functionalities may be supported in a single instance of a SMF 160. One or more of the functionalities described above may be supported in an instance of a network slice.

The user plane function (UPF) 110 may comprise one or more of the following functionalities: anchor point for Intra-/Inter-RAT mobility (if applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, and/or downlink data notification triggering. One or more of these functionalities may be supported in a single instance of a UPF 110. One or more of functionalities described above may be supported in an instance of a network slice. User plane function(s) (UPF(s) 110) may handle the user plane path of PDU sessions. A UPF 110 that provides the interface to a data network supports the functionality of a PDU session anchor.

IP address management may comprise allocation and release of the wireless device IP address as well as renewal of the allocated IP address. The wireless device 100 sets the requested PDU type during the PDU session establishment procedure based on its IP stack capabilities and configuration. The SMF 160 may select PDU type of a PDU session as follows: if the SMF 160 receives a request with PDU type set to IP, the SMF 160 may select either PDU type IPv4 or IPv6 based on DNN configuration and/or operator policies. The SMF 160 may also provide a cause value to the wireless device 100 to indicate whether the other IP version (e.g. IPv6 if IPv4 is selected and vice versa) may be supported on the DNN. If the other IP versions are supported, wireless device 100 may request another PDU session to the same DNN for the other IP version. If the SMF 160 receives a request for PDU type IPv4 or IPv6 and the requested IP version may be supported by the DNN, the SMF 160 selects the requested PDU type. The 5GC elements and wireless device 100 support the following mechanisms: during PDU session establishment procedure, the SMF 160 may send the IP address to the wireless device 100 via SM NAS signaling. The IPV4 address allocation and/or IPv4 parameter configuration via DHCPv4 may also be used if the PDU session may be established. IPv6 prefix allocation may be supported via IPv6 stateless auto configuration, if IPv6 may be supported. IPv6 parameter configuration via stateless DHCPv6 may also be supported. The 5GC may support the allocation of a static IPv4 address and/or a static IPv6 prefix based on subscription information in the UDM 140 or based on the configuration on a per-subscriber, per-DNN basis.

The policy control function PCF 135 may support unified policy framework to govern network behavior, provide policy rules to control plane function(s) to enforce them, and/or implement a front end to access subscription information relevant for policy decisions in a user data repository (UDR). The unified data management UDM 140 may comprise an application front end (FE) that comprises the UDM-FE that may be in charge of processing credentials, location management, and/or subscription management. The PCF 135 may be in charge of policy control and the user data repository (UDR) that stores data required for functionalities provided by UDM-FE, plus policy profiles required by the PCF 135. The data stored in the UDR may comprise at least user subscription data, comprising at least subscription identifiers, security credentials, access and mobility related subscription data, session related subscription data, and/or policy data.

The network exposure function NEF 125 may provide a means to securely expose the services and capabilities provided by the 3GPP network functions, translate between information exchanged with the AF 145 and information exchanged with the internal network functions, and/or receive information from other network functions.

The NF repository function NRF 130 may support a service discovery function that receives NF discovery requests from a NF instance, provides the information of the discovered NF instances to the NF instance, and/or maintains the information of available NF instances and their supported services.

The network slice selection function (NSSF) 120 may support selecting the set of network slice instances serving the wireless device 100, determining the provided NSSAI, determining the AMF 155 set to be employed to serve the wireless device 100, and/or, based on configuration, determining a list of candidate AMF(s) 155, possibly by querying the NRF 130.

The functionality of non-3GPP interworking function N3IWF 170 for non-3GPP access 165 may comprise at least one or more of the following: supporting of IPsec tunnel establishment with the wireless device, terminating the IKEv2/IPsec protocols with the wireless device 100 over NWu, relaying over N2 the information needed to authenticate the wireless device 100 and authorize its access to the 5GC, terminating of N2 and N3 interfaces to 5GC for control-plane and user-plane respectively, relaying uplink and downlink control-plane NAS (N1) signaling between the wireless device 100 and AMF 155, handling of N2 signaling from SMF 160 (which may be relayed by AMF 155) related to PDU sessions and QoS, establishing of IPsec security association (IPsec SA) to support PDU session traffic, relaying uplink and downlink user-plane packets between the wireless device 100 and UPF 110, enforcing QoS corresponding to N3 packet marking, considering QoS requirements associated to such marking received over N2, N3 user-plane packet marking in the uplink, local mobility anchor within untrusted non-3GPP access networks 165 using MOBIKE, and/or supporting AMF 155 selection.

The application function AF 145 may interact with the 3GPP core network to provide a variety of services. Based on operator deployment, AF 145 may be trusted by the operator to interact directly with relevant network functions. Application functions not provided by the operator to access directly the network functions may use the external exposure framework (via the NEF 125) to interact with relevant network functions.

The control plane interface between the (R)AN 105 and the 5GC may support connection of multiple different kinds of ANs, such as 3GPP (R)AN 105 and/or N3IWF 170, to the 5GC via a unique control plane protocol. A single N2 AP protocol may be employed for both the 3GPP access 105 and non-3GPP access 165 and/or for decoupling between AMF 155 and other functions such as SMF 160 that may need to control the services supported by AN(s) (e.g. control of the UP resources in the AN 105 for a PDU session). The 5GC may be able to provide policy information from the PCF 135 to the wireless device 100. Such policy information may comprise the following: access network discovery & selection policy, wireless device route selection policy (URSP) that groups to or more of SSC mode selection policy (SSCMSP), network slice selection policy (NSSP), DNN selection policy, and/or non-seamless offload policy. The 5GC may support the connectivity of a wireless device 100 via non-3GPP access networks 165. As shown in example FIG. 5, the registration management, RM may be employed to register or de-register a wireless device 100 with the network, and establish the user context in the network. Connection management may be employed to establish and release the signaling connection between the wireless device 100 and the AMF 155.

A wireless device 100 may need to register with the network to receive services that require registration. The wireless device 100 may update its registration with the network, e.g., periodically, after the wireless device is registered, to remain reachable (e.g. periodic registration update), on mobility (e.g. mobility registration update), and/or to update its capabilities or re-negotiate protocol parameters. An initial registration procedure, such as in the examples shown in FIG. 8A and FIG. 8B, may involve execution of network access control functions (e.g. user authentication and access authorization based on subscription profiles in UDM 140). As result of the registration procedure, the identity of the serving AMF 155 may be registered in UDM 140. The registration management (RM) procedures may be applicable over both 3GPP access 105 and non-3GPP access 165.

Figure 3:
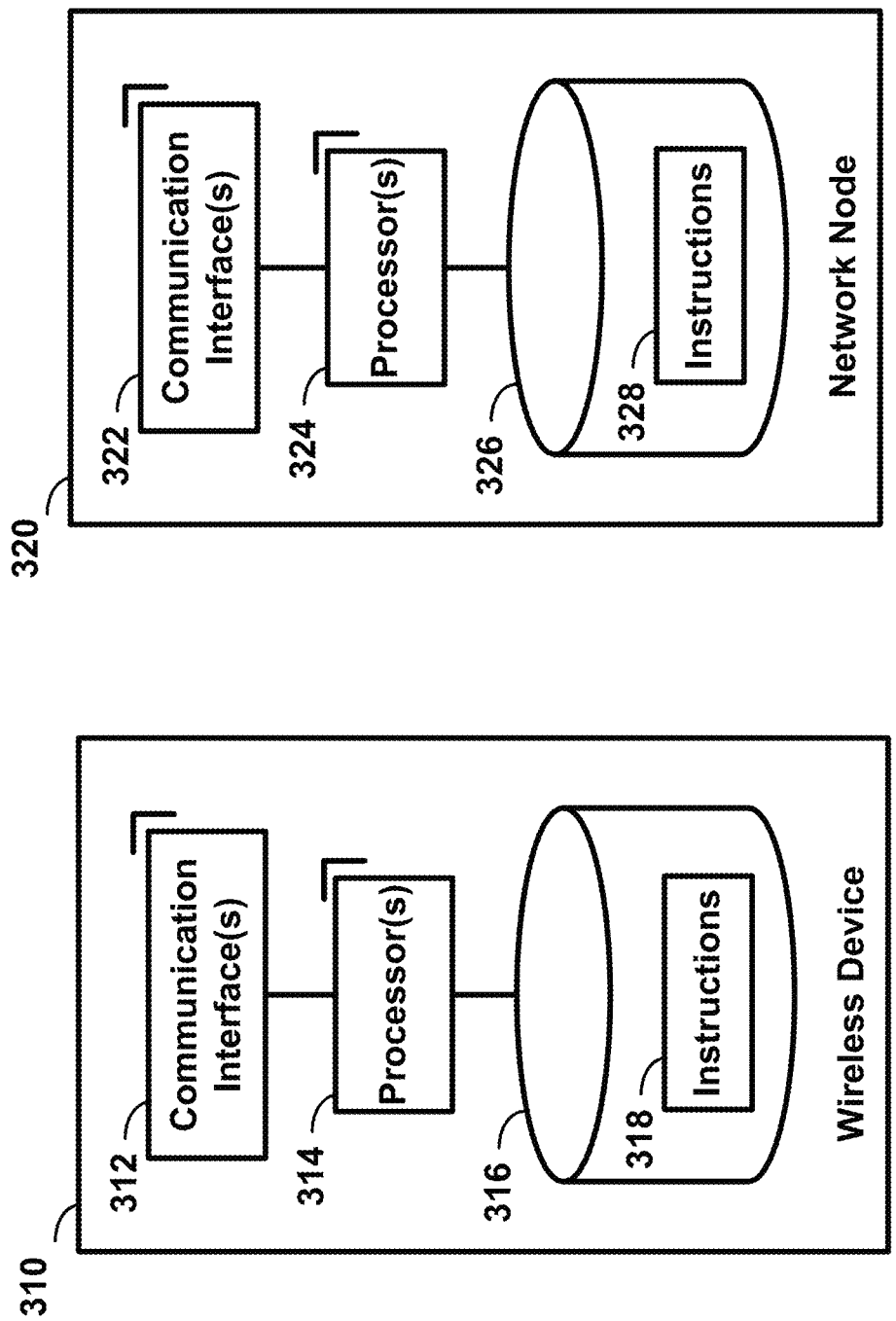
FIG. 3 shows an example of a wireless device and a network node.
Figure 4A:
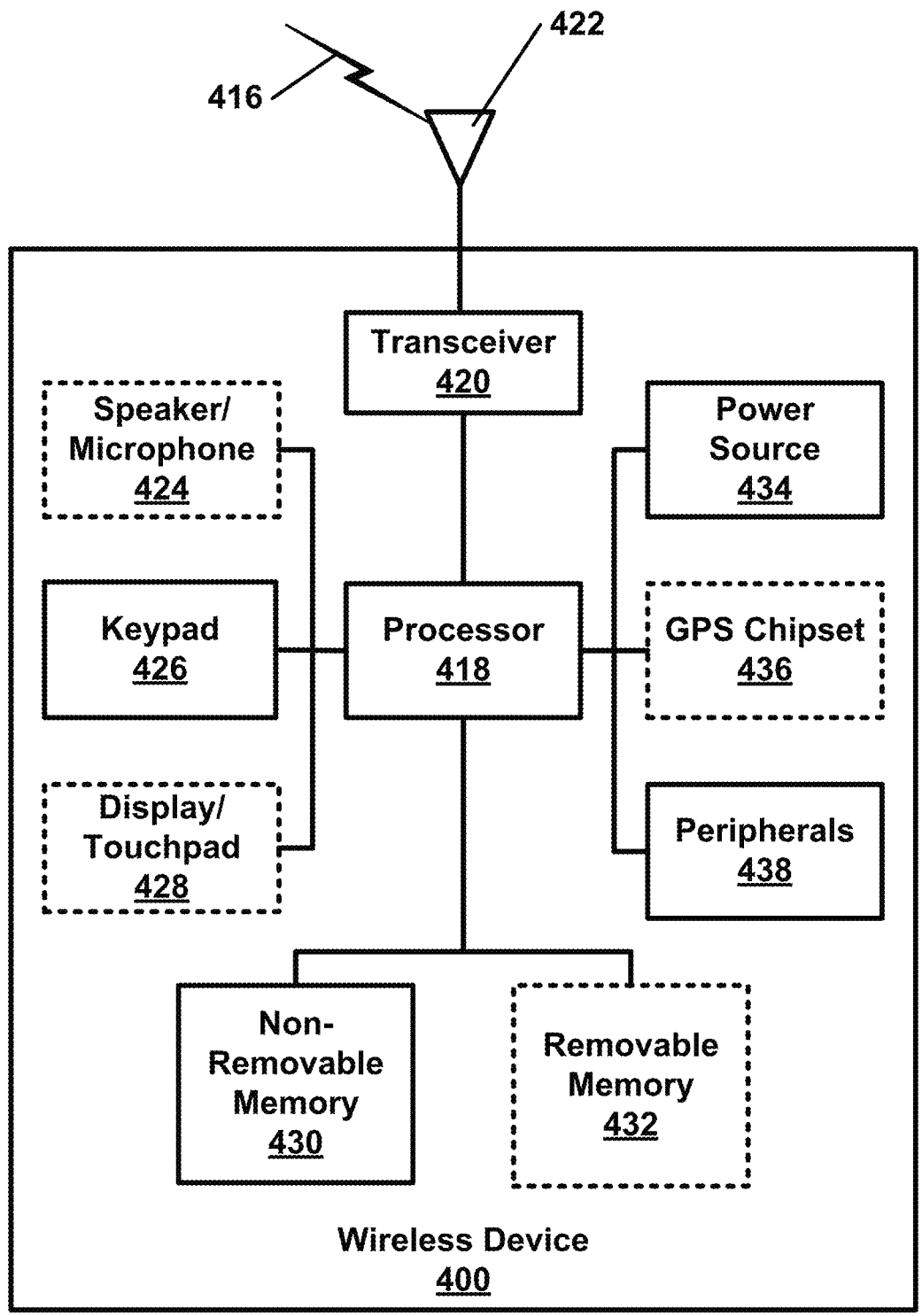
FIGS. 4A and 4B show example elements of computing devices that may be used to implement any of the various devices described herein.
Figure 4B:
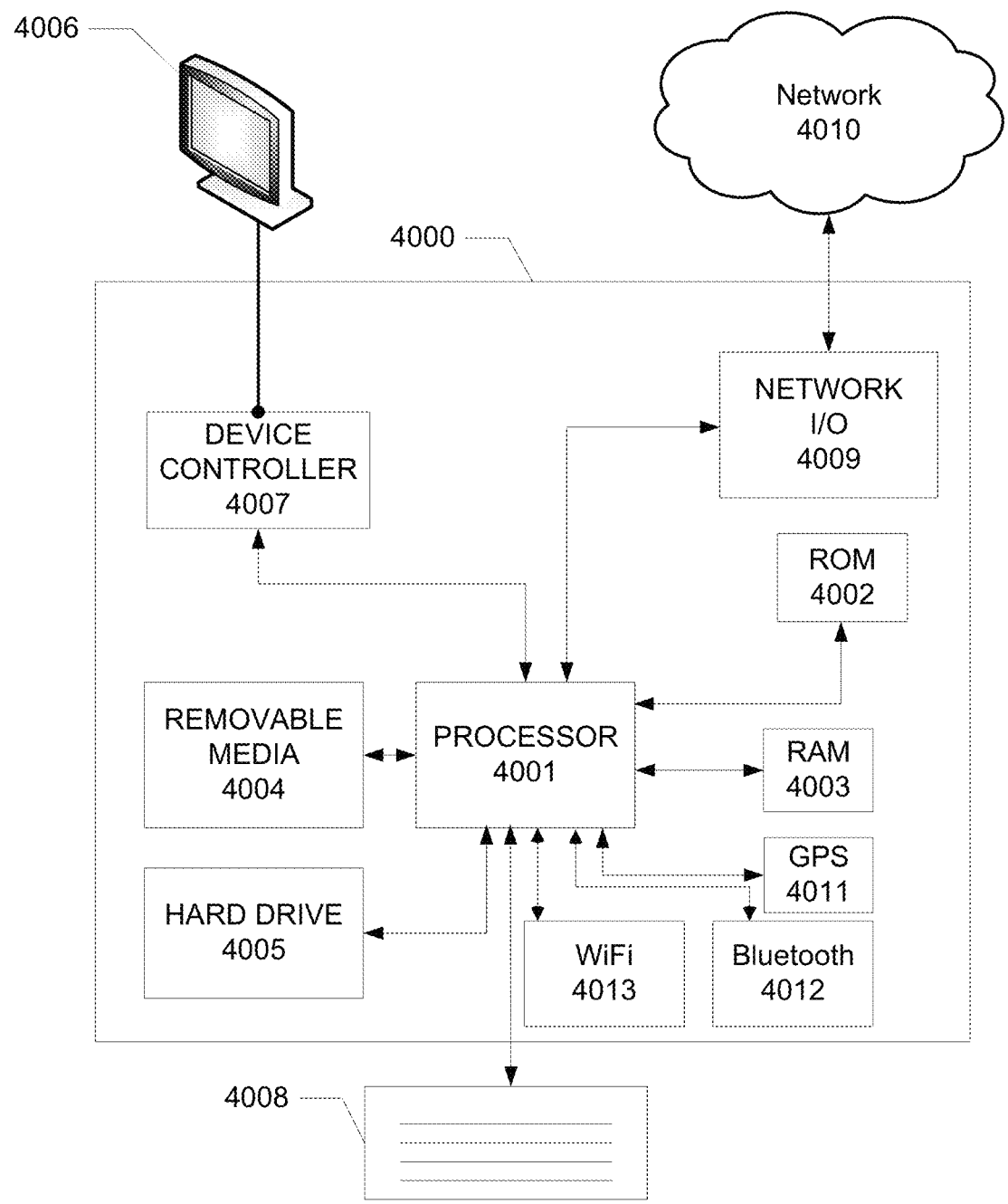

FIG. 3 shows hardware elements of a network node 320 (e.g., a base station) and a wireless device 310. A communication network may include at least one network node 320 and at least one wireless device 310. The network node 320 may include one or more communication interface 322, one or more processors 324, and one or more sets of program code instructions 328 stored in non-transitory memory 326 and executable by the one or more processors 324. The wireless device 310 may include one or more communication interface 312, one or more processors 314, and one or more sets of program code instructions 318 stored in non-transitory memory 316 and executable by the one or more processors 314. A communication interface 322 in the network node 320 may be configured to engage in communication with a communication interface 312 in the wireless device 310, such as via a communication path that includes at least one wireless link. The wireless link may be a bi-directional link. The communication interface 312 in the wireless device 310 may also be configured to engage in communication with the communication interface 322 in the network node 320. The network node 320 and the wireless device 310 may be configured to send and receive data over the wireless link using multiple frequency carriers. Network nodes, base stations, wireless devices, and other communication devices may include structure and operations of transceiver(s). A transceiver is a device that includes both a transmitter and receiver. Transceivers may be employed in devices such as wireless devices, base stations, relay nodes, and/or the like. Examples for radio technology implemented in the communication interfaces 312, 322 and the wireless link are shown in FIG. 3, FIGS. 4A, and 4B, and associated text. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a Wi-Fi access point), a computing device, a device capable of wirelessly communicating, and/or any other device capable of sending and/or receiving signals. As used throughout, the term "wireless device" may comprise one or more of: a UE, a handset, a mobile device, a computing device, a node, a device capable of wirelessly communicating, and/or any other device capable of sending and/or receiving signals. Any reference to one or more of these terms/devices also considers use of any other term/device mentioned above.

The communications network may comprise Radio Access Network (RAN) architecture. The RAN architecture may comprise one or more RAN nodes that may be a next generation Node B (gNB) (e.g., 320) providing New Radio (NR) user plane and control plane protocol terminations towards a first wireless device (e.g. 310). A RAN node may be a next generation evolved Node B (ng-eNB), providing Evolved UMTS Terrestrial Radio Access (E-UTRA) user plane and control plane protocol terminations towards a second wireless device. The first wireless device may communicate with a gNB over a Uu interface. The second wireless device may communicate with a ng-eNB over a Uu interface. The network node 320 may comprise one or more of a gNB, ng-eNB, and/or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in RRC_INACTIVE state, distribution function for Non-Access Stratum (NAS) messages, RAN sharing, and dual connectivity or tight interworking between NR and E-UTRA.

One or more gNBs and/or one or more ng-eNBs may be interconnected with each other by means of Xn interface. A gNB or an ng-eNB may be connected by means of NG interfaces to 5G Core Network (5GC). 5GC may comprise one or more AMF/User Plane Function (UPF) functions. A gNB or an ng-eNB may be connected to a UPF by means of an NG-User plane (NG-U) interface. The NG-U interface may provide delivery (e.g., non-guaranteed delivery) of user plane Protocol Data Units (PDUs) between a RAN node and the UPF. A gNB or an ng-eNB may be connected to an AMF by means of an NG-Control plane (e.g., NG-C) interface. The NG-C interface may provide functions such as NG interface management, UE context management, UE mobility management, transport of NAS messages, paging, PDU session management, configuration transfer or warning message transmission.

A UPF may host functions such as anchor point for intra-/inter-Radio Access Technology (RAT) mobility (if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, for example, packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

An AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

FIG. 4A shows general hardware elements that may be used to implement any of the various computing devices discussed herein, including any base station, wireless device, or computing device. The computing device 400 (e.g., wireless device) may include one or more processors 418, which may execute instructions stored memory, such as non-removable memory 430, removable memory 432 (such as a Universal Serial Bus (USB) drive, compact disk (CD) or digital versatile disk (DVD), or floppy disk drive), or any other desired storage medium. Instructions may also be stored in an attached (or internal) hard drive. The computing device 400 may also include a security processor (not shown), which may execute instructions of a one or more computer programs to monitor the processes executing on the processor 418 and any process that requests access to any hardware and/or software components of the computing device 400 (e.g., the non-removable memory 430, the removable memory 432, the hard drive, a device controller (e.g., a keypad 426, a display and/or touchpad 428, a speaker and/or microphone 424, and/or one or more peripherals 438), a transceiver 420, a network interface, a GPS 436 (e.g., a GPS chipset), a Bluetooth interface, a Wi-Fi interface, etc.). The computing device 400 may include one or more output devices, such as the display and/or touchpad 428 (e.g., a screen, a display device, a monitor, a television, etc.), and may include one or more output device controllers, such as a video processor. There may also be one or more user input devices, such as a remote control, keyboard, mouse, touch screen, microphone, etc., that may be configured, for example, as one or more of the peripherals 438. The computing device 400 may also include one or more network interfaces, such as a network interface, the may be a wired interface, a wireless interface such as the transceiver 420, or a combination of the two. The network interface may provide an interface for the computing device 400 to communicate (e.g., via communications 416) with a network (e.g., a RAN, or any other network). The network interface may include a modem (e.g., a cable modem), and the external network may include communication links, an external network, an in-home network, a provider's wireless, coaxial, fiber, or hybrid fiber/coaxial distribution system (e.g., a DOCSIS network), or any other desired network. Additionally, the computing device 400 may include a location-detecting device, such as a global positioning system (GPS) chipset or microprocessor 436, which may be configured to receive and process global positioning signals and determine, with possible assistance from an external server and antenna (e.g., antenna 422), a geographic position of the computing device 400.

FIG. 4B shows general hardware elements that may be used to implement any of the various computing devices discussed herein, including, e.g., the network node 320, the wireless device 310, or any other network node, base station, wireless device, or computing device described herein. The computing device 4000 may include one or more processors 4001, which may execute instructions stored in the random access memory (RAM) 4003, the removable media 4004 (such as a Universal Serial Bus (USB) drive, compact disk (CD) or digital versatile disk (DVD), or floppy disk drive), or any other desired storage medium. Instructions may also be stored in an attached (or internal) hard drive 4005. The computing device 4000 may also include a security processor (not shown), which may execute instructions of one or more computer programs to monitor the processes executing on the processor 4001 and any process that requests access to any hardware and/or software components of the computing device 4000 (e.g., ROM 4002, RAM 4003, the removable media 4004, the hard drive 4005, the device controller 4007, a network interface 4009, a GPS 4011, a Bluetooth interface 4012, a Wi-Fi interface 4013, etc.). The computing device 4000 may include one or more output devices, such as the display 4006 (e.g., a screen, a display device, a monitor, a television, etc.), and may include one or more output device controllers 4007, such as a video processor. There may also be one or more user input devices 4008, such as a remote control, keyboard, mouse, touch screen, microphone, etc. The computing device 4000 may also include one or more network interfaces, such as a network interface 4009, which may be a wired interface, a wireless interface, or a combination of the two. The network interface 4009 may provide an interface for the computing device 4000 to communicate with a network 4010 (e.g., a RAN, or any other network). The network interface 4009 may include a modem (e.g., a cable modem), and the external network 4010 may include communication links, an external network, an in-home network, a provider's wireless, coaxial, fiber, or hybrid fiber/coaxial distribution system (e.g., a DOCSIS network), or any other desired network. Additionally, the computing device 4000 may include a location-detecting device, such as a global positioning system (GPS) microprocessor 4011, which may be configured to receive and process global positioning signals and determine, with possible assistance from an external server and antenna, a geographic position of the computing device 4000.

The examples in FIGS. 4A and 4B are hardware configurations, although the components shown may be implemented as software as well. For example, modifications may be made to add, remove, combine, divide, etc. components of the computing device 4000 as desired. Additionally, the components may be implemented using basic computing devices and components, and the same components (e.g., processor 4001, ROM storage 4002, display 4006, etc.) may be used to implement any of the other computing devices and components described herein. For example, the various components described herein may be implemented using computing devices having components such as a processor executing computer-executable instructions stored on a computer-readable medium, as shown in FIGS. 4A and 4B. Some or all of the entities described herein may be software based, and may co-exist in a common physical platform (e.g., a requesting entity may be a separate software process and program from a dependent entity, both of which may be executed as software on a common computing device).

Base stations, wireless devices, relay nodes, and other communication devices may comprise one or more transceivers. A transceiver may be a device that comprises both a transmitter and receiver. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment. Although one or more of the above types of devices may be referenced herein (e.g., user equipment, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., a wireless device, base station, eNB, gNB, computing device, etc.), in one or more networks, but it will be understood that one or more features and/or steps may be implemented on any device and/or in any network. As used throughout, the term "base station" may comprise one or more of: a base station, a node, a Node B, a gNB, an eNB, am ng-eNB, a relay node (e.g., an integrated access and backhaul (IAB) node), a donor node (e.g., a donor eNB, a donor gNB, etc.), an access point (e.g., a Wi-Fi access point), a computing device, a device capable of wirelessly communicating, and/or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 5 depicts examples of the RM states of a wireless device, such as the wireless device 100, as observed by the wireless device 100 and AMF 155. The top half of FIG. 5 shows RM state transition in the wireless device. Two RM states may be used in a wireless device 100 (and possibly in the AMF 155) that may reflect the registration status of the wireless device 100 in the selected PLMN. The registration status of the wireless device 100 in the selected PLMN may be RM-DEREGISTERED 500 or RM-REGISTERED 510. In the RM DEREGISTERED state 500, the wireless device 100 may not be registered with a network. The wireless device 100 context in AMF 155 may not hold valid location or routing information for the wireless device 100 so the wireless device 100 may be not reachable by the AMF 155. Some wireless device context may still be stored in the wireless device 100 and the AMF 155. In the RM REGISTERED state 510, the wireless device 100 may be registered with the network. In the RM-REGISTERED 510 state, the wireless device 100 may receive services that require registration with the network.

The bottom half of FIG. 5 shows RM state transitions in the AMF 155. Two RM states may be used in the AMF 155 for the wireless device 100 that reflect the registration status of the wireless device 100 in the selected PLMN. The two RM states that may be used in the AMF 155 for the wireless device 100 in the selected PLMN may be RM-DEREGISTERED 520 or RM-REGISTERED 530. The state of RM-DEREGISTERED 500 in the wireless device 100 may correspond to the state of RM-DEREGISTERED 520 in the AMF 155. The state of RM-REGISTERED 510 in the wireless device 100 may correspond to the state of RM-REGISTERED 530 in the AMF 155.

Figure 6:
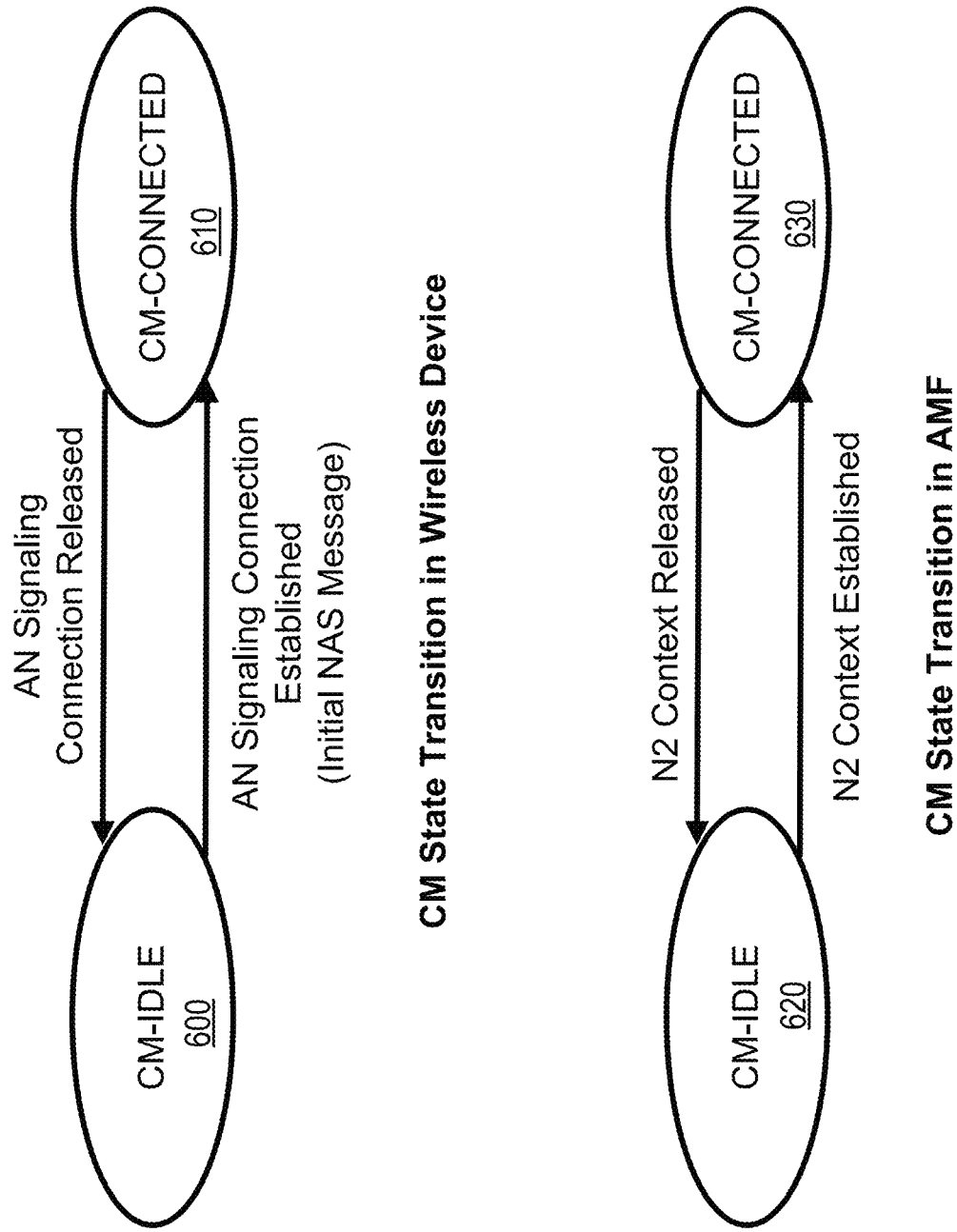
FIG. 6 shows examples of connection management state models for a wireless device and an AMF.

FIG. 6 depicts examples of CM state transitions as observed by the wireless device 100 and AMF 155. Connection management CM may comprise the functions of establishing and releasing a signaling connection between a wireless device 100 and the AMF 155 over N1. This signaling connection may be used to provide NAS signaling exchange between the wireless device 100 and a core network. The signaling connection may comprise both the AN signaling connection between the wireless device 100 and/or the (R)AN 105 (e.g. RRC connection over 3GPP access) and the N2 connection for this wireless device 100 between the AN and the AMF 155. The top half of FIG. 6 shows CM state transitions in the wireless device 100. Two CM states may be used for the NAS signaling connectivity of the wireless device 100 with the AMF 155: CM-IDLE 600 and CM-CONNECTED 610. A wireless device 100 in CM-IDLE 600 state may be in RM-REGISTERED 510 state that may have no NAS signaling connection established with the AMF 155 over N1. The wireless device 100 may perform cell selection, cell reselection, and PLMN selection. A wireless device 100 in CM-CONNECTED 610 state may have a NAS signaling connection with the AMF 155 over N1. RRC inactive state may apply to NG-RAN (e.g., it applies to NR and E-UTRA connected to 5G CN). The AMF 155 may provide (e.g., based on network configuration) assistance information to the NG (R)AN 105, for example, to assist the NG (R)AN's 105 decision as to whether the wireless device 100 may be sent to RRC inactive state. If a wireless device 100 may be CM-CONNECTED 610 with RRC inactive state, the wireless device 100 may resume the RRC connection (e.g., due to uplink data pending), may execute a mobile initiated signaling procedure (e.g., as a response to (R)AN 105 paging), and/or notify the network that it has left the (R)AN 105 notification area. NAS signaling connection management may comprise the functions of establishing and releasing a NAS signaling connection. NAS signaling connection establishment function may be provided by the wireless device 100 and the AMF 155 to establish a NAS signaling connection for a wireless device 100 in CM-IDLE 600 state. The procedure of releasing a NAS signaling connection may be initiated by the 5G (R)AN 105 node or the AMF 155.

The bottom half of FIG. 6 shows CM state transitions in the AMF 155. Two CM states may be used for a wireless device 100 at the AMF 155: CM-IDLE 620 and CM-CONNECTED 630. The state of CM-IDLE 600 in the wireless device 100 may correspond to the state of CM-IDLE 620 in the AMF 155. The state of CM-CONNECTED 610 in the wireless device 100 may correspond to the state of CM-CONNECTED 630 in the AMF 155. Reachability management of the wireless device 100 may detect whether a wireless device 100 may be reachable and/or provide the wireless device location (e.g., the access node in communication with the wireless device) for the network to reach the wireless device 100. This may be done by paging wireless device 100 and wireless device location tracking. The wireless device location tracking may comprise both wireless device registration area tracking and wireless device reachability tracking. Such functionalities may be either located at a 5GC (e.g., for a CM-IDLE 620 state) or an NG-RAN 105 (e.g., for a CM-CONNECTED 630 state).

The wireless device 100 and the AMF 155 may negotiate wireless device 100 reachability characteristics in CM-IDLE 600 and/or 620 states during registration and registration update procedures. A variety of wireless device reachability categories may be negotiated between a wireless device 100 and an AMF 155 for CM-IDLE 600 and/or 620 states, such as wireless device 100 reachability providing mobile device terminated data. The wireless device 100 may be CM-IDLE 600 mode and mobile initiated connection only (MICO) mode. The 5GC may support a PDU connectivity service that provides exchange of PDUs between a wireless device 100 and a data network identified by a DNN. The PDU connectivity service may be supported via PDU sessions that may be established, for example, after request from the wireless device 100.

A PDU session may support one or more PDU session types. PDU sessions may be established (e.g. after wireless device 100 request), modified (e.g. after wireless device 100 and 5GC request) and released (e.g., after wireless device 100 and 5GC request) using NAS SM signaling exchanged over N1 between the wireless device 100 and the SMF 160. The 5GC may be able to trigger a specific application in the wireless device 100 (e.g., after a request from an application server). If receiving that trigger message, the wireless device 100 may pass it to the identified application in the wireless device 100. The identified application in the wireless device 100 may establish a PDU session to a specific DNN.

Figure 7:
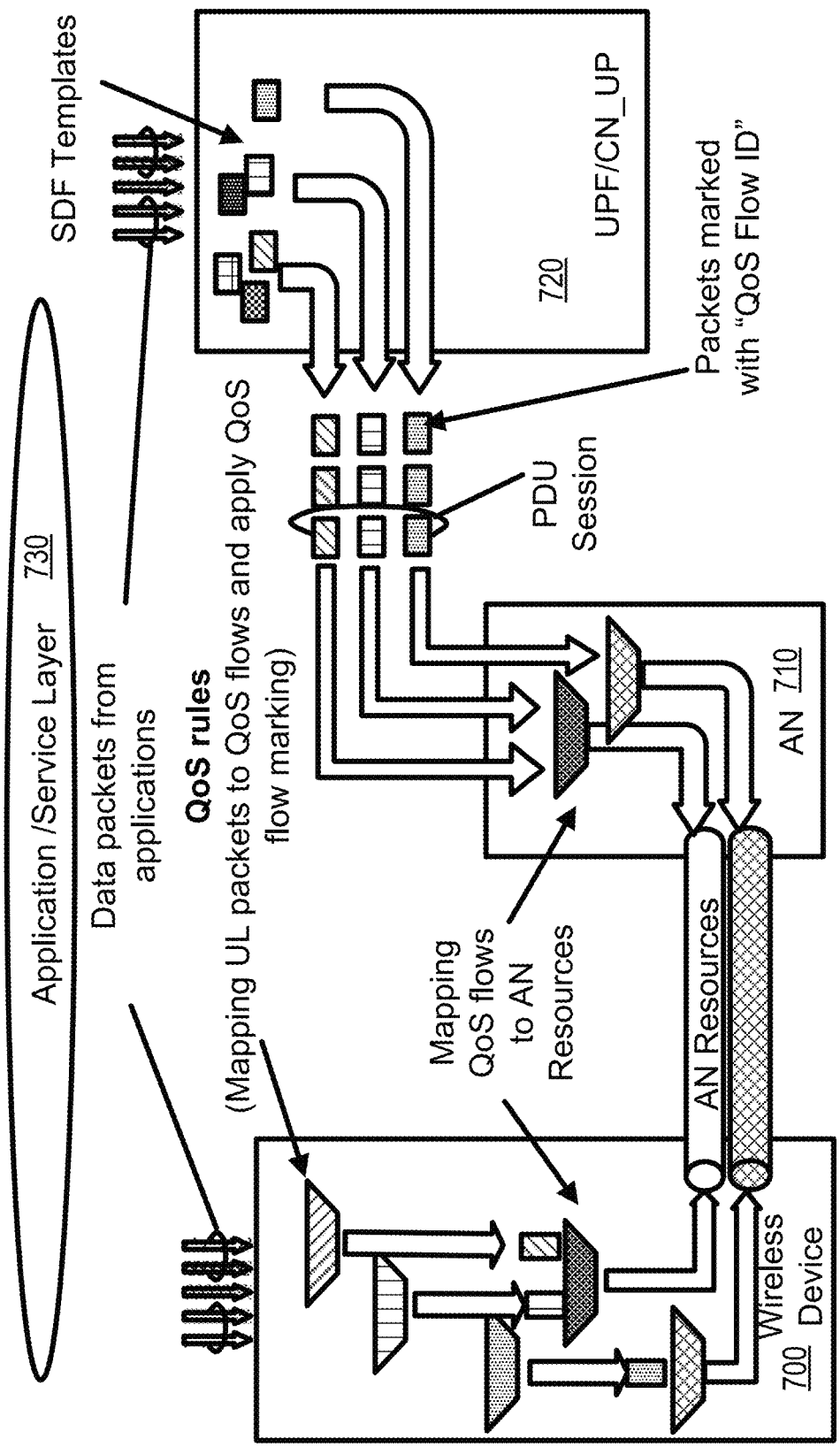
FIG. 7 shows an example for classifying and marking traffic.

FIG. 7 shows an example of a QoS flow based framework. A QoS model (e.g., a 5G QoS model) may support the QoS flow based framework. The QoS model may support both QoS flows that require a guaranteed flow bit rate and QoS flows that may not require a guaranteed flow bit rate. The QoS model may also support reflective QoS. The QoS model may comprise flow mapping or packet marking at the CN_UP 720, AN 710, and/or wireless device 700. Packets may arrive from and/or destined to the application/service layer 730 of wireless device 700, CN_UP 720, and/or an AF (e.g., the AF 145). QoS flow may be granular of QoS differentiation in a PDU session. A QoS Flow IDQFI may be used to identify a QoS flow in a 5G system. User plane traffic with the same QFI within a PDU session may receive the same traffic forwarding treatment. The QFI may be carried in an encapsulation header on N3 (and N9), for example, without any changes to an end-to-end packet header. The QFI may be used with PDUs having different types of payload. The QFI may be unique within a PDU session.

The QoS parameters of a QoS flow may be provided to the (R)AN as a QoS profile over N2 at a PDU session or at a QoS flow establishment, and an NG-RAN may be used, for example, if the user plane may be activated. A default QoS rule may be utilized for every PDU session. An SMF (e.g., SMF 160) may allocate the QFI for a QoS flow and may derive its QoS parameters from the information provided by the PCF. The SMF 160 may provide the QFI together with the QoS profile containing the QoS parameters of a QoS flow to the (R)AN 710. QoS flow may be granular for QoS forwarding treatment in a system (e.g., a 5GS). Traffic mapped to the same QoS flow may receive the same forwarding treatment (e.g., scheduling policy, queue management policy, rate shaping policy, RLC configuration, and/or the like). Providing different QoS forwarding treatment may require separate QoS flow. A QoS indicator may be used as a reference to a specific QoS forwarding behavior (e.g., packet loss rate, and/or packet delay budget) to be provided to a QoS flow. This QoS indicator may be implemented in the access network by the 5QI referencing node specific parameters that control the QoS forwarding treatment (e.g., scheduling weights, admission thresholds, queue management thresholds, link layer protocol configuration, and/or the like).

One or more devices (e.g., a 5GC) may support edge computing and may provide operators and/or third party services to be hosted close to the wireless device access point of attachment. The one or more devices (e.g., a 5GC) may select a UPF 110 close to the wireless device 100 and may execute the traffic steering from the UPF 110 to the LADN via a N6 interface. This selecting a UPF 110 close to the wireless device may be based on the wireless device subscription data, wireless device location, the information from application function AF 145, policy, and/or other related traffic rules. The one or more devices (e.g., a 5GC) may expose network information and capabilities to an edge computing application function. The functionality support for edge computing may comprise local routing where the one or more devices (e.g., a 5GC) may select UPF 110 to route the user traffic to the LADN, traffic steering where the one or more devices (e.g., a 5GC) selects the traffic to be routed to the applications in the LADN, session and service continuity to provide wireless device 100 and application mobility, user plane selection and reselection (e.g., based on input from application function), network capability exposure where the one or more devices (e.g., a 5GC) and application function may provide information to each other via NEF, QoS and charging where PCF may provide rules for QoS control and charging for the traffic routed to the LADN, and/or support of local area data network where the one or more devices (e.g., a 5GC) may provide support to connect to the LADN in a certain area where the applications are deployed.

An example system (e.g., a 5GS) may be a 3GPP system comprising of 5G access network 105, 5GC and a wireless device 100, and/or the like. Provided NSSAI may be an NSSAI provided by a serving PLMN, for example, during a registration procedure, indicating the NSSAI provided by the network for the wireless device 100 in the serving PLMN for the current registration area. A periodic registration update may be wireless device 100 re-registration at expiry of a periodic registration timer. A requested NSSAI may be a NSSAI that the wireless device 100 may provide to the network. A service-based interface may represent how a set of services may be provided/exposed by a given NF.

A PDU connectivity service may provide exchange of PDUs between a wireless device 100 and a data network. PDU session may be an association between a wireless device 100 and a data network, DN that provides a PDU connectivity service. The type of association may be IP, Ethernet, or unstructured. Service continuity may comprise an uninterrupted user experience of a service, for example, if the IP address and/or anchoring point change. Session continuity may comprise the continuity of a PDU session. For a PDU session of an IP type session, continuity may indicate that the IP address may be preserved for the lifetime of the PDU session. An uplink classifier may be a UPF functionality that aims at diverting uplink traffic, for example, based on filter rules provided by SMF, towards a data network.

The system architecture may support data connectivity and services enabling deployments to use techniques such as, but not limited to, network function virtualization and/or software defined networking. The system architecture may leverage service-based interactions between control plane (CP) network functions where identified. In system architecture, separation of the user plane (UP) functions from the control plane functions may be considered. A system may provide a network function to interact with other NF(s) directly if required. A system may reduce dependencies between the access network (AN) and the core network (CN). The architecture may comprise a converged access-agnostic core network with a common AN-CN interface that integrates different 3GPP and non-3GPP access types. A system furthermore may support a unified authentication framework, stateless NFs (e.g., where the compute resource may be decoupled from the storage resource), capability exposure, and/or concurrent access to local and centralized services. UP functions may be deployed close to the access network, for example, to support low latency services and access to LADNs.

A system may support roaming with both home routed traffic as well as local breakout traffic in the visited PLMN. An example architecture may be service-based and the interaction between network functions may be represented in a variety of ways. FIG. 1 shows an example service-based representation, where network functions within the control plane may provide other authorized network functions to access their services. This service-based representation shown in FIG. 1 may also comprise point-to-point reference points where necessary. FIG. 2 shows an example reference point representation, showing the interaction between the NF services in the network functions described by point-to-point reference point (e.g., N11) between any two network functions.

Establishment of user plane connectivity to a data network via a network slice instance(s) may comprise performing an RM procedure, for example, to select an AMF 155 that supports the required network slices, and establishing one or more PDU session(s) to the required data network via the network slice instance(s). The set of network slices for a wireless device 100 may be changed, for example, if the wireless device 100 may be registered with a network. The set of network slices for the wireless device 100 may be initiated by the network or the wireless device 100.

Ethernet over wireless communications may provide advantages to wireless communications and a user. For example, wireless communications services may be enhanced, and/or additional services may be made available, by using Ethernet over wireless communications. Additional data and/or different types of data may be accommodated using Ethernet over wireless communications. User specific services and/or device specific services may be provided by using Ethernet over wireless communications. Different priority, rates, and/or pricing may be implemented for services and/or applications by using Ethernet over wireless communications. Ethernet over wireless communications may comprise Ethernet over any wireless system, including but not limited to Ethernet over 5G or Ethernet over any legacy or future wireless communication system.

A packet data unit (PDU) session may be supported. The PDU session may be supported, for example in 5G, using one or more protocols such as IPv4, IPv6, or Ethernet, or the PDU session may be unstructured (e.g., a non-IP PDU). Ethernet may comprise a variety of networking technologies, such as those that may be used in local area networks (LANs), metropolitan area networks (MANs), wide area networks (WAN), or other networks. A data packet on an Ethernet link may be referred to as an Ethernet packet. An Ethernet packet may transport an Ethernet frame as its payload. With Ethernet over wireless communications, an Ethernet packet may be transferred over a wireless communication system (e.g., a 5G system).

Ethernet over wireless communications, such as Ethernet over 5G, may require information from outside of certain network devices (e.g., outside of a 5GC). For example, in some systems (e.g., in 5G) a control plane may not allocate medium access control (MAC) addresses and/or Ethertype to a wireless device for Ethernet over wireless communications. Certain network devices may not have source MAC addresses, destination MAC addresses, Ethertype, and/or other user specific and/or device specific information that may be necessary to serve Ethernet over wireless communications for a wireless device. A policy control device may require such information in order to provide policy information for servicing the wireless device using Ethernet over wireless communications. A session management device may require such user specific and/or device specific information to provide requested services for the wireless device and/or to implement any required policies for such services. A user plane function may require such information to detect Ethernet packet and/or to enforce policies. Additionally or alternatively, other devices in a network may require user specific and/or device specific information to provide Ethernet over wireless communications or the wireless device. A wireless device may provide, for example, an Ethernet packet filter that may comprise information necessary to serve an Ethernet over wireless communications for the wireless device. Additionally or alternatively, a data network outside of a core network (e.g., outside of a 5GC) may provide for example, an Ethernet packet filter that may comprise information necessary to serve an Ethernet over wireless communications for the wireless device.

Figure 8A:
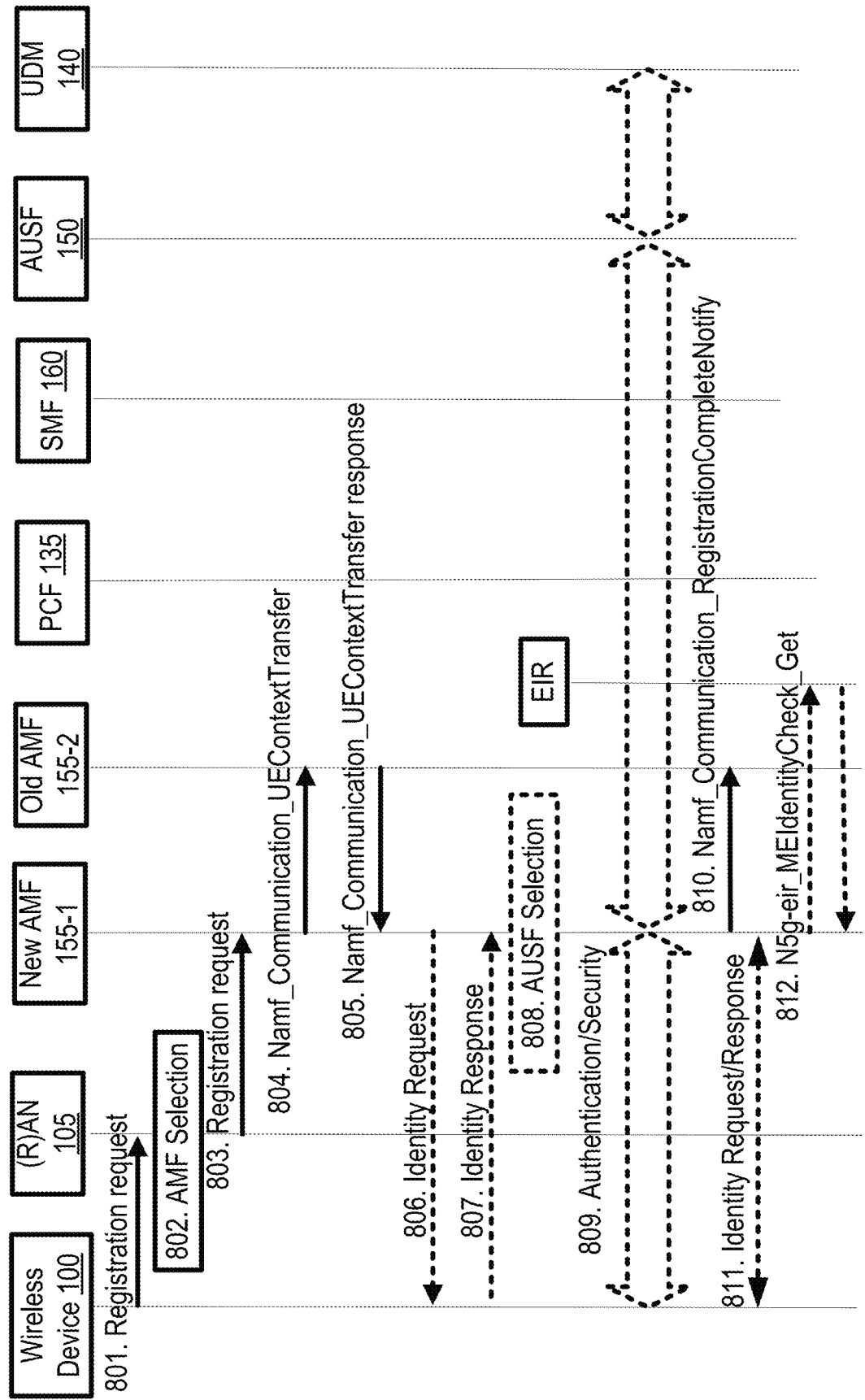
FIGS. 8A-B shows examples of registration procedures.
Figure 8B:
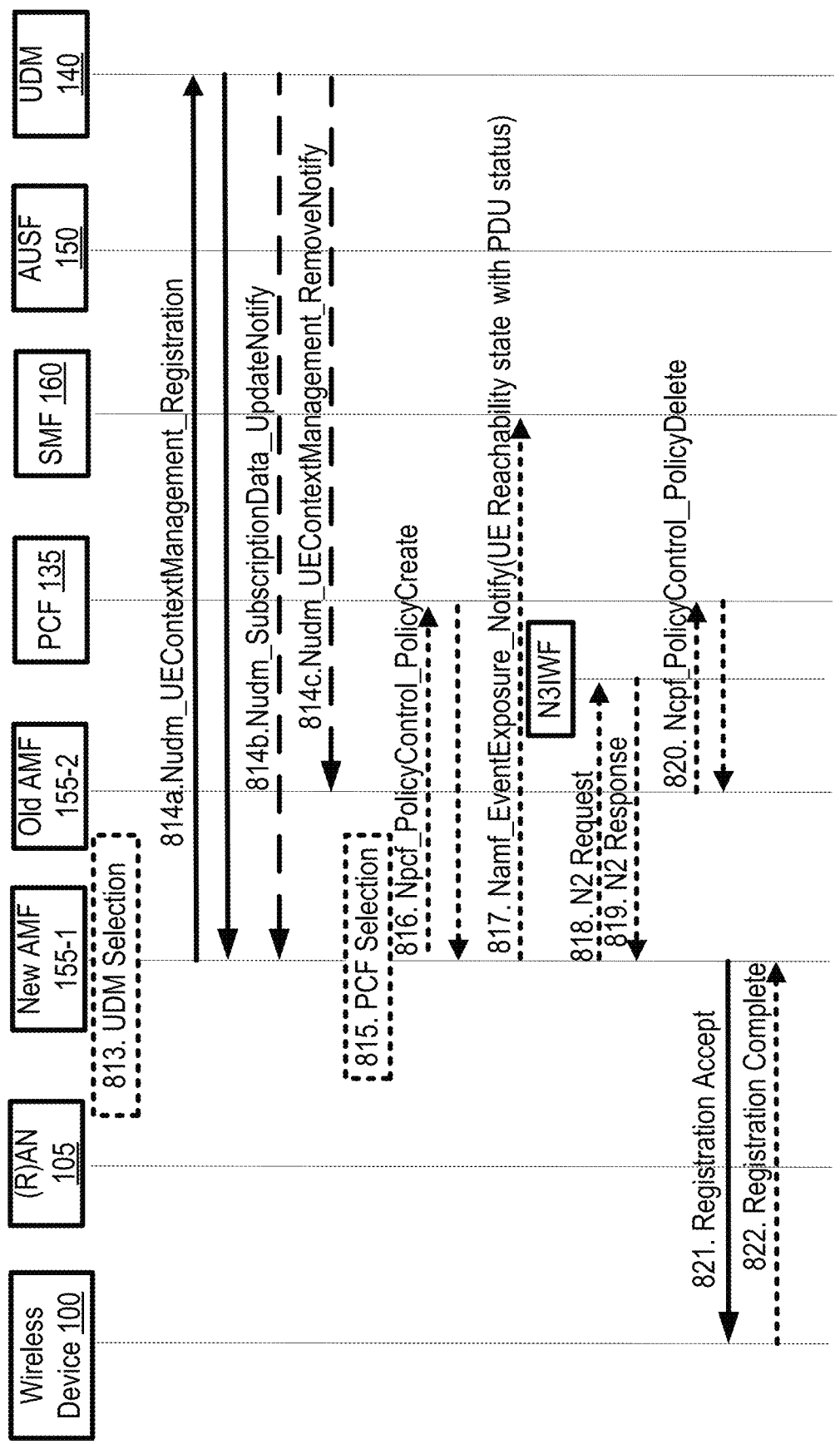

FIGS. 8A and 8B show connection, registration, and mobility management procedures. These procedures are described, for example, in "5G; Procedures for the 5G System," ETSI TS 123 502 version 15.2.0, also 3GPP TS 23.502 version 15.2.0 Release 15, dated June 2018 and published by the European Telecommunications Standards Institute.

At step 801 (in FIG. 8A), a wireless device (e.g., wireless device 100) may send a message comprising a registration request to a (R)AN (e.g., (R)AN 105). At step 802, the (R)AN 105 may perform an AMF selection. At step 803, the (R)AN 105 may send a message comprising the registration request to a new AMF (e.g., New AMF 155-1). At step 804, the New AMF 155-1 may send, to an old AMF (e.g., Old AMF 155-2), a message comprising an indication of a context transfer (e.g., Namf_Communication_UEContext-Transfer). At step 805, the Old AMF 155-2 may send, to the Old AMF 155-1, a response message comprising a context transfer response (e.g., Namf_Communication_UEContext-Transfer response). At step 806, the New AMF 155-1 may send, to the wireless device 100, a message comprising an identity request. At step 807, the wireless device 100 may send, to the New AMF 155-1, a message comprising an identity response. At step 908, the New AMF 155-1 may perform an AUSF selection. At step 809, authentication and/or security procedures may be performed between the wireless device 100 and the New AMF 155-1, between the New AMF 155-1 and an AUSF (e.g., AUSF 150), and/or between the AUSF 150 and a UDM (e.g., UDM 140). At step 810, the New AMF 155-1 may send, to the Old AMF 155-2, a message comprising a registration completion notification (e.g., Namf_Communication_RegistrationCompleteNotify). At step 811, messages comprising identity requests and/or responses may be communicated between the wireless device 100 and the New AMF 155-1. At step 812, the New AMF 155-1 may send to an EIR, and/or the EIR may send to the AMF 155-1, one or more messages associated with an identity check (e.g., N5g-eir_MEIdentityCheck_Get).

At step 813 (in FIG. 8B), the New AMF 155-1 may perform a UDM selection. At step 814a, the New AMF 155-1 may send, to the UDM 140, a message comprising a context management registration (e.g., Nudm_UEContext-Management_Registration). The UDM 140 may send, to the New AMF 155-1, a message comprising a response to the context management registration. At step 814b, the UDM 140 may send, to the New AMF 155-1, a message comprising a notification for a subscription data update (e.g., Nudm_SubscriptionDate_UpdateNotify). At step 814c, the UDM 140 may send, to the Old AMF 155-2, a message comprising a notification of a context management removal (e.g., Nudm_UEContextManagement_RemoveNotify). At step 815, the New AMF 155-1 may perform a PCF selection. At step 816, the New AMF 155-1 may send, to a PCF (e.g., PCF 135), a message comprising policy control or policy creation (e.g., Npcf_PolicyControl_PolicyCreate). The PCF 135 may send a response to the New AMF 155-1. At step 817, the New AMF 155-1 may send, to an SMF (e.g., SMF 160), a message comprising an event exposure notification (e.g., Namf_EventExposure_Notify (UE Reachability state with PDU status)). At step 818, the New AMF 155-1 may send, to a N3IWF, a message comprising an N2 request. At step 819, the N3IWF may send, to the New AMF 155-1, a message comprising an N2 response. At step 820, the Old AMF 155-2 may send, to the PCF 135, a message comprising a policy control and/or policy deletion (e.g., Ncpf_PolicyControl_PolicyDelete). The PCF 135 may send a response to the Old AMF 155-2. At step 821, the New AMF 155-1 may send, to the wireless device 100, a message comprising a registration acceptance (e.g., Registration Accept). At step 822, the wireless device 100 may send, to the New AMF 155-1, a message comprising a registration completion (e.g., Registration Complete). Steps indicated by dashed lines (e.g., steps 806-813, 815-820, and 821) may be optional.

FIG. 9 shows an example of an Ethernet packet and frame structure. An Ethernet packet and frame structure may correspond with the Ethernet packet and frame structure for IEEE 802.3. An Ethernet frame may be preceded by a preamble (e.g., 7 octets) and a start frame delimiter (SFD) (e.g., 1 octet), both of which may be part of an Ethernet packet at a physical layer. The Ethernet frame may start with an Ethernet header, which may comprise destination and/or source MAC addresses as its first two fields (e.g., 6 octets of MAC destination and 6 octets of MAC source). An optional 802.1Q tag (e.g., 4 octets) may follow the MAC addresses. Next, may be an Ethertype (e.g., in Ethernet II) or length (e.g., in IEEE 802.3) (e.g., 2 octets). Thereafter, a middle section of the frame may comprise payload data (e.g., 46-1500 octets), which may include, for example, any headers for other protocols (e.g., Internet Protocol) that may be carried in the frame. The frame may end with a frame check sequence (FCS) (e.g., 4 octets), which may comprise a 32-bit cyclic redundancy check that may be used to detect any in-transit corruption of data. An inter-packet gap (IPG) (e.g., 12 octets) may be provided at the end of the Ethernet packet. A layer 2 Ethernet frame may comprise 64 to 1522 octets after the preamble and the SFD. A layer 1 Ethernet packet may comprise 64 to 1522 octets including the preamble and the SFD, followed by an IPG of 12 octets.

A session management function (SMF) and/or a user plane function (UPF) may provide a PDU session anchor, for example, for a PDU session set up with an Ethernet PDU session type. The SMF and the UPF may support specific behaviors associated with a PDU session that may carry Ethernet frames. A MAC and/or an IP address may not be allocated, for example by a 5GC to a wireless device, for a PDU session. The UPF may store MAC addresses, for example, that may be received from a wireless device, and associate the MAC addresses with an appropriate PDU session.

A wireless device may operate in a bridge mode for connecting a LAN to a 5GS. Different MAC addresses may be used as source address of different frames that may be sent via an uplink over a single PDU session. Different destination MAC address of different frames that may be sent via a downlink, for example over the same PDU session as the uplink, may be used. Entities on the LAN that may be connected to a system (e.g., a 5GS) by the wireless device may be allocated an IP address by a data network. The data network may not be specified by 3GPP 5G specifications. A wireless device that may be connected to the system (e.g., a 5GS) may be the only wireless device that may be authenticated. For example, devices behind a wireless device that may be connected to the system (e.g., a 5GS) may not be authenticated.

Different Frames exchanged via a PDU session, such as an Ethernet type PDU session, may be served with different quality of service (QOS) over the system (e.g., a 5GS). An SMF may provide, to a UPF, traffic filters based on the Ethernet frame structure. A packet filter set may support packet filtering (e.g., for an Ethernet PDU session type) based on one or more of: source MAC address and/or destination MAC address; Ethertype (e.g., such as set forth by IEEE 802.3); customer-virtual Local Area Network (VLAN) tag (C-TAG) and/or service-VLAN tag (S-TAG) VLAN identifier (VID) fields (e.g., such as set forth in IEEE 802.1Q); C-TAG and/or S-TAG priority code point (PCP) and/or drop eligibility indicator (DEI) fields (e.g., such as set forth in IEEE 802.1Q); and/or IP packet filter set. Additionally or alternatively, for example for Ethertype indicates IPv4/IPv6 payload, the packet filter set may support packet filtering comprising one or more of: a source and/or destination IP address and/or a IPv6 prefix, a source and/or destination port number, a protocol ID of a protocol above IP and/or a next header type, a type of service (TOS) (e.g., for IPV4), a traffic class (e.g., for IPV6), a mask, a flow label (e.g., for IPV6), and/or a security parameter index.

Figure 10:
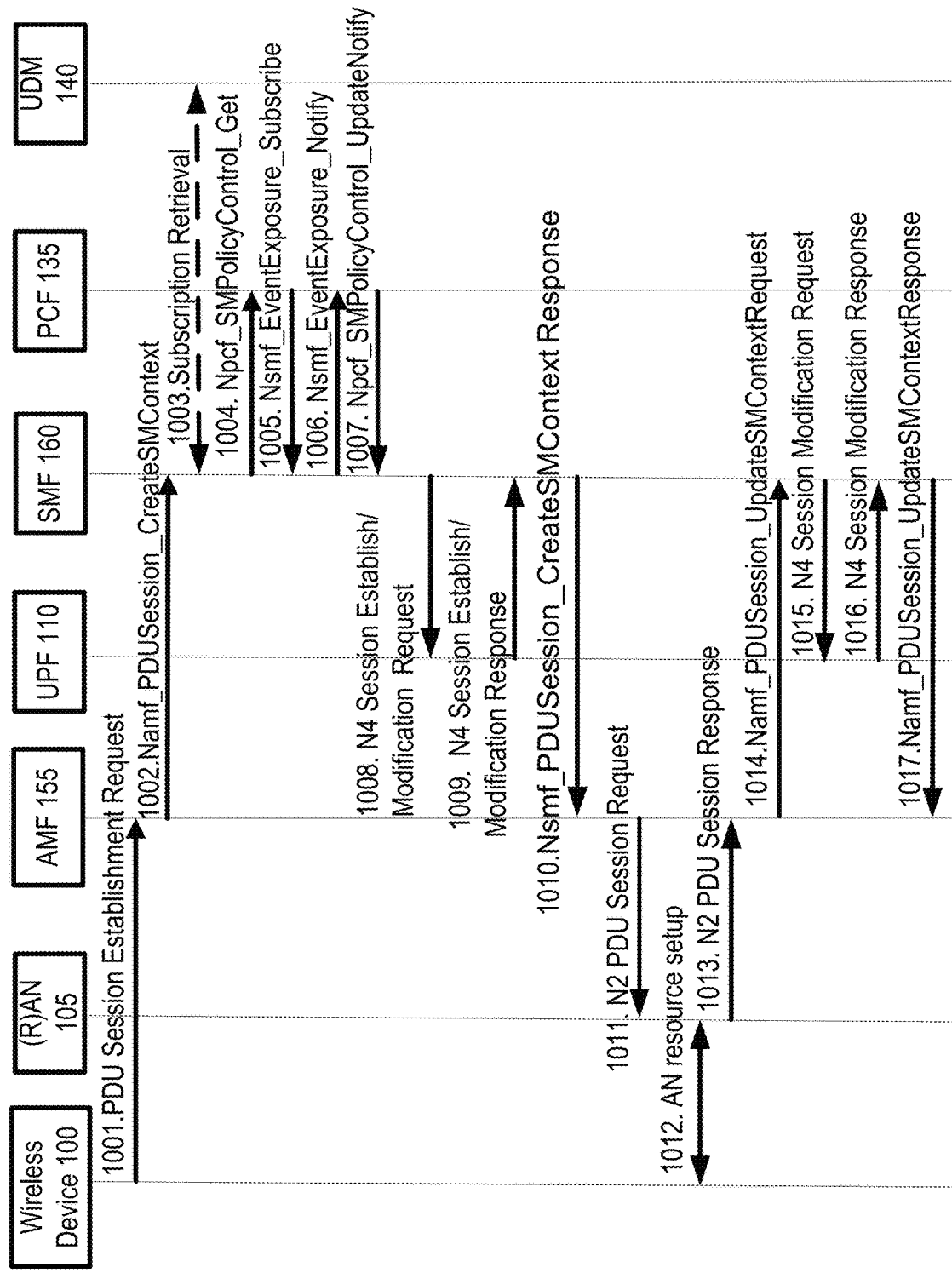
FIG. 10 shows an example of a PDU session establishment.

FIG. 10 shows an example of a PDU session establishment. The PDU session establishment may originate with a wireless device (e.g., wireless device 100) requesting a PDU session establishment. At step 1001, the wireless device 100 may send, to the AMF 155, a NAS message. The NAS message may comprise one or more of: S-NSSAI, DNN, PDU Session ID, request type, and/or an N1 SM container (e.g., comprising a PDU session establishment request). The wireless device 100 may initiate the PDU session establishment procedure, for example, by the transmission of a NAS message containing a PDU session establishment request within the N1 SM container. The PDU session establishment request may include, for example, one or more of: a PDU type (e.g., Ethernet), an SSC mode, a protocol configuration option, and/or a PDU session ID (e.g., that may be generated by the wireless device 100).

At step 1002, the AMF 155 may select an SMF (e.g., SMF 160) and send, to the selected SMF (e.g., SMF 160), a message. The message may comprise a PDU session create request (e.g., Nsmf_PDUSession_CreateSMRequest). The PDU session create request may comprise one or more of: SUPI, DNN, S-NSSAI, PDU session ID, AMF ID, request type, N1 SM container (e.g., comprising the PDU session establishment request), user location information, access type, and/or PEI.

At step 1003, the SMF 160 may register with the UDM 140, for example, if the SMF 160 has not yet registered and/or if subscription data is not available. The SMF 160 may retrieve subscription data. Subscribers may be notified, for example, if subscription data is modified. The SMF 160 may select an UPF and trigger a PDU session establishment authentication and/or authorization, for example, if the SMF 160 determines it should perform secondary authorization and/or authentication during the establishment of the PDU session by a DN-AAA server.

At step 1004, the SMF 160 may perform PCF selection (e.g., if dynamic PCC is deployed) and/or the SMF 160 may apply one or more local policies (e.g., if dynamic PCC is not deployed). The SMF 160 may invoke an operation (e.g., a Npcf_SMPolicyControl_Get operation), for example, to establish a PDU session with the PCF 135 and/or to obtain the default PCC rules for the PDU session.

At step 1005, the PCF 135 may subscribe one or more events in the SMF 160, for example, by invoking an operation (e.g., a Nsmf_EventExposure_Subscribe operation). At step 1006, the SMF 160 may report one or more events to the PCF 135 that were previously subscribed, for example, by invoking a service operation (e.g., a Nsmf_EventExposure_Notify service operation). At step 1007, the PCF 135 may provide updated policies to the SMF 160, for example, by invoking a service operation (e.g., a Npcf_SMPolicyControl_UpdateNotify service operation). The PCF 135 may provide, to the SMF 160, authorized Session-AMBR and/or the authorized 5QI/ARP.

At step 1008, the SMF 160 may initiate an N4 session establishment procedure with the selected UPF 110, for example, if a request type indicates and initial request and/or if a PDU session establishment authentication and/or authorization was not performed. Additionally or alternatively, the SMF 160 may initiate an N4 session modification procedure with the selected UPF 110, for example, by the SMF 160 sending an N4 session establishment and/or modification request to the UPF 110, and/or by providing one or more packet detection, enforcement and/or reporting rules that may be installed on the UPF 110 for the PDU session. The CN tunnel info may be provided to UPF 110 at step 1008, for example, if CN tunnel info is allocated by the SMF 160.

At step 1009, the UPF 110 may acknowledge the SMF 160, for example, by sending an N4 session establishment and/or modification response. The CN tunnel info may be provided to SMF 160 at step 1009, for example, if CN tunnel info is allocated by the UPF 110.

At step 1010, the SMF 160 may send, to the AMF 155, one or more messages comprising a response message. The response message (e.g., Nsmf_PDUSession_CreateSM Response) may comprise one or more of: cause information, N2 SM information, and/or N1 SM container. The N2 SM information may comprise one or more of a PDU session ID, QoS profile, SN tunnel information, or S-NSSAI, session-AMBR. The N1 SM container may comprise a PDU session establishment accept. The PDU session establishment accept may comprise one or more of a: QoS rule, SSC mode, S-NSSAI, allocated IPv4 address, or session-AMBR. The N2 SM information may comprise information that the AMF 155 may forward to the (R)AN 105. The CN tunnel information may correspond to the Core Network address of the N3 tunnel corresponding to the PDU Session. The QoS profile may provide the (R)AN 105 with the mapping between QoS parameters and QoS flow identifiers. Multiple QoS profiles may be provided to the (R)AN 105. The PDU session ID may be used by AN signaling with the wireless device 100 to indicate to the wireless device 100 an association between AN resource and a PDU Session for the wireless device 100.

At step 1011, the AMF 155 may send, to the (R)AN 105, an N2 PDU session request. The N2 PDU session request may comprise one or more of N2 SM information or a NAS message. The NAS message may comprise one or more of: a PDU session ID and/or an N1 SM container (e.g., a PDU session establishment accept message). The AMF 155 may send the NAS message comprising a PDU session ID and a PDU session establishment accept messages (e.g., that may be targeted to the wireless device 100), and N2 SM information that may be received from the SMF 160, within the N2 PDU session request to the (R)AN 105.

At step 1012, the (R)AN 105 may send, to the wireless device 100, one or more messages for an AN resource setup. The wireless device 100 may send, to the (R)AN 150 one or more messages for the AN resource setup. The (R)AN 105 may issue an AN specific signaling exchange with the wireless device 100 that may be related to the information received from SMF 160. For example, an RRC connection reconfiguration (e.g., for a 3GPP RAN) may take place with the wireless device 100 establishing the necessary RAN resources related to the QoS rules for the PDU session request received at step 1010. The (R)AN 105 may allocate (R)AN N3 tunnel information for the PDU session. The (R)AN 105 may forward the NAS message (e.g., comprising one or more of a PDU session ID, or N1 SM container such as a PDU session establishment accept message) that may be provided at step 1010 to the wireless device 100. The (R)AN 105 may provide the NAS message to the wireless device 100, for example, if the necessary RAN resources have been established and/or the allocation of (R)AN tunnel information has been successful.

At step 1013, the (R)AN 105 may send, to the AMF 155, an N2 PDU session response. The N2 PDU session response may comprise one or more of: a PDU session ID, a cause message, and/or N2 SM information. N2 SM information may comprise one or more of: a PDU Session ID, (R)AN tunnel information, and/or a list of accepted and/or rejected QoS profile(s). The (R)AN tunnel info may correspond to the access network address of the N3 tunnel corresponding to the PDU session.

At step 1014, the AMF 155 may send, to the SMF 160, an SM context request message (e.g., Nsmf_PDUSession_UpdateSMContext Request). The SM context request message may comprise, for example, N2 SM information. The AMF 155 may forward the N2 SM information, that may be received from the (R)AN 105, to the SMF 160.

At step 1015, the SMF 160 may initiate an N4 session establishment procedure with the UPF 110 (e.g., if the N4 session for the PDU session was not already established). Additionally or alternatively, the SMF 160 may initiate an N4 session modification procedure with the UPF 110. The SMF 160 may provide AN tunnel information and CN tunnel information. The CN tunnel information may need to be provided, for example, if the SMF 160 selected CN tunnel info.

At step 1016, the UPF 110 may provide an N4 session establishment and/or modification response to the SMF 160.

At step 1017, the SMF 160 may send, to the AMF 155, an SM context response message (e.g., Nsmf_PDUSession_UpdateSMContext Response). The SM context response message may comprise a cause message. The AMF 155 may forward relevant events to the SMF 160, for example, after step 1017 and/or for a handover where the (R)AN tunnel information may change and/or the AMF may be relocated.

Figure 11:
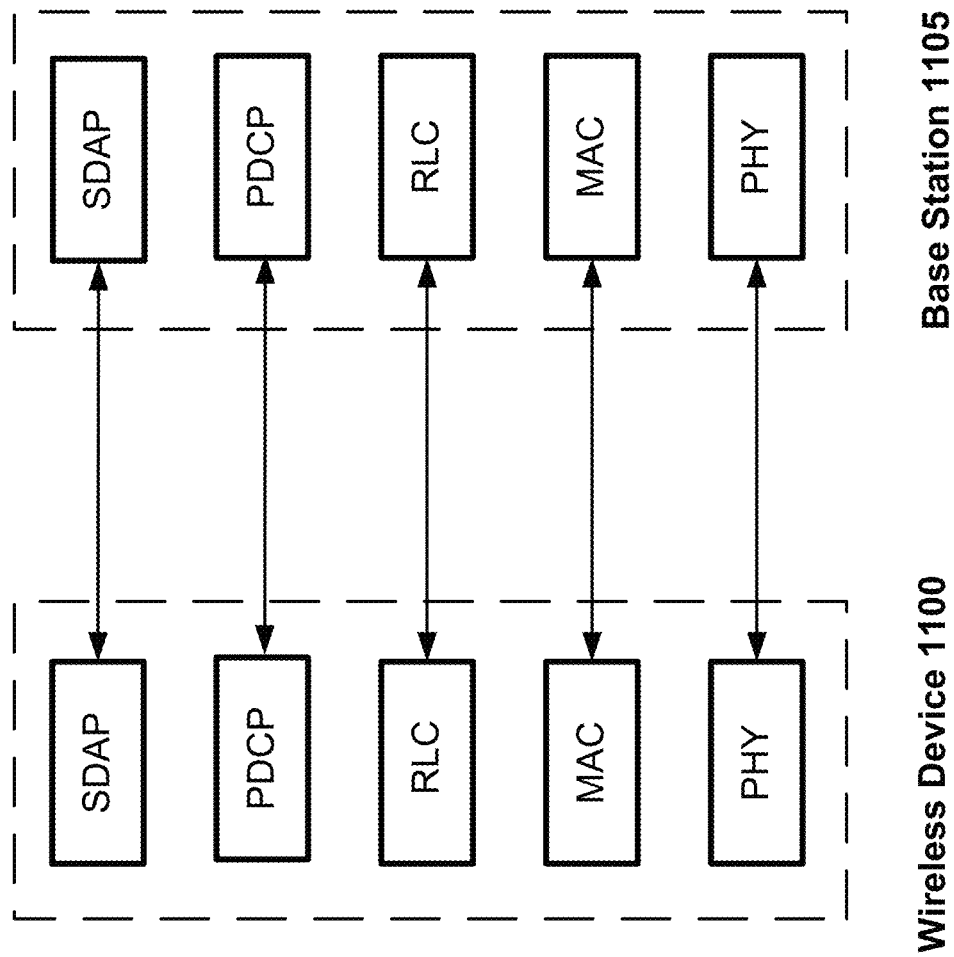
FIG. 11 shows an example of a user plane protocol stack.

FIG. 11 shows an example of a user plane protocol stack. The user plane protocol stack between the wireless device 100 and the (R)AN 105 may comprise, for example, service data adaptation protocol (SDAP), PDCP, RLC, MAC, and PHY sublayers. The main services and functions of the PDCP sublayer for the user plane may comprise, for example one or more of: sequence numbering; header compression and decompression (e.g., ROHC); transfer of user data; reordering and duplicate detection; PDCP PDU routing (e.g., for split bearers); retransmission of PDCP SDUs; ciphering, deciphering, and integrity protection; PDCP SDU discard; PDCP re-establishment and data recovery for RLC AM; and/or duplication of PDCP PDUs.

The main services and functions of the PDCP sublayer for the control plane may comprise, for example, one or more of: sequence numbering; ciphering, deciphering, and integrity protection; transfer of control plane data; duplicate detection; and/or duplication of PDCP PDUs. For the header compression and decompression function of the PDCP sublayer, the header compression protocol may be based on the Robust Header Compression (ROHC) framework (e.g., such as in IETF RFC 5795: "The RObust Header Compression (ROHC) Framework"). There may be multiple header compression algorithms, called profiles, defined for the ROHC framework. A profile may be specific to the particular network layer, transport layer, or upper layer protocol combination (e.g., TCP/IP and RTP/UDP/IP). The ROHC channel may be specified as part of the ROHC framework (e.g., such as in IETF RFC 5795). The ROHC framework may include how to multiplex different flows (e.g., header compressed or not) over the ROHC channel, and/or how to associate a specific IP flow with a specific context state (e.g., during initialization of the compression algorithm for that flow). The implementation of the functionality of the ROHC framework and/or of the functionality of the supported header compression profiles may not covered in the 3GPP specifications. The following profiles may be supported, for example, by 3GPP 5G specification TS 38.323:

TABLE 1

Supported header compression protocols and profiles

| Profile Identifier | Usage | Reference |
|---|---|---|
| 0x0000 | No compression | RFC 5795 |
| 0x0001 | RTP/UDP/IP | RFC 3095, RFC 4815 |
| 0x0002 | UDP/IP | RFC 3095, RFC 4815 |
| 0x0003 | ESP/IP | RFC 3095, RFC 4815 |
| 0x0004 | IP | RFC 3843, RFC 4815 |
| 0x0006 | TCP/IP | RFC 6846 |
| 0x0101 | RTP/UDP/IP | RFC 5225 |
| 0x0102 | UDP/IP | RFC 5225 |
| 0x0103 | ESP/IP | RFC 5225 |
| 0x0104 | IP | RFC 5225 |

The PDCP Data PDU may be used to convey one or more of: a PDCP SDU SN; user plane data; control plane data; and/or a MAC-I.

Figure 12:
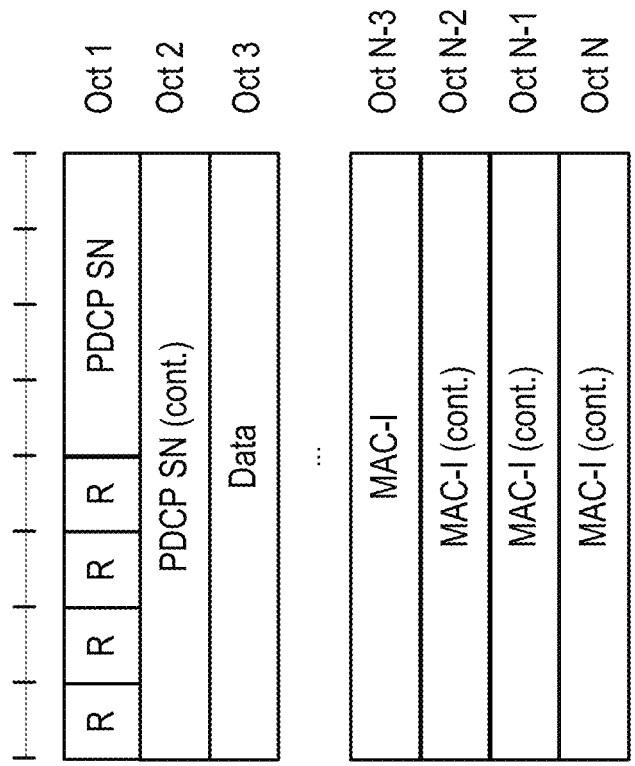
FIG. 12 shows an example of a packet data convergence protocol (PDCP) data PDU.

FIG. 12 shows an example of a PDCP data PDU. A PDCP data PDU with 12 bits in PDCP SN may be used for signaling radio bearers carrying control plane data (SRBs). A PDCP PDU may be a bit string that is byte aligned (e.g., arranged in multiple of 8 bits) in length. Bit strings may be represented by tables in which the most significant bit may be the leftmost bit of the first line of the table (e.g., in Table 1), the least significant bit may be the rightmost bit on the last line of the table, and more generally, the bit string may to be read from left to right and in the reading order of the lines. The bit order of a parameter field within a PDCP PDU may be represented with the first and most significant bit in the leftmost bit and the last and least significant bit in the rightmost bit. PDCP SDUs may be bit strings that may be byte aligned in length. A compressed or uncompressed SDU may be included into a PDCP Data PDU from the first bit onward. The PDCP control PDU may be used to convey one or more of a PDCP status report or an interspersed ROHC feedback.

Figure 13:
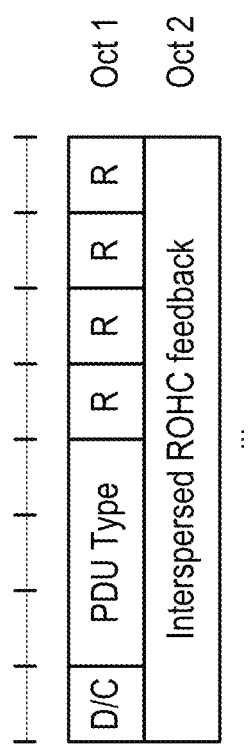
FIG. 13 shows an example of a PDCP control PDU.

FIG. 13 shows an example of a PDCP control PDU. The PDCP control PDU may carry one interspersed ROHC feedback that may be applicable for a data radio bearer which may utilize RLC UM (e.g., UM DRBs), and for a data radio bearer which may utilize RLC AM (e.g., AM DRBs). The PDU type may indicate the type of control information included in the corresponding PDCP control PDU, such as shown in Table 2 below.

TABLE 2

PDU type

| Bit | Description |
|---|---|
| 000 | PDCP status report |
| 001 | Interspersed ROHC feedback |
| 010-111 | Reserved |

Figure 14:
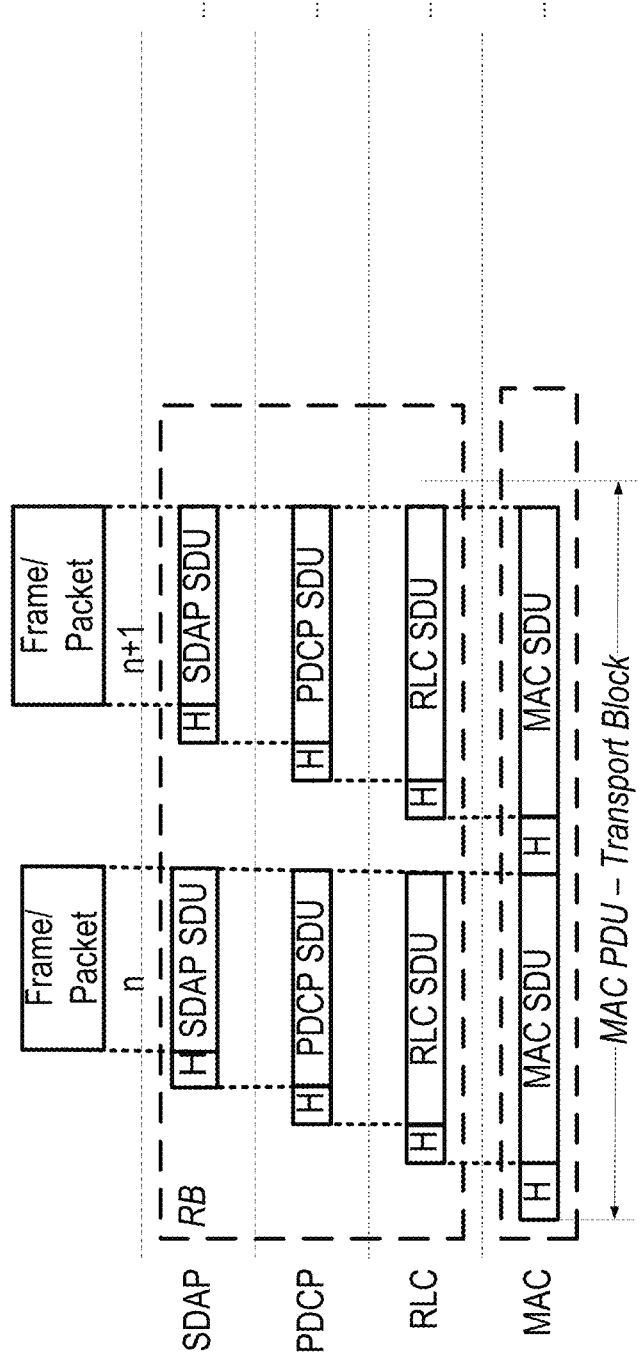
FIG. 14 shows an example layer 2 data flow.

FIG. 14 shows an example of a layer 2 data flow. A transport block may be generated at a MAC layer, for example, by concatenating two RLC PDUs from a radio bearer (RB). The two RLC PDUs from the RB may each correspond to one Ethernet frame and/or IP packet (e.g., n and/or n+1). Headers and subheaders may be represented by "H".

A system (e.g., a 5G system) may support an Ethernet type PDU session. For an Ethernet PDU session type, an Ethernet packet filter set may be used, for example in one or more QoS rules and/or SDF template, to identify a QoS flow.

The packet filter set (e.g., for an Ethernet PDU session type) may support packet filtering based on any combination of one or more of: source MAC address and/or destination MAC address; Ethertype (e.g., such as set forth by IEEE 802.3); customer-VLAN tag (C-TAG) and/or service-VLAN tag (S-TAG) VID fields (e.g., such as set forth in IEEE 802.1Q); C-TAG and/or S-TAG PCP/DEI fields (e.g., such as set forth in IEEE 802.1Q); and/or IP packet filter set (e.g., if Ethertype indicates IPv4 and/or IPv6 payload).

Ethernet type PDU sessions may be difficult to implement. Some legacy technologies may not support and/or transfer traffic of Ethernet type PDUs. Enhanced signaling mechanisms may be provided, however, to support traffic of Ethernet type PDUs. For example, signaling mechanisms and/or network protocols may provide capability to transmit and/or receive a wireless device MAC profile and/or an IP profile among network nodes. The wireless device MAC profile and/or an IP profile may be provided to improve network performance, for example, by providing capability to establish an Ethernet type PDU session. One or more devices (e.g., in a 5GC) may not allocate to a wireless device a MAC address and/or an IP address for an Ethernet type PDU session. Network signaling and/or performance may be improved by providing information for an Ethernet type PDU session. A UPF may receive one or more of: a source MAC address, a destination MAC address, and/or an Ethernet packet filter set. The UPF may associate one or more MAC addresses with a PDU session. Information associated with a wireless device may be provided, such as MAC addresses, Ethertype, customer-VLAN tag (C-TAG) and/or service-VLAN tag (S-TAG) VID, C-TAG and/or S-TAG PCP and/or DEI, and/or an IP packet filter set (e.g., if Ethertype indicates an IPV4 and/or an IPV6 payload). An SMF and/or a PCF may create and/or determine a corresponding policy (e.g., QoS control, charging control, gating, etc.) that may require packet filter information, for example, to detect a service data flow and/or a QoS flow. A UPF may receive one or more policies from an SMF, for example, to detect and/or process a service data flow and/or a QoS flow. A UPF may store one or more MAC addresses (e.g., that may be received from the wireless device). The UPF may associate one or more MAC addresses with a PDU session (e.g., an Ethernet PDU session).

Figure 15A:
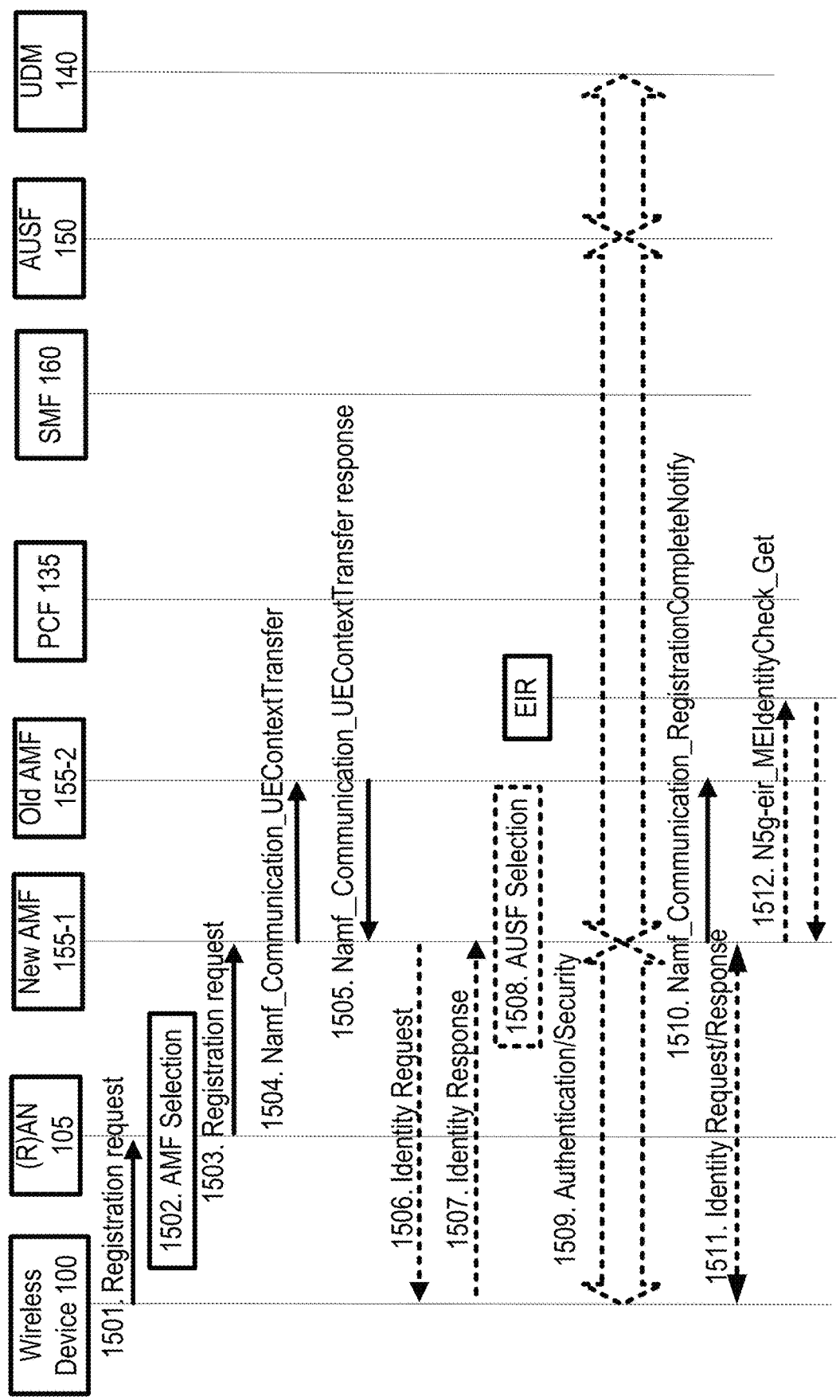
FIGS. 15A, 15B, 15C, and 15D show examples of registration procedures.
Figure 15B:
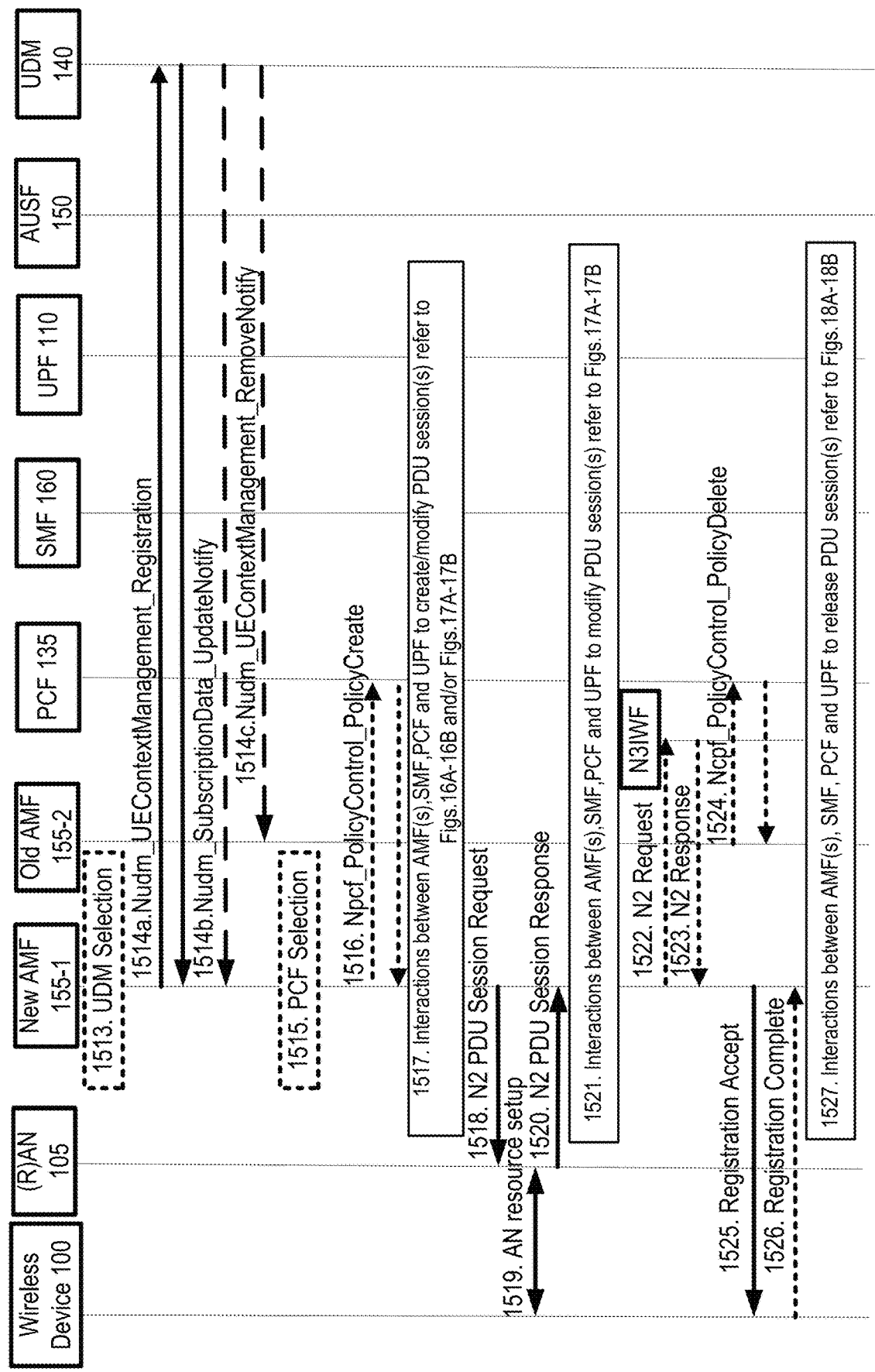
Figure 15C:
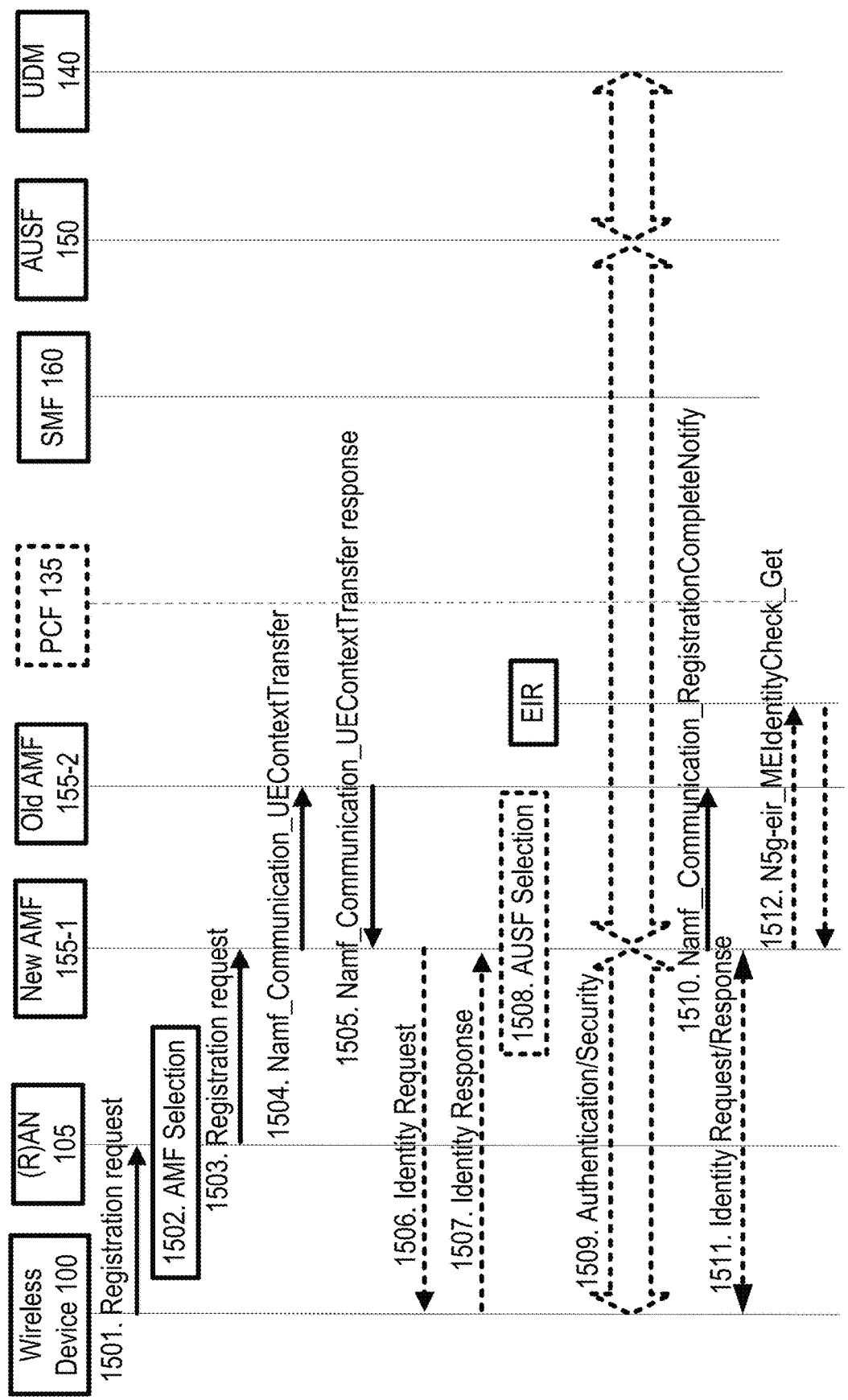
Figure 15D:
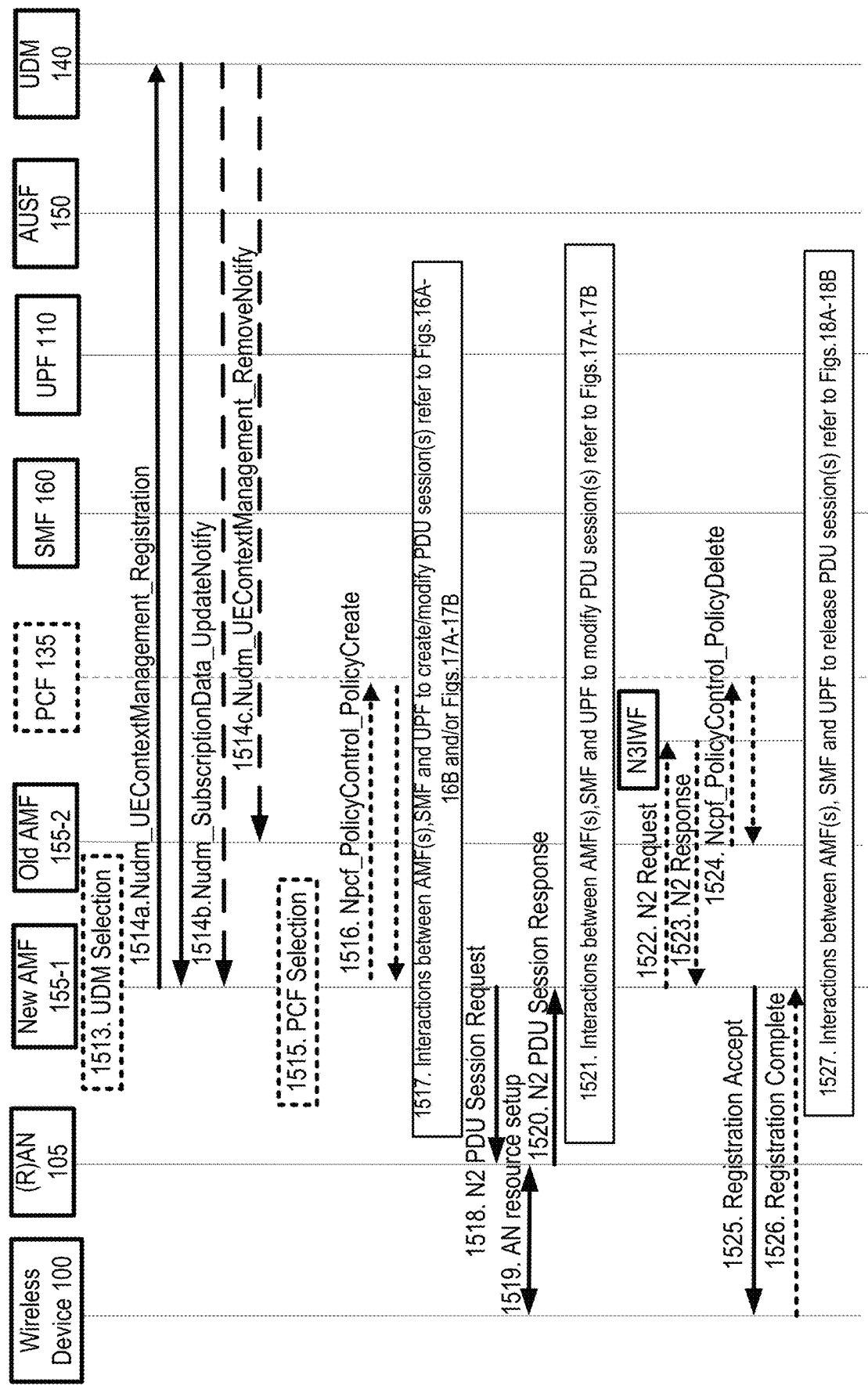

FIGS. 15A-15D show examples of registration procedures. A wireless device (e.g., wireless device 100) may perform a registration procedure, for example, in a CM-IDLE state. FIGS. 15A and 15B show registration procedures that may involve a PCF (e.g., PCF 135). FIGS. 15C and 15D show registration procedures that may not involve a PCF (e.g., PCF 135). Steps 1501-1512 in FIG. 15A correspond to steps 1501-1512, respectively, in FIG. 15C, unless otherwise indicated. Steps 1513-1527 in FIG. 15B correspond to steps 1513-1527, respectively, in FIG. 15D, unless otherwise indicated.

At step 1501 (in FIGS. 15A and 15C), a wireless device (e.g., wireless device 100) may send a registration request to a (R)AN 105. The registration request may comprise an AN message. The AN message may comprise one or more of: an AN parameter or an RM-NAS registration request. An RM-NAS registration request may comprise one or more of: a registration type, a SUPI or 5G-GUTI, a security parameter, an NSSAI, a device capability (e.g., a 5GCN capability of a wireless device), a PDU session status, a PDU session to be re-activated, a follow on request, and/or a MICO mode preference. A wireless device (e.g., wireless device 100) may include in the registration request one or more of Ethernet packet filter sets. An Ethernet packet filter set may be identified on a per device basis (e.g., per wireless device identified by a wireless device identifier), on a per data network basis (e.g., per APN, which may be indicated by a DNN), on a per network slice basis (e.g., indicated by an S-NSSAI); and/or on a per PDU session (e.g., indicated by a PDU session ID). An Ethernet packet filter set may comprise one or more of: a source MAC address, a destination MAC address; an Ethertype (e.g., as set forth in IEEE 802.3); a C-TAG and/or S-TAG VID field (e.g., as set forth in IEEE 802.1Q); a C-TAG and/or S-TAG PCP and/or DEI field (e.g., as set forth in IEEE 802.1Q); and/or an IP packet filter set (e.g., if Ethertype indicates an IPv4 payload and/or an IPV6 payload). An IP packet filter set may comprise one or more of: a source IP address, a destination IP address, and/or an IPv6 prefix; a source port number and/or a destination port number; a protocol ID of the protocol above IP and/or a next header type; a type of service (TOS) (e.g., for IPV4), a traffic class (e.g., for IPV6), and/or a mask; a flow label (e.g., for IPV6); and/or a security parameter index. A device identifier may indicate a user identity and/or an identifier of a wireless device. The device identifier may comprise a wireless device network access identifier, a SUPI, a 5G-GUTI, and/or other wireless device identifier(s).

At step 1502 (in FIGS. 15A and 15C), the (R)AN 105 may perform an AMF selection. The (R)AN 105 may select an AMF (e.g., AMF 155-1) based on a (R)AT and/or an NSSAI, if available. The (R)AN 105 may select an AMF, for example, if a SUPI is included and/or if a valid AMF is not indicated (e.g., such as by a 5G GUTI). The (R)AN 105 may select the new AMF 155-1.

At step 1503 (in FIGS. 15A and 15C), the (R)AN 105 may send, to the selected AMF (e.g., the new AMF 155-1), a message comprising a registration request. The message may comprise one or more of: N2 parameters and/or an RM-NAS registration request. The registration request may comprise one or more of: a registration type, a subscriber permanent identifier (e.g., a 5G-GUTI), a security parameter, an NSSAI and/or a MICO mode preference, a PDU session status, and/or a PDU session(s) (e.g., that may be determined to be re-activated). The message comprising the registration request may comprise one or more Ethernet packet filter set(s) information that may have been received from the wireless device 100.

At step 1504 (in FIGS. 15A and 15C), the new AMF 155-1 may send, to the old AMF 155-2, a context transfer message. The new AMF 155-1 may invoke, for example, the Namf_Communication_UEContextTransfer service operation on the old AMF 155-2, for example, if an identifier (e.g., a 5G-GUTI of the wireless device 100) was included in the registration request and/or if the serving AMF 155-2 has changed since a last registration. The context transfer message may comprise a complete registration request information element, which may be integrity protected, to request the wireless device 100 SUPI and/or MM context information.

At step 1505 (in FIGS. 15A and 15C), the old AMF 155-2 may send, to the new AMF 155-1, a response message. The old AMF 155-2 may respond to the new AMF 155-1 with a response (e.g., a Namf_Communication_UEContextTransfer response) comprising the wireless device 100 SUPI and/or MM context information. If the old AMF 155-2 has information about active PDU sessions, the old AMF 155-2 may include in an existing PDU session(s) (e.g., which may have been established before the response message) one or more of: SMF information (e.g., SMF identities and/or SMF addresses); UPF information (e.g., UPF identities and/or UPF addresses); PDU session ID(s); wireless device address (e.g., for IPV4) and/or wireless device prefix (e.g., for IPV6) if available; and/or DNN if available.

At step 1506 (in FIGS. 15A and 15C), the new SMF 155-1 may send, to the wireless device 100, a message comprising an identity request. An identity request procedure may be initiated by the new AMF 155-1 sending an identity request message to the wireless device 100, for example, if the SUPI is not provided by the wireless device 100 and/or if the SUPI is not retrieved from the old AMF 155-2.

At step 1507 (in FIGS. 15A and 15C), the wireless device 100 may send, to the new AMF 155-1, a message comprising an identity response. The wireless device 100 may respond to the identity request from step 1506 with an identity response message, to the new AMF 155-1, that comprises the SUPI.

At step 1508 (in FIGS. 15A and 15C), the new AMF-1 may perform an AUSF selection. The new AMF 155-1 may decide to invoke an AUSF selection, for example, after receiving the identity response from step 1507.

At step 1509 (in FIGS. 15A and 15C), authentication and/or security processes may be performed. For example, the AUSF 150 may initiate authentication of the wireless device 100, and/or the new AMF 155-1 may initiate NAS security functions.

At step 1510 (in FIGS. 15A and 15C), the new AMF 155-1 may send, to the old AMF 155-2, a message comprising a registration complete notification. The new AMF 155-1 may indicate to the old AMF 155-2 that a registration of the wireless device 100 in the New AMF 155-1 has a been completed, for example, by invoking Namf_Communication_RegistrationCompleteNotify service operation.

At step 1511 (in FIGS. 15A and 15C), the new AMF 155-1 may send, to the wireless device 100, a message comprising an identity request. The wireless device 100 may send, to the new AMF 155-1, a response to an identity request (e.g., which may provide an indication of the identity of the wireless device 100). The identity request procedure may be initiated by the AMF 155-1 sending an identity request message to the wireless device 100 to retrieve a PEI, for example, if the PEI was not provided by the wireless device 100 and/or if the PEI was not retrieved from the old AMF 155-2.

At step 1512 (in FIGS. 15A and 15C), the new AMF 155-1 may send, to the old AMF 155-2, a message comprising an identity check. The old AMF 155-2 may send, to the new AMF 155-1, a message comprising a response to the identity check (e.g., which may provide a confirmation of the identity of the wireless device 100). The New AMF 155-1 may initiate an ME identity check, for example, by invoking an N5g-eir_MEIdentityCheck_Get service operation.

At step 1513 (in FIGS. 15B and 15D), the new AMF 155-1 may perform a UDM selection. The new AMF 155-1 may select a UDM (e.g., the UDM 140) based on the SUPI.

At step 1514 (in FIGS. 15B and 15D), registration, update, and removal messages may be sent between the UDM 140 and the new AMF 155-1 and/or the old AMF 155-2. At step 1514a, the new AMF 155-1 may invoke a registration, for example, by sending a message (e.g., Nudm_UEContextManagement_Registration) to the UDM 140. The new AMF 155-1 may invoke the registration, for example, if the AMF has changed since a last registration, if the wireless device 100 provides a SUPI that does not refer to a valid context in the AMF 155-1, and/or if the wireless device 100 registers to an AMF that it has already registered for other access (e.g., a non-3GPP access, such that the UE is registered over a non-3GPP access and initiates the registration procedure to add a 3GPP access). A subscription data retrieval indication may be included, for example, if there is no subscription context for the UE in the New AMF 155-1. The new AMF 155-1 may provide the access type it serves for the wireless device 100 to the UDM 140. The access type may be set to a particular access type, such as a 3GPP access. The UDM 140 and/or the AMF 155-1 may store the associated access type. At step 1514b, the UDM 140 may invoke a service operation (e.g., the Nudm_SubscriptionData_UpdateNotification) to provide subscription data from the UDM 140 to the new AMF 155-1, for example, if the subscription data retrieval indication was included in step 1514a. If the UDM 140 stores the associated access type, it may cause the UDM 140 to initiate a removal, a message (e.g., Nudm_UEContextManagement_RemoveNotification), to the old AMF 155-2 that may correspond to a particular access (e.g., 3GPP access). The old AMF 155-2 may remove the MM context of the wireless device 100, for example, after or in response to receiving a message from the UDM 140, for example, as part of the removal procedure.

At step 1515 (in FIG. 15B), the new AMF 155-1 may perform a PCF selection. The new AMF 155-1 may select a PCF, for example, based on one or more of: the SUPI; an Ethernet MAC address; a wireless device address (e.g., for IPV4); a prefix (e.g., for IPV6) of an Ethernet payload for an existing PDU session(s) (e.g., if Ethertype indicates an IPV4 payload and/or an IPV6 payload); and/or a DNN. The new AMF 155-1 may select the PCF 135. While step 1515 is additionally shown in FIG. 15D for reference, this step may not be performed in FIG. 15D, for example, if the PCF 135 is not used for this step. For example, in FIG. 15D, the new AMF 155-1 may send/receive one or more messages for policy control directly to/from the SMF 160 without selecting a PCF. Step 1515 may be omitted, for example, if PCC is not supported and/or if there is no PCF in the network.

At step 1516 (in FIG. 15B), one or more messages for policy control(s) may be sent by the new AMF 155-1 to the PCF 135, and/or by the PCF 135 to the new AMF 155-1. The new AMF 155-1 may send a request, to the PCF 135, to apply operator policies for the wireless device 100, for example, if the new AMF 155-1 has not yet obtained an access and mobility policy for the wireless device 100 and/or if the access and mobility policy in the mew AMF 155-1 may no longer be valid. The new AMF 155-1 may initiate a creation of a policy control session with the PCF 135 by sending a message to the PCF 135 (e.g., for a Npcf_PolicyControl_PolicyCreate service operation). The message from the new AMF 155-1 may comprise Ethernet packet filter set(s) information that is per PDU session (e.g., which may be indicated by a PDU session ID), per wireless device (e.g., that may be indicated by a wireless device identity), per data network (e.g., an APN indicated by a DNN), and/or per network slice (e.g., that may be indicated by an S-NSSAI received from the (R)AN 105). The PCF 135 may make the access and mobility control policy decision based on the Ethernet packet filter set(s) information received from the New AMF 155-1 and/or respond to the new AMF 155-1 (e.g., via an Npcf_PolicyControl_PolicyCreate service operation message) with the access and mobility control policy for the wireless device 100. The access and mobility control policy may comprise service area restrictions and/or a RAT frequency selection priority (RFSP) index. While step 1516 is additionally shown in FIG. 15D for reference, this step may not be performed in FIG. 15D, for example, if the PCF 135 is not used for these steps. For example, in FIG. 15D, the new AMF 155-1 may send/receive one or more messages for policy control directly to/from the SMF 160. Step 1516 may be omitted, for example, if PCC is not supported and/or if there is no PCF in the network.

At step 1517 (in FIGS. 15B and 15D), one or more PDU sessions may be created and/or modified, such as described further below regarding FIGS. 16A-16B and/or 17A-17B. The new AMF 155-1 may enforce the access and mobility control policy, re-activate one or more PDU sessions, and/or create one or more PDU sessions. The interactions between the AMF(s) (e.g., new AMF 155-1 and/or old AMF 155-2), SMF (e.g., SMF 160), PCF (e.g., PCF 135) (if supported) and/or UPF (e.g., UPF 110) to re-activate one or more PDU sessions and/or create one or more PDU sessions may correspond to steps 1601 to 1606 (in FIGS. 16A-16B). Step 1517 (in FIGS. 15B and 15D) may be performed, for example, in response to the message received from the PCF 135 (e.g., if supported). The new AMF 155-1 may make the access and mobility control policy decision based on the Ethernet packet filter set(s) information received from the (R)AN 105, for example, if PCC is not supported and/or if there is no PCF in the network.

At step 1518 (in FIGS. 15B and 15D), the new AMF 155-1 may send, to the (R)AN 105, a PDU session request. The PDU session request may comprise a NAS message. The PDU session request (e.g., the NAS message) may comprise one or more of: a PDU Session ID; CN N3 tunnel information (e.g., UPF 110 address, UPF 110 identity, and/or TEID) for a PDU session; and/or a PDU session establishment accept (e.g., which may be targeted to the wireless device 100).

At step 1519 (in FIGS. 15B and 15D), an AN resource setup procedure may be performed between the (R)AN 105 and the wireless device 100. The (R)AN 105 may issue an AN specific signaling exchange with the wireless device 100 that may be related to information received from SMF. A connection reconfiguration procedure (e.g., an RRC Connection Reconfiguration for a 3GPP RAN) may be performed such that the wireless device 100 may establish, for example, sufficient RAN resources according to one or more authorized QoS rules for the PDU Session(s). The (R)AN 105 may: allocate (R)AN N3 tunnel information comprising a (R)AN address, identity, and/or tunnel end identifier (TEID) of an N3 tunnel for a downlink for the PDU session(s); correlate the (R)AN N3 tunnel with the CN N3 tunnel for the PDU session(s); and/or forward the NAS message. The NAS message may comprise, for example, PDU session ID(s) and/or N1 SM information (e.g., a PDU session establishment accept) that may be provided at step 1518 to the UE. The (R)AN 105 may provide the NAS message to the UE, for example, if the necessary RAN resources have been established and/or if the allocation of (R)AN tunnel information has been successful.

At step 1520 (in FIGS. 15B and 15D), the (R)AN 105 may send, to the new AMF 155-1, a message comprising a PDU session response. The PDU session response (e.g., an N2 PDU session response) may comprise one or more of: PDU Session ID(s), cause information, and/or N2 SM information. The N2 SM information may comprise, for example, PDU Session ID(s), (R)AN N3 tunnel information, and/or a list of accepted and/or rejected QoS profile(s).

At step 1521 (in FIGS. 15B and 15D), one or more PDU sessions may be modified, such as described further below regarding FIGS. 17A-17B. One or more of the new AMF 155-1, old AMF 155-2, SMF 160, and/or PCF 135 (if supported) may send, to the UPF 110, the (R)AN N3 tunnel information. Interactions between AMF(s), SMF, PCF (if supported), and UPF to modify one or more PDU sessions may correspond to steps 1701 to 1706 in FIGS. 17A-17B. Additionally or alternatively, step 1521 may be performed before step 1527 and/or after step 1526 described below.

At step 1522 (in FIGS. 15B and 15D), the new AMF 155-1 may send a request to the N3IWF. At step 1523 (in FIGS. 15B and 15D) the N3IWF may send a response to the new AMF 155-1. The New AMF 155-1 may determine to modify the N2AP UE-TNLA-binding toward N3IWF, for example, by sending an N2 request message. The N3IWF may respond to the N2 request message with an N2 response message.

At step 1524 (in FIG. 15B), the old AMF 155-2 may send, to the PCF 135, a message for one or more policy deletions. The PCF 135 may send (e.g., as a response) a message to the old AMF 155-1, for example, that may confirm one or more policy deletions. The old AMF 155-2 may terminate a wireless device context in the PCF 135, for example, if the old AMF 155-2 previously requested wireless device context to be established in the PCF 135. The old AMF 155-2 may terminate the wireless device context in the PCF 135 by invoking the Npcf_PolicyControl_PolicyDelete service operation. While step 1524 is additionally shown in FIG. 15D for reference, this step may not be performed in FIG. 15D, for example, if the PCF 135 is not used for this step. For example, in FIG. 15D, the old AMF 155-2 may send/receive one or more messages for policy deletion to/from the SMF 160. Step 1524 may be omitted, for example, if PCC is not supported and/or if there is no PCF in the network.

At step 1525 (in FIGS. 15B and 15D), the new AMF 155-1 may send, to the wireless device 100, a message comprising a registration acceptance. For example, the new AMF 155-1 may send a registration accept message to the wireless device 100 indicating that the registration has been accepted. A 5G-GUTI may be included in the registration accept message, for example, if the new AMF 155-1 allocates a new 5G-GUTI.

At step 1526 (in FIGS. 15B and 15D), the wireless device 100 may send, to the new AMF 155-1, a message comprising a registration completion. For example, the wireless device 100 may send a registration complete message to the new AMF 155-1 to acknowledge a new assignment, such as a new 5G-GUTI being assigned.

At step 1527 (in FIGS. 15B and 15D), one or more PDU sessions may be released, such as described further below regarding FIGS. 18A-18B. Interactions between AMF(s) (e.g., the new AMF 155-1 and/or the old AMF 155-2), an SMF (e.g., the SMF 160), a PCF (e.g., the PCF 135) (if supported), and/or a UPF (e.g., the UPF 110) to delete one or more PDU sessions may correspond to steps 1801-1806 in FIGS. 18A-18B. Additionally or alternatively, step 1527 may be performed after step 1521 and/or before step 1522.

Figure 16A:
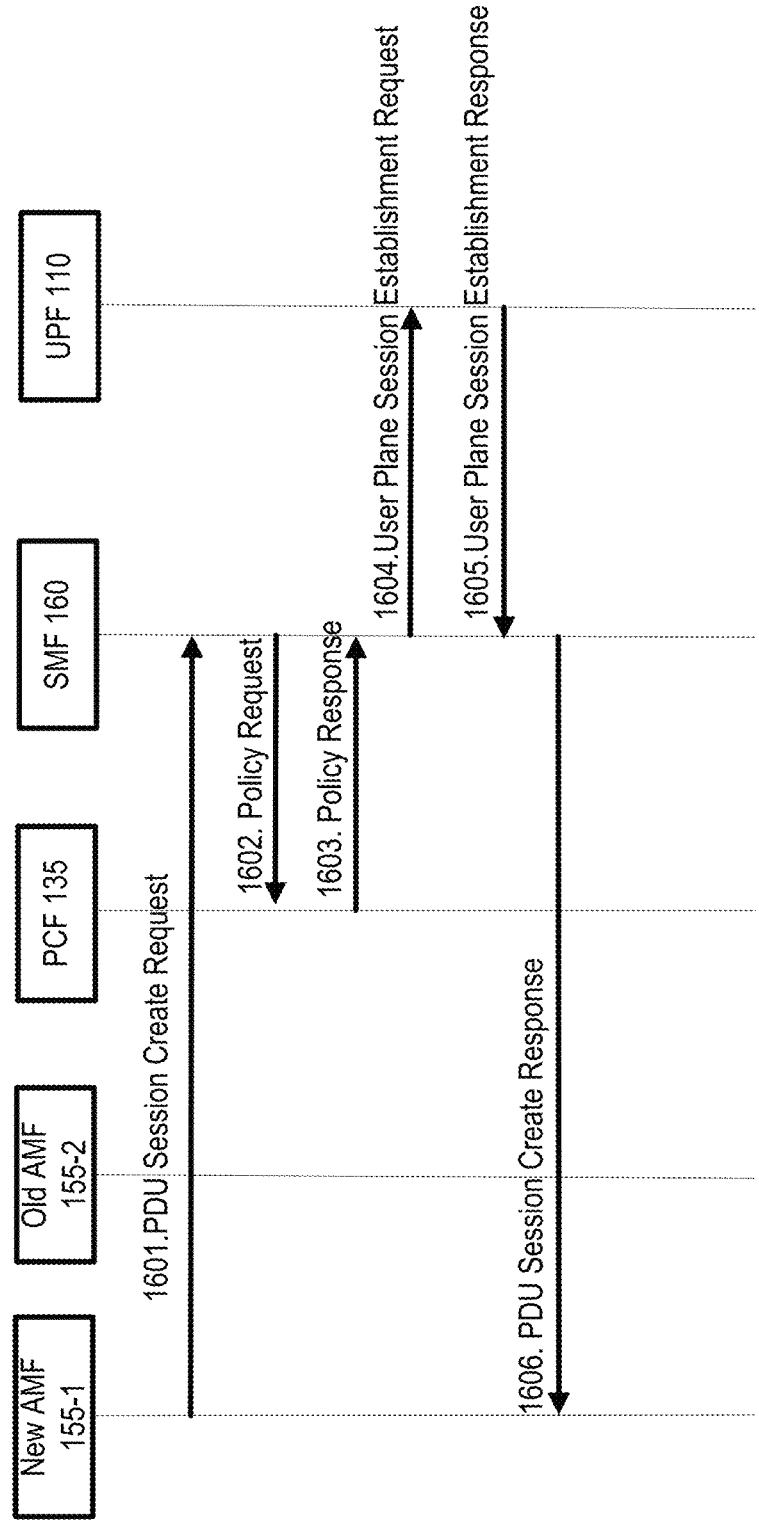
FIGS. 16A and 16B show examples of PDU session creation procedures.
Figure 16B:
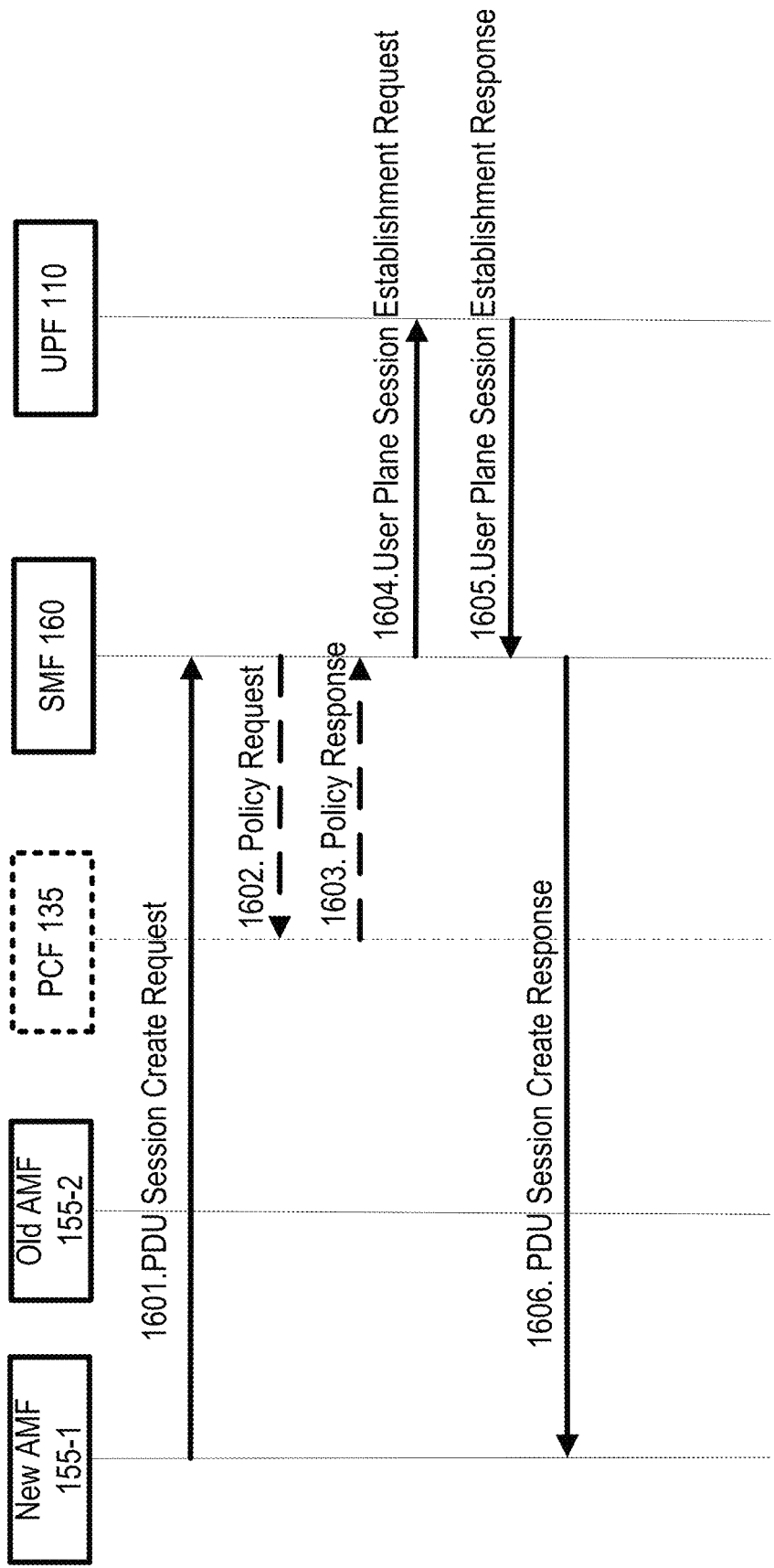

FIGS. 16A and 16B show examples of PDU session creation procedures. FIG. 16A shows PDU session creation procedures that may involve a PCF (e.g., PCF 135). FIG. 16B shows PDU session creation procedures that may not involve a PCF (e.g., PCF 135). Steps 1601-1606 in FIG. 16A correspond to steps 1601-1606, respectively, in FIG. 16B, unless otherwise indicated. Steps 1601-1606 may be performed, for example, as at least part of step 1517 described above regarding FIGS. 15A-15D.

At step 1601 (in FIGS. 16A and 16B), the new AMF 155-1 may send, to the SMF 160, a message (e.g., PDU session create request) to request establishment of one or more PDU sessions. The new AMF 155-1 may send the message to request a creation of a PDU session, for example, based on one or more of the following conditions: the wireless device 100 may attempt or indicate an intention to activate one or more existing PDU sessions that have already been established; the wireless device 100 may attempt to or indicate an intention to establish one or more new PDU sessions; a local policy that may indicate the new AMF 155-1 has attempted or indicated an intention to establish one or more new PDU sessions; and/or other reasons to activate existing PDU session and/or to establish one or more new PDU sessions. One or more old PDU sessions may be released after one or more new PDU sessions have been established. The message (e.g., PDU session create request) to request establishment of one or more PDU sessions may comprise one or more of: an S-NSSAI and/or a network slicing instance ID. The S-NS-SAI may comprise a slice and/or service type (SST) and/or a slice differentiator (SD) which may indicate an expected network slice behavior in terms of features and services. The network slicing instance ID may identify a network slicing instance. A PDU Session ID may identify a PDU session. A device identifier and/or a user identity associated with the wireless device (e.g., for an Ethernet type wireless device) may comprise one or more of: a SUPI, 5G-GUTI, and/or other wireless device identifier; a Data Network Name (DNN); and/or Ethernet packet filter set(s) information. Ethernet packet filter set information may be on a per PDU session basis (e.g., which may be indicated by a PDU session ID), a per wireless device basis (e.g., which may be indicated by one or more wireless device identities), on a per data network basis (e.g., which may be an APN indicated by a DNN), and/or on a per network slice basis (e.g., indicated by one or more S-NSSAI).

At step 1602 (in FIG. 16A), the SMF 160 may send, to the PCF 135, a message comprising a policy request to request one or more policies for one or more PDU sessions. The SMF 160 may perform one or more steps, for example, after or in response to a message from step 1601. The SMF 160 may allocate an IPv6 prefix for one or more PDU session and N6 point-to-point tunneling (e.g., if the PDU Type is Ethernet PDU, where the N6 tunnel may be used to transmit the user data between the UPF and a Data Network). The SMF 160 may allocate the CN N6 tunnel information (e.g., UPF 110 address, UPF 110 identity, and/or tunnel endpoint identifier (TEID)) and/or the CN N3 tunnel info (e.g., UPF 110 address, UPF 110 identity, and/or TEID) for the PDU sessions). The SMF 160 may select a PCF. For example, the SMF 160 may select the same PCF that may already be serving an existing PDU session(s) (e.g., indicated by PDU session ID(s)). Additionally or alternatively, the SMF 160 may select a PCF based on one or more of: the SUPI; an Ethernet MAC address, a wireless device address (e.g., for IPV4), a prefix (e.g., for IPV6) of the Ethernet payload for the existing PDU session(s) (e.g., if Ethertype indicates an IPv4 payload and/or an IPV6 payload); and/or a DNN. While step 1602 is additionally shown in FIG. 16B for reference, this step may not be performed in FIG. 16B, for example, if the PCF 135 is not used for this step. For example, in FIG. 16B, the SMF 160 may determine one or more policies without communicating with a PCF. Step 1602 may be omitted, for example, if PCC is not supported and/or if there is no PCF in the network.

Additionally or alternatively, the SMF 160 may select a new PCF. The SMF 160 may send, to the new PCF (not shown) a message (e.g., policy request) to request one or more policies for the PDU session(s). The message may comprise information received from the new AMF 155-1, such as the Ethernet packet filter set(s) information on a per PDU session basis (e.g., which may be indicated by a PDU session ID), on a per wireless device basis (which may be indicated by one or more wireless device identities, on a per data network basis (e.g., which may be an APN indicated by a DNN), and/or on a per network slice basis (e.g., which may be indicated by one or more S-NSSAI). The information from the new AMF 155-1 may comprise a prefix (e.g., for IPV6) for the PDU session (s) and/or N6 point-to-point tunneling (e.g., if the PDU Type is Ethernet PDU).

If step 1602 is omitted, the SMF 160 may make one or more policy decisions based on information received from the New AMF 155-1, such as one or more of: Ethernet packet filter set(s) information), subscription information, and/or other information. The SMF 160 may create a service data flow template for a policy rule based on the information received from the New AMF 155-1.

At step 1603 (in FIG. 16A), the PCF 135 may send, to the SMF 160, a message comprising a policy response. The PCF 135 may make a policy decision that may be based on information received from the SMF 160. The policy decision may be based on, for example, one or more of: Ethernet packet filter set(s) information, subscription information, and/or other information. The PCF 135 may create a service data flow template for the policy rule based on the information received from the SMF 160. The PCF 135 may send, to the SMF 160, a message (e.g., a policy response) comprising one or more of: a QoS policy for the PDU session(s); a charging policy for the PDU session(s); traffic steering control for steering traffic; and/or other policies. The message comprising the policy response may comprise, for example, Ethernet packet filter sets information. While step 1603 is additionally shown in FIG. 16B for reference, this step may not be performed in FIG. 16B, for example, if the PCF 135 is not used for this step. For example, in FIG. 16B, the SMF 160 may determine one or more policies without communicating with a PCF. Step 1603 may be omitted, for example, if PCC is not supported and/or if there is no PCF in the network.

At step 1604 (in FIGS. 16A and 16B), the SMF 160 may send, to the UPF 110, a message (e.g., user plane session establishment request) to request establishment of one or more user plane sessions for one or more PDU sessions. The SMF 160 may send the message to request establishment of the one or more user plane sessions for the one or more PDU sessions after or in response to receiving a policy from the PCF 135 (e.g., at step 1603). The message to request establishment of one or more user plane sessions for the one or more PDU sessions may comprise one or more of: an S-NSSAI and/or a network slicing instance ID; the PDU session ID(s); the device identifier and/or user identity associated with a wireless device (e.g., the wireless device 100); a data network name (DNN); CN N6 tunnel information (e.g., UPF 110 address, UPF 110 identity, and/or TEID) and/or CN N3 tunnel information (e.g., UPF 110 address, UPF 110 identity, and/or TEID) for the PDU session(s) (e.g., if corresponding tunnel information is allocated by the SMF), and/or one or more policies for the PDU sessions (e.g., which may be included with Ethernet packet filter set(s) information).

At step 1605 (in FIGS. 16A and 16B), the UPF 110 may send, to the SMF 160, a message comprising a response to the request (e.g., at step 1604). The UPF 110 may send, for example, a user plane session establishment response that is based on the message received from the SMF 160. The UPF 110 may set up the user plane session(s). The UPF 110 may acknowledge the SMF 160, for example, by sending the response message (e.g., user plane session establishment response). The response message may comprise one or more of: the CN N6 tunnel information (e.g., UPF 110 address, UPF 110 identity, and/or TEID) and/or CN N3 tunnel information (e.g., UPF 110 address, UPF 110 identity, and/or TEID) for the PDU session(s) (e.g., if corresponding tunnel information is allocated by the UPF). The UPF 110 may perform service flow detection and/or policy enforcement with Ethernet packet filter set information, for example, after or upon receiving the user plane data packet.

At step 1606 (in FIGS. 16A and 16B), the SMF 160 may send, to the new AMF 155-1, a message comprising a session creation response (e.g., PDU session create response). The SMF 160 may acknowledge the new AMF 155-1, for example, by sending a response message (e.g., a PDU session create response). The response message may comprise one or more of: the allowed S-NSSAI and/or the network slicing instance ID; the PDU session ID(s); a device identifier and/or a user identity associated with the wireless device (e.g., wireless device 100); the data network name (DNN); CN N3 tunnel info (e.g., UPF 110 address, or UPF 110 identity, and/or TEID) for the PDU session(s); and/or one or more policies for the PDU sessions comprising (e.g., which may be included with the Ethernet packet filter set(s) information).

Figure 17A:
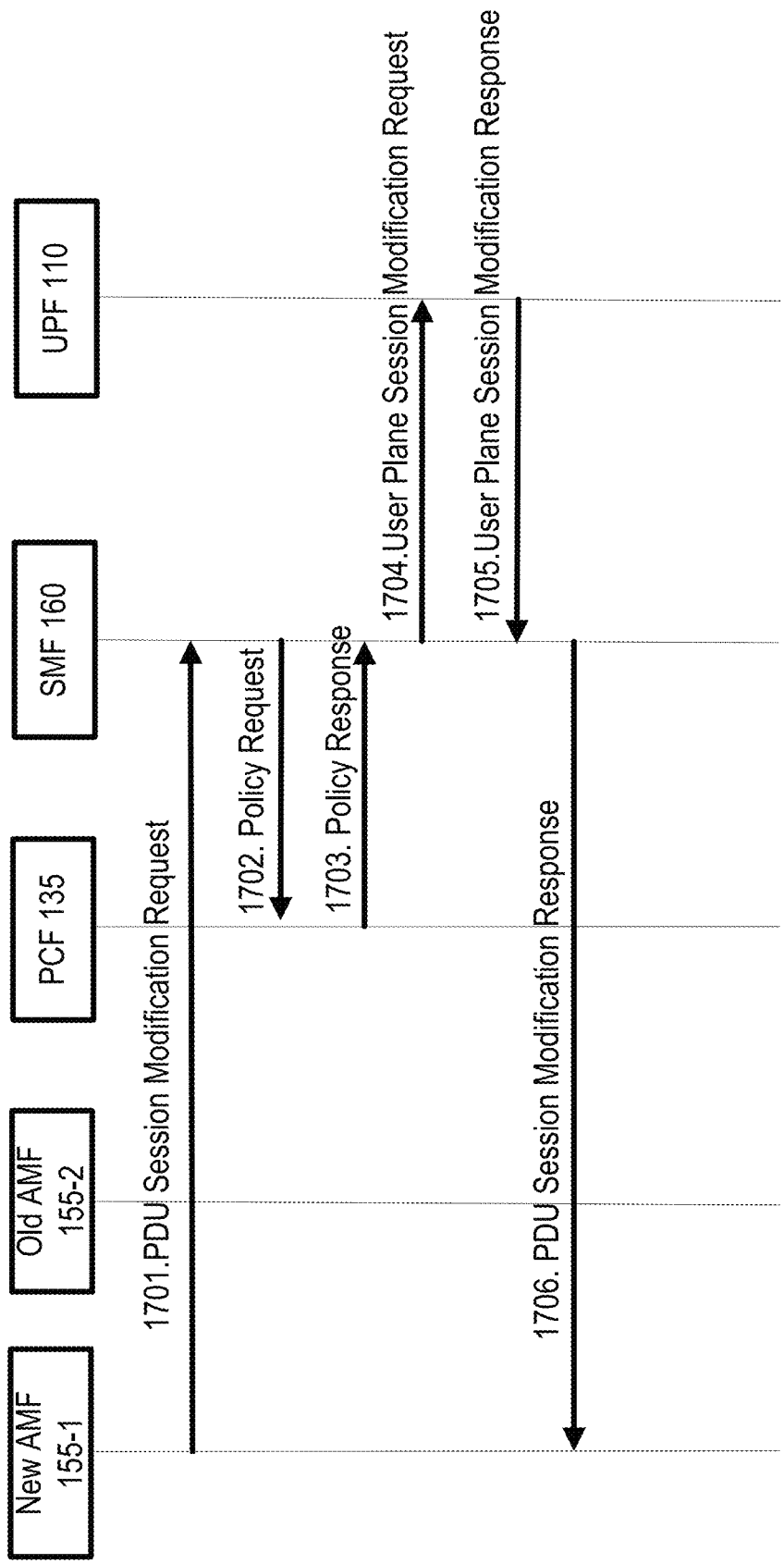
FIGS. 17A and 17B show examples of PDU session modification procedures.
Figure 17B:
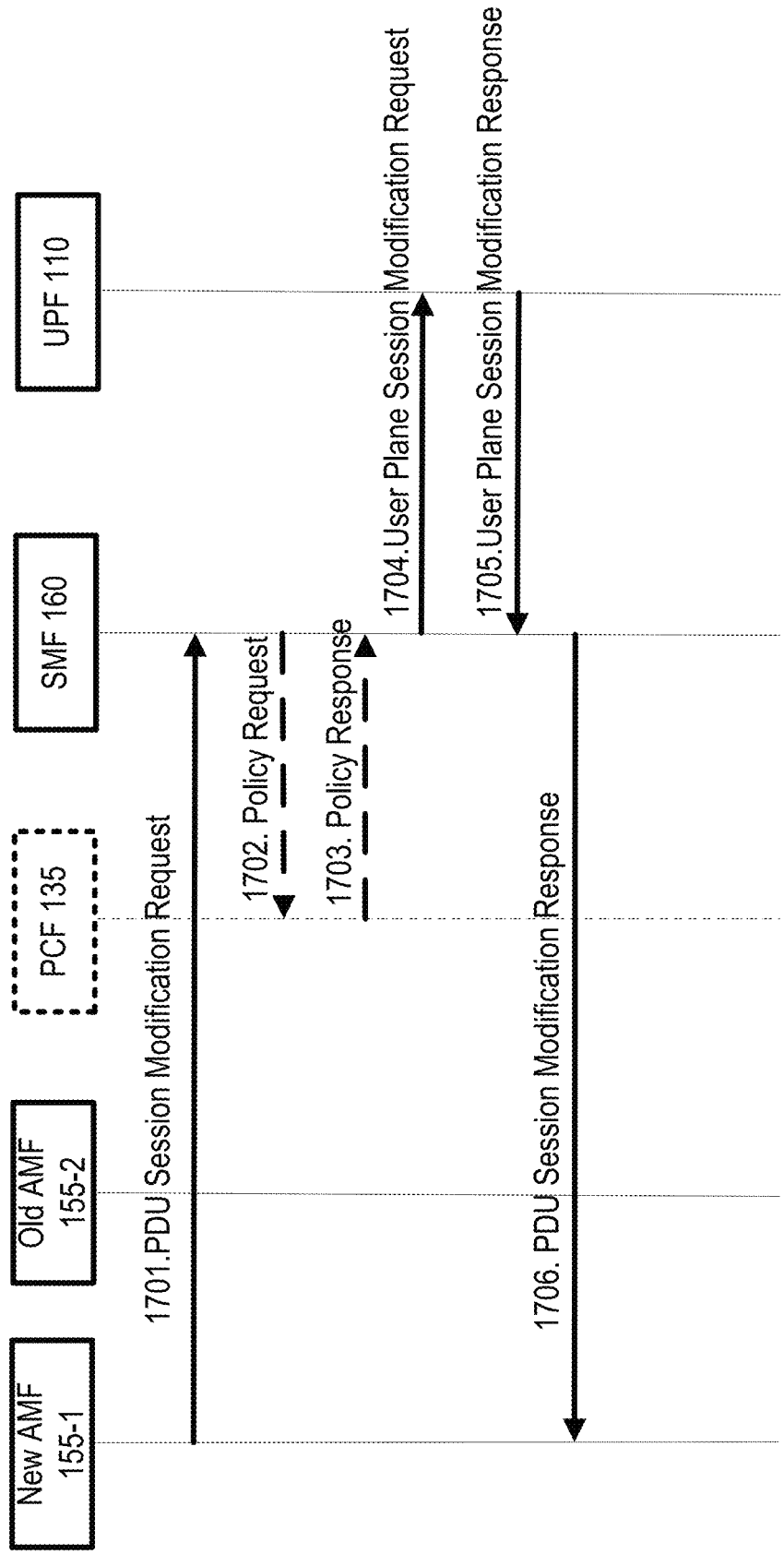

FIGS. 17A and 17B show examples of PDU session modification procedures. FIG. 17A shows PDU session modification procedures that may involve a PCF (e.g., PCF 135). FIG. 17B shows PDU session modification procedures that may not involve a PCF (e.g., PCF 135). Steps 1701-1706 in FIG. 17A correspond to steps 1701-1706, respectively, in FIG. 17B, unless otherwise indicated. Steps 1701-1706 may be performed, for example, as at least part of step 1517 and/or step 1521 described above regarding FIGS. 15A-15D.

At step 1701 (in FIGS. 17A and 17B), the new AMF 155-1 may send, to the SMF 160, a message (e.g., PDU session modification request) to request a modification (e.g., an update) of one or more PDU sessions. The message to request a modification of one or more PDU sessions may comprise one or more of: the (R)AN N3 tunnel information (e.g., (R)AN address, RAN identity, and/or TEID) for the PDU session(s); an S-NSSAI and/or a network slicing instance ID; PDU session ID(s) for one or more PDU sessions; device identifier and/or user identity associated with a wireless device (e.g., the wireless device 100); data network name (DNN); and/or Ethernet packet filter set(s) information on a per PDU session basis (e.g., which may be indicated by a PDU session ID), on a per wireless device basis (e.g., which may be indicated by one or more wireless device identities, on a per data network basis (e.g., which may be an APN indicated by a DNN), and/or on a per network slice basis (e.g., which may be indicated by one or more S-NSSAI).

At step 1702 (in FIG. 17A), the SMF 160 may send, to the PCF 135, a message comprising a policy request to request one or more policies for one or more PDU sessions. The message comprising the policy request may comprise information received from the new AMF 155-1, such as one or more of: Ethernet packet filter set(s) information; a prefix (e.g., for IPV6) for the PDU session(s); and/or N6 point-to-point tunneling (e.g., if the PDU type is an Ethernet PDU). Step 1702 may correspond to step 1602. While step 1702 is additionally shown in FIG. 17B for reference, this step may not be performed in FIG. 17B, for example, if the PCF 135 is not used for this step. For example, in FIG. 17B, the SMF 160 may determine one or more policies without communication with a PCF. Step 1702 may be omitted, for example, if PCC is not supported and/or if there is no PCF in the network.

At step 1703 (in FIG. 17A), the PCF 135 may send, to the SMF 160, a message comprising a policy response. The PCF 135 may make a policy decision based on information received from the SMF 160. The policy decision may be based on, for example, one or more of: Ethernet packet filter set(s) information, subscription information, and/or other information. The PCF 135 may create a service data flow template for the policy rule based on the information received from the SMF 160. The PCF 135 may send, to the SMF 160, a message (e.g., a policy response) comprising one or more of: a QoS policy for the PDU session(s); a charging policy for the PDU session(s); traffic steering control for steering traffic; and/or other policies. The message comprising the policy response may comprise, for example, Ethernet packet filter sets information. Step 1703 may correspond to step 1603. While step 1703 is additionally shown in FIG. 17B for reference, this step may not be performed in FIG. 17B, for example, if the PCF 135 is not used for this step. For example, in FIG. 17B, the SMF 160 may determine one or more policies without communication with a PCF. Step 1703 may be omitted, for example, if PCC is not supported and/or if there is no PCF in the network.

At step 1704 (in FIGS. 17A and 17B), the SMF 160 may send, to the UPF 110, a message (e.g., user plane session modification request) to request modification of one or more user plane sessions for one or more PDU sessions. The SMF 160 may send the message to request modification of the one or more user plane sessions, for example, after or in response to receiving one or more policies from the PCF 135. The message to request modification of the one or more user plane sessions may comprise one or more of: Ethernet packet filter set(s) information, subscription information, and/or other information. The SMF 160 may create a service data flow template for one or more policy rules, for example, based on information received from the new AMF 155-1. The SMF 160 may send to the UPF 110 the message to request modification (e.g., update) of one or more user plane sessions for one or more PDU sessions comprising one or more of: (R)AN N3 tunnel information (e.g., (R)AN address, (R)AN identity, and/or TEID) for the PDU session(s); S-NSSAI and/or network slicing instance ID; PDU session ID(s); device identifier and/or user identity associated with the wireless device; a data network name (DNN); CN N6 tunnel info (e.g., UPF 110 address, UPF 110 identity, and/or TEID) and CN N3 tunnel information (e.g., UPF 110 address, UPF 110 identity, and/or TEID) for the PDU session(s); and/or one or more policies for the PDU session(s) (e.g., which may be included with the Ethernet packet filter set(s) information).

At step 1705 (in FIGS. 17A and 17B), the UPF 110 may send, to the SMF 160, a message comprising a response to the request (e.g., at step 1704). The UPF 110 may send, for example, a user plane session modification response that is based on the message received from the SMF 160. The UPF 110 may update the user plane session(s). The UPF 110 may correlate a CN N3 tunnel with a (R)AN N3 tunnel for the PDU session(s). The UPF 110 may acknowledges the SMF 160, for example, by sending the response message (e.g., user plane session modification response). The response message may comprise one or more of: the CN N6 tunnel information (e.g., UPF 110 address, UPF 110 identity, and/or TEID) and/or CN N3 tunnel information (e.g., UPF 110 address, UPF 110 identity, and/or TEID) for the PDU session(s) (e.g., if corresponding tunnel information is allocated by the UPF). The UPF 110 may perform service flow detection and/or policy enforcement with Ethernet packet filter set information, for example, after or upon receiving the user plane data packet.

At step 1706 (in FIGS. 17A and 17B), the SMF 160 may send, to the new AMF 155-1, a message comprising a session modification response (e.g., PDU session modification response). The SMF 160 may acknowledge the new AMF 155-1, for example, by sending a response message (e.g., a PDU session modification response). The response message may comprise one or more of: the allowed S-NSSAI and/or the network slicing instance ID; the PDU session ID(s); a device identifier and/or a user identity associated with the wireless device (e.g., wireless device 100); the data network name (DNN); the CN N3 tunnel information (e.g., UPF 110 address, UPF 110 identity, and/or TEID) for the PDU session(s); and/or one or more policies for the PDU sessions (e.g., which may be included with the Ethernet packet filter set(s) information).

Figure 18A:
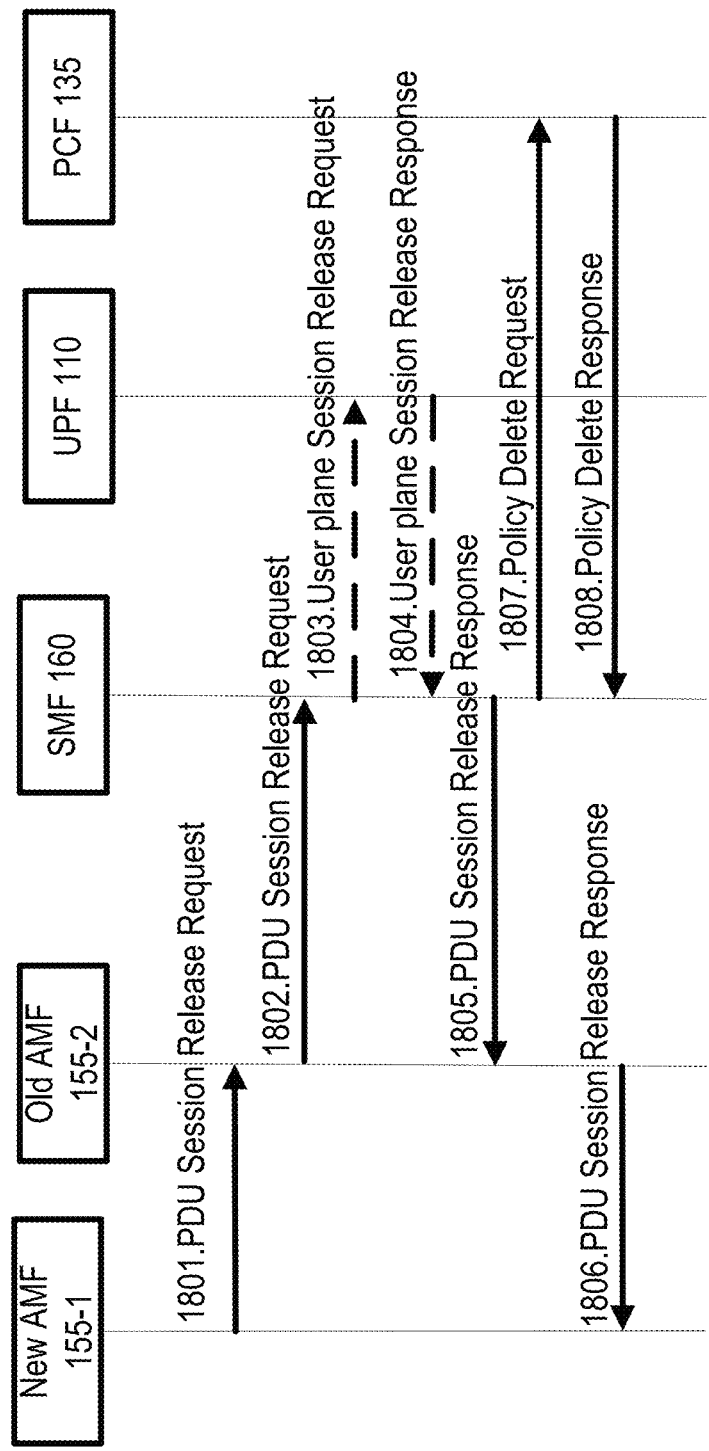
FIGS. 18A and 18B show examples of PDU session release procedures.
Figure 18B:
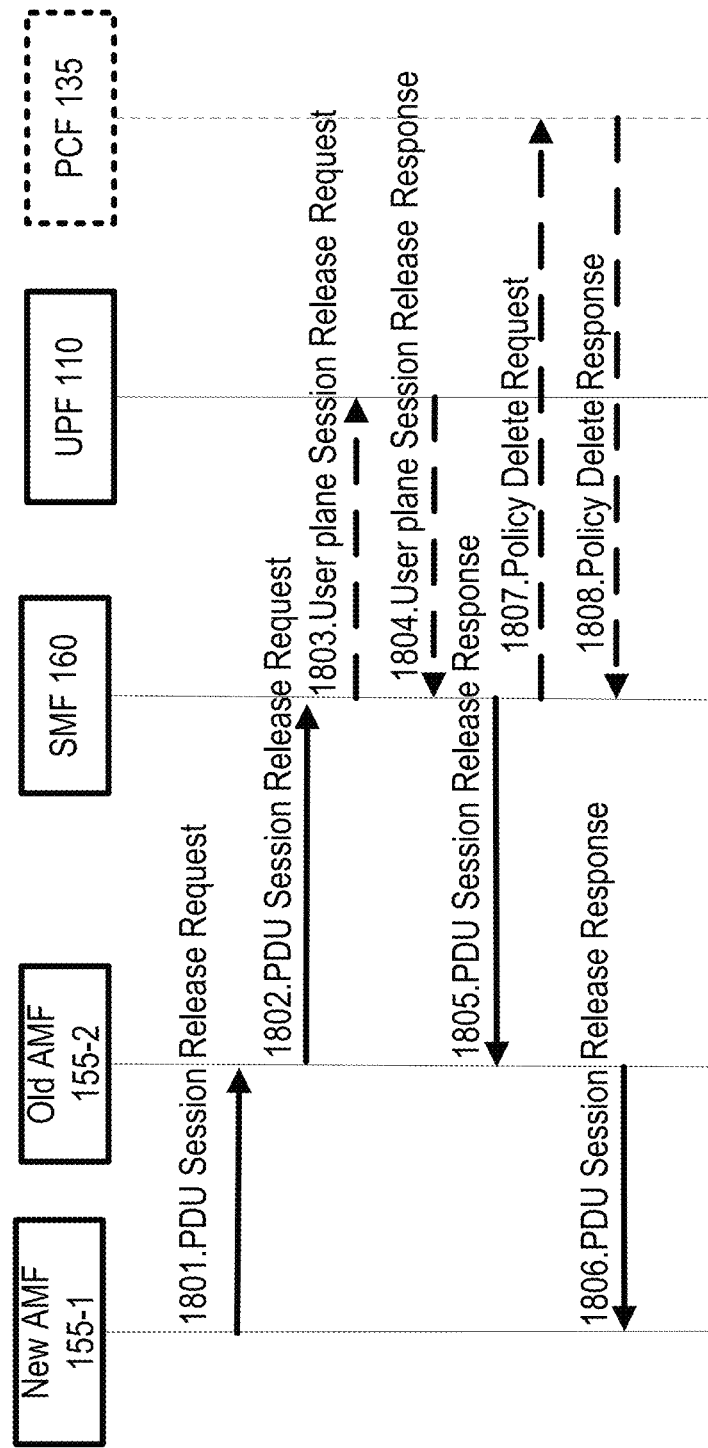

FIGS. 18A and 18B show examples of PDU session release procedures. FIG. 18A shows PDU session release procedures that may involve a PCF (e.g., PCF 135). FIG. 18B shows PDU session release procedures that may not involve a PCF (e.g., PCF 135). Steps 1801-1806 in FIG. 18A correspond to steps 1801-1806, respectively, in FIG. 18B, unless otherwise indicated. Steps 1801-1806 may be performed, for example, as at least part of step 1521 described above regarding FIGS. 15A-15D.

At step 1801 (in FIGS. 18A and 18B), the new AMF 155-1 may send, to the old AMF 155-2, a message (e.g., PDU session release request) to request releasing of one or more PDU sessions. The message may comprise one or more of: the S-NSSAI and/or the network slicing instance ID, the PDU session ID(s), a device identifier and/or a user identity associated with the wireless device, and/or the data network name (DNN).

At step 1802 (in FIGS. 18A and 18B), the old AMF 155-2 may send, to the SMF 160, a message (e.g., PDU session release request) to request releasing of one or more PDU sessions. The message may be sent by the old AMF 155-2 after or in response to receiving the PDU session release request message from the new AMF 155-1 (e.g., at step 1801). The message sent by the old AMF 155-2 may comprise the information received from the new AMF 155-1 (e.g., at step 1801).

At step 1803 (in FIGS. 18A and 18B), the SMF 160 may send, to the UPF 110, a message (e.g., user plane session release request) to request releasing of one or more user plane sessions for the PDU session(s). The SMF 160 may send the message after or in response to receiving the PDU session release request message from the old AMF 155-2. The message sent by the SMF 160 may comprise the information received from the old AMF 155-2 (e.g., at step 1802).

At step 1804 (in FIGS. 18A and 18B), the UPF 110 may send, to the SMF 160, a message (e.g., user plane session release response) to respond to the message to request releasing of one or more user plane sessions for the PDU session(s). The UPF 110 may release the corresponding user plane sessions. The UPF 110 may acknowledge, to the SMF 160, by sending a response message (e.g., user plane session release response). If the UPF 110 has already released the corresponding user plane session (s), the UPF 110 may acknowledge the SMF 160 by sending a response message (e.g., user plane session release response).

At step 1805 (in FIGS. 18A and 18B), the SMF 160 may send, to the old AMF 155-2, a message (e.g., PDU session release response) comprising a response to a release request. The SMF 160 may acknowledge, to the old AMF 155-2, a release, for example, by sending a response message (e.g., PDU session release response).

At step 1806 (in FIGS. 18A and 18B), the old AMF 155-2 may send, to the new AMF 155-1, a message (e.g., PDU session release response) comprising a response to a release request. The old AMF 155-2 may acknowledge the new AMF 155-1 by sending a response message (e.g., PDU session release response). The new AMF 155-1 may send one or more messages to the (R)AN 105 and/or to the wireless device 100 to release the related resource. Step 1804 and/or step 1805 may be omitted. For example, the UPF 110 may release the user plane session(s) without a request from the SMF 160.

At step 1807 (in FIG. 18A), the SMF 160 may send, to the PCF 135, a message (e.g., policy delete request) to request removal of one or more policies for the PDU session(s). The message to request removal of the one or more policies for the PDU sessions may comprise the information received from the old AMF 155-2 (e.g., from step 1802). While step 1807 is additionally shown in FIG. 18B for reference, this step may not be performed in FIG. 18B, for example, if the PCF 135 is not used for this step. For example, in FIG. 18B, the SMF 160 may remove one or more policies for the PDU sessions from the SMF 160, without communicating with a PCF. Step 1807 may be omitted, for example, if PCC is not supported and/or if there is no PCF in the network.

At step 1808 (in FIG. 18A), the PCF 135 may send, to the SMF 160, a message (e.g., policy delete response) to confirm deletion of one or more policies for the PDU session(s). The PCF 135 may acknowledge, to the SMF 160, deletion of one or more policies for the PDU session(s) by sending a response message (e.g., policy delete response). While step 1808 is additionally shown in FIG. 18B for reference, this step may not be performed in FIG. 18B, for example, if the PCF 135 is not used for this step. For example, in FIG. 18B, the SMF 160 may remove one or more policies for the PDU sessions from the SMF 160, without communicating with a PCF. Step 1808 may be omitted, for example, if PCC is not supported and/or if there is no PCF in the network.

Figure 19A:
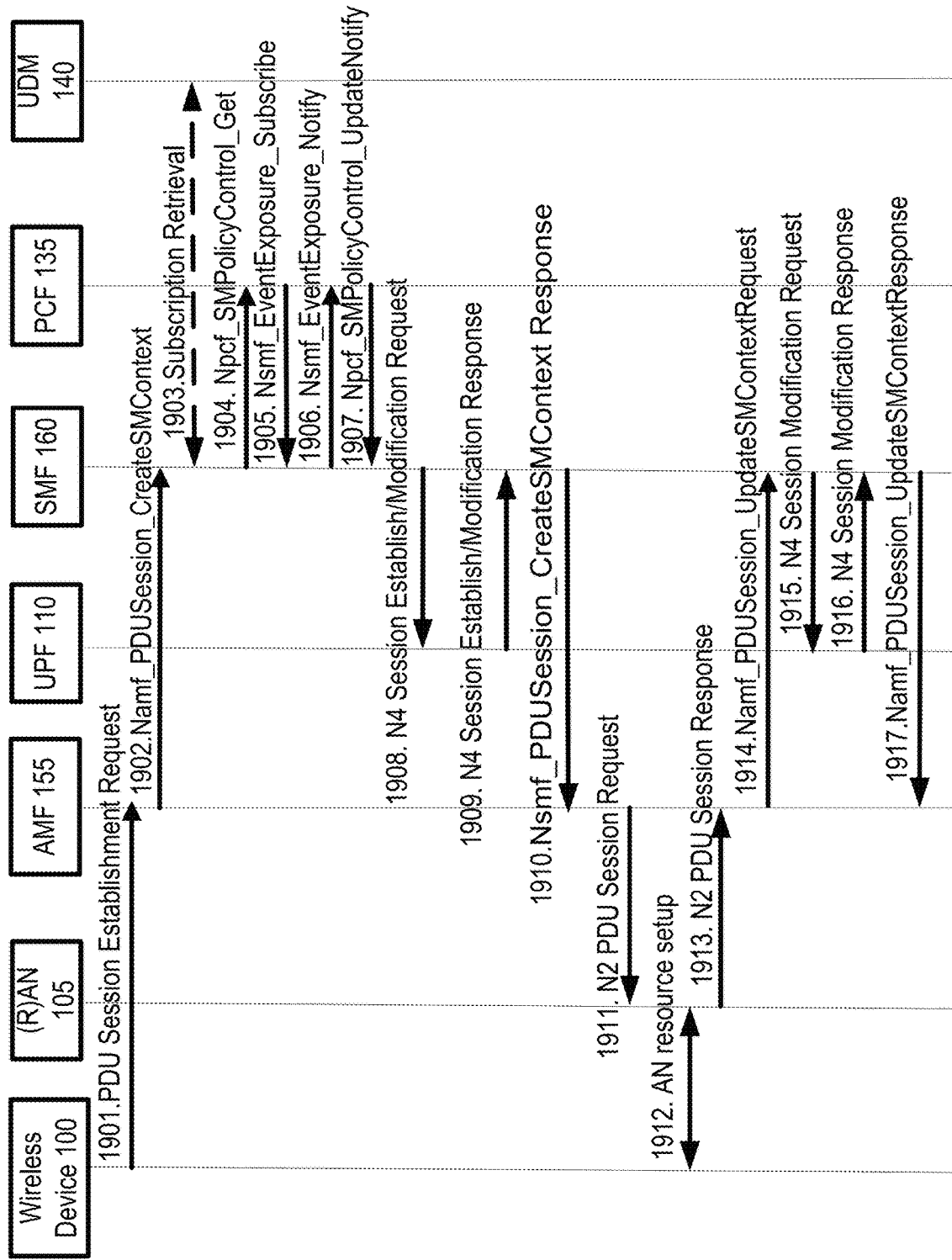
FIGS. 19A and 19B show examples of PDU session establishment procedures.
Figure 19B:
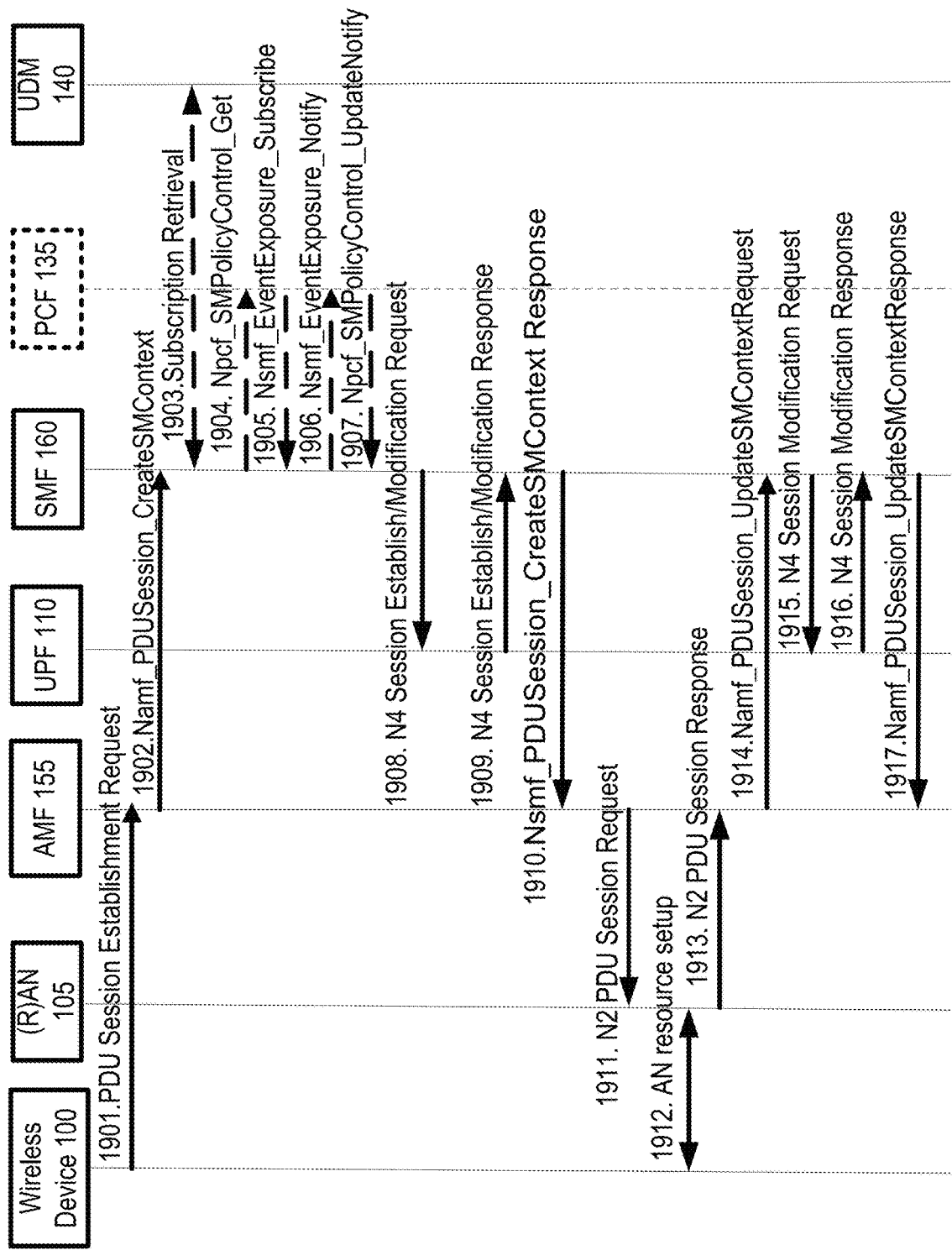

FIGS. 19A and 19B show examples of PDU session establishment procedures. FIG. 19A shows PDU session establishment procedures that may involve a PCF (e.g., PCF 135). FIG. 19B shows PDU session establishment procedures that may not involve a PCF (e.g., PCF 135). Steps 1901-1917 in FIG. 19A correspond to steps 1901-1917, respectively, in FIG. 19B, unless otherwise indicated.

At step 1901 (in FIGS. 19A and 19B), the wireless device 100 may send, to the AMF 155, a message (e.g., PDU session establishment request) comprising a request to establish one or more PDU sessions. The message may be a NAS Message comprising one or more of: S-NSSAI, DNN, PDU session ID, request type, and/or N1 SM container (e.g., for a PDU Session establishment request). The wireless device 100 may initiate a wireless device requested PDU session establishment procedure, for example, by the transmission of the NAS message, which may comprise a PDU session establishment request within an N1 SM container. The PDU session establishment request may comprise a PDU type (e.g., Ethernet), SSC mode, protocol configuration options, and/or a PDU session ID that may be generated by the wireless device 100. In a NAS Message and/or an N1 SM container, the wireless device 100 may include one or more Ethernet packet filter sets for a PDU session that may be indicated by a PDU session ID, and/or Ethernet packet filter set(s) on a per wireless device basis (e.g., which may be indicated by one or more wireless device identities), and/or on a per data network bases (e.g., which may be an APN indicated by a DNN), on a per network slice basis (e.g., which may be indicated by an S-NSSAI). An Ethernet packet filter set may comprise one or more of: a source MAC address, a destination MAC address; an Ethertype (e.g., as set forth in IEEE 802.3); C-TAG and/or S-TAG VID fields (e.g., as set forth in IEEE 802.1Q); C-TAG and/or S-TAG PCP and/or DEI fields (e.g., as set forth in IEEE 802.1Q); and/or IP packet filter set (e.g., if Ethertype indicates an IPv4 payload and/or an IPV6 payload). The IP packet filter set may comprise one or more of: source IP address, destination IP address, or prefix (e.g., for IPV6); source port number and/or destination port number; protocol ID of the protocol above IP and/or next header type; type of service (e.g., for IPV4), traffic class (e.g., for IPV6), and/or Mask; flow label (e.g., for IPv6); and/or security parameter index.

At step 1902 (in FIGS. 19A and 19B), the AMF 155 may send, to the SMF 160, a message (e.g., Nsmf_PDUSession_CreateSMRequest) requesting a PDU session creation. The AMF 155 may select an SMF (e.g., SMF 160). The AMF 155 may send to the SMF 160 the message requesting the PDU session creation. The message may comprise one or more of: SUPI, DNN, S-NSSAI, PDU session ID, AMF ID, request type, and/or N1 SM container (e.g., corresponding to a PDU Session Establishment Request), device and/or user location information, access type, PEI). The message sent by the AMF 155 may comprise the information (e.g., Ethernet packet filter set(s) information) received from the wireless device 100 (e.g., at step 1901).

At step 1903 (in FIGS. 19A and 19B), the SMF 160 and/or the UDM 140 may send one or more messages to the other. The SMF 160 may register with the UDM 140, for example, if the SMF 160 has not yet registered and/or if subscription data is not available. The SMF 160 may retrieve subscription data. Subscribes may be notified, for example, if subscription data is modified. The SMF 160 may select an UPF (e.g., UPF 110) and/or trigger the PDU session establishment authentication and/or authorization, for example, if the SMF 160 determines a requirement to perform secondary authorization and/or authentication during an establishment of the PDU session by a DN-AAA server.

At step 1904 (in FIG. 19A), the SMF 160 may send, to the PCF 135, a message (e.g., Npcf_SMPolicyControl_Get) requesting a policy control. The SMF 160 may invoke the Npcf_SMPolicyControl_Get operation, for example, after or in response to receiving the message from the AMF 155 (e.g., at step 1902). The SMF 160 may send the message requesting a policy control to establish a PDU session with the PCF 135 and obtain default PCC rules for the PDU session. The message requesting a policy control may comprise one or more of: the Ethernet packet filter set(s) information for a PDU session (e.g., indicated by the PDU session ID), and/or Ethernet packet filter set(s) on a per wireless device basis (e.g., which may be indicated by one or more wireless device identities, on a per data network basis (e.g., which may be an APN indicated by a DNN), and/or on a per network slice basis (e.g., which may be indicated by an S-NSSAI received from the AMF 155). While step 1904 is additionally shown in FIG. 19B for reference, this step may not be performed in FIG. 19B, for example, if the PCF 135 is not used for this step. For example, in FIG. 19B, the SMF 160 may determine one or more policies without communicating with a PCF. Step 1904 may be omitted, for example, if PCC is not supported and/or if there is no PCF in the network. The SMF 160 may determine one or more policy decisions, for example, based on information received from the AMF 155 (e.g., Ethernet packet filter set(s) information), subscription information, and/or other information. The SMF 160 may create a service data flow template for one or more policy rules, for example, based on the Ethernet packet filter set(s) information received from the AMF 155.

At step 1905 (in FIG. 19A), the PCF 135 may send, to the SMF 160, a message (e.g., Nsmf_EventExposure_Subscribe) providing subscribe information. The PCF 135 may perform one or more steps, for example, after or in response to a message from step 1904. The PCF 135 may make one or more policy decisions, for example, based on information received from the SMF 160 (e.g., Ethernet packet filter set(s) information, subscription information), and/or other information. The PCF 135 may create a service data flow template for one or more policy rules, for example, based on the Ethernet packet filter set(s) information received from the SMF 160. The PCF 135 may send, to the SMF 160, a message (e.g., policy response) by providing one or more of: a QoS policy for the PDU session(s); a charging policy for the PDU session(s); traffic steering control for steering traffic; and/or other policies. The PCF 135 may subscribe the event(s) in the SMF 160, for example, by invoking the Nsmf_EventExposure_Subscribe operation. While step 1905 is additionally shown in FIG. 19B for reference, this step may not be performed in FIG. 19B, for example, if the PCF 135 is not used for this step. For example, in FIG. 19B, the SMF 160 may determine one or more policies without communicating with a PCF. Step 1905 may be omitted, for example, if PCC is not supported and/or if there is no PCF in the network.

At step 1906 (in FIG. 19A), the SMF 160 may send, to the PCF 135, a message (e.g., Nsmf_EventExposure_Notify) reporting one or more events. The SMF 160 may invoke, for example, the Nsmf_EventExposure_Notify service operation, to report one or more events to the PCF 135 that may have been previously subscribed. While step 1906 is additionally shown in FIG. 19B for reference, this step may not be performed in FIG. 19B, for example, if the PCF 135 is not used for this step. For example, in FIG. 19B, the SMF 160 may determine one or more policies without communicating with a PCF. Step 1906 may be omitted, for example, if PCC is not supported and/or if there is no PCF in the network.

At step 1907 (in FIG. 19A), the PCF 135 may send, to the SMF 160, a message (e.g., Npcf_SMPolicyControl_UpdateNotify) updating one or more policies. The PCF 135 may provide one or more updated policies to the SMF 160 by invoking the Npcf_SMPolicyControl_UpdateNotify service operation. The PCF 135 may provide an authorized session-AMBR and/or an authorized 5QI and/or ARP to the SMF 160. The PCF 135 may provide the one or more updated policies with the Ethernet packet filter set(s) information. While step 1907 is additionally shown in FIG. 19B for reference, this step may not be performed in FIG. 19B, for example, if the PCF 135 is not used for this step. For example, in FIG. 19B, the SMF 160 may determine one or more policies without communicating with a PCF. Step 1907 may be omitted, for example, if PCC is not supported and/or if there is no PCF in the network. The SMF 160 may make one or more policy decisions, for example, based on information received from the AMF 155 (e.g., Ethernet packet filter set(s) information), subscription information, and/or other information. The SMF 160 may create the service data flow template for one or more policy rules based on the Ethernet packet filter set(s) information received from the AMF 155.

At step 1908 (in FIGS. 19A and 19B), the SMF 160 may send, to the UPF 110, a message (e.g., N4 session establishment and/or modification request) establishing and/or updating one or more sessions. The SMF 160 may initiate an N4 session establishment procedure with a selected UPF 110, for example, if the request type indicates an initial request and/or if PDU session establishment authentication and/or authorization was not previously performed. The SMF 160 may initiate an N4 session modification procedure with a selected UPF 110, for example, if the request type does not indicate an initial request and/or if PDU session establishment authentication and/or authorization was previously performed. The SMF 160 may send an N4 session establishment and/or modification request to the UPF 110. The SMF 160 may provide packet detection. The packet detected may be provided with the Ethernet packet filter set(s) information. The SMF 160 may provide enforcement and/or reporting rules to be installed on the UPF 110 for the one or more PDU sessions. CN Tunnel information may be provided to UPF 110, for example, if CN tunnel information is allocated by the SMF 160.

At step 1909 (in FIGS. 19A and 19B) the UPF 110 may send, to the SMF 160, a message (e.g., N4 session establishment and/or modification response) responding to a message establishing and/or updating one or more sessions (e.g., at step 1908). The UPF 110 may provide an acknowledgement to the SMF 160, for example, by sending an N4 session establishment and/or modification response. CN tunnel information may be provided to SMF 160, for example, if CN tunnel information is allocated by the UPF 110. The UPF 110 may perform (e.g., based on the Ethernet packet filter set(s) information) service flow detection and/or policy enforcement after and/or upon receiving a user plane data packet.

At step 1910 (in FIGS. 19A and 19B), the SMF 160 may send, to the AMF 155, a message (e.g., Nsmf_PDUSession_CreateSM response) responding to a session creation request (e.g., at step 1902). The message may comprise one or more of: cause information, N2 SM information (e.g., a PDU session ID, QoS profile(s), CN tunnel information, S-NSSAI, and/or Session-AMBR), and/or N1 SM container (e.g., a PDU session establishment accept). The PDU session establishment accept may comprise one or more of: a QoS rule, an SSC mode, an S-NSSAI, an allocated address (e.g., for IPV4), and/or a session-AMBR. The N2 SM information may comprise information that the AMF 155 may forward to the (R)AN 105 which may comprise the CN tunnel information that may correspond to the Core Network address of the N3 tunnel corresponding to the PDU session. A QoS profile may provide the (R)AN 105 with mapping between QoS parameters and QoS flow identifiers. Multiple QoS profiles may be provided to the (R)AN 105. The PDU session ID may be used by AN signaling with the wireless device 100, for example, to indicate to the wireless device 100 an association between an AN resource and a PDU session for the wireless device 100.

At step 1911 (in FIGS. 19A and 19B), the AMF 155 may send, to the (R)AN 105, a message (e.g., N2 PDU session request) requesting a session. An N2 PDU session request may comprise N2 SM information and/or a NAS message. The NAS message may comprise a PDU Session ID and/or an N1 SM container (e.g., PDU session establishment accept). The AMF 155 may send the NAS message (e.g., comprising a PDU session ID and PDU session establishment accept) targeted to the wireless device 100. The AMF 155 may send the N2 SM information (e.g., received from the SMF 160) within an N2 PDU session request to the (R)AN 105.

At step 1912 (in FIGS. 19A and 19B), the (R)AN 105 and/or the wireless device 100 may send to the other one or more messages for an AN resource setup. The (R)AN 105 may issue an AN specific signaling exchange with the wireless device 100 that may be associated with the information received from SMF 160 (e.g., at step 1911). For example, a connection reconfiguration (e.g., an RRC connection reconfiguration in a 3GPP RAN) may be performed. The wireless device 100 may establish required RAN resources related to the QoS rules for the PDU session request (e.g., received at step 1910). The (R)AN 105 may allocate (R)AN N3 tunnel information for the PDU session. The (R)AN 105 may forward the NAS message (e.g., PDU session ID and/or an N1 SM container comprising a PDU session establishment accept) provided in step 1910 to the wireless device 100. The (R)AN 105 may provide the NAS message to the wireless device 100, for example, if the required RAN resources have been established and/or if the allocation of (R)AN tunnel information has been successful. The wireless device 100 may send, to the (R)AN 105, a message comprising one or more of: the Ethernet packet filter sets for a PDU session (e.g., which may be indicated by a PDU session ID) and/or Ethernet packet filter set(s) on a per wireless device basis (e.g., which may be indicated by one or more wireless device identities), on a per data network basis (e.g., which may be an APN indicated by a DNN), and/or on a per network slice basis (e.g., which may be indicated by one or more S-NSSAI). An Ethernet packet filter set may comprise one or more of: a source MAC address, a destination MAC address; an Ethertype (e.g., as set forth in IEEE 802.3); C-TAG and/or S-TAG VID fields (e.g., as set forth in IEEE 802.1Q); C-TAG and/or S-TAG PCP and/or DEI fields (e.g., as set forth in IEEE 802.1Q); and/or an IP packet filter set (e.g., if Ethertype indicates an IPv4 payload and/or an IPv6 payload). The IP packet filter set may comprise one or more of: source IP address, destination IP address, and/or prefix (e.g., for IPv6); source port number and/or destination port number; protocol ID of the protocol above IP and/or a next header type; type of service (e.g., for IPV4), traffic class (e.g., for IPv6), and/or a mask; flow label (e.g., for IPv6); and/or a security parameter index. The wireless device 100 may send the same Ethernet packet filter set(s) information as at step 1901. Additionally or alternatively, the wireless device 100 may send an updated Ethernet packet filter set(s) information that may differ from the Ethernet packet filter set(s) information sent at step 1901. The (R)AN 105 may perform one or more operations based on updated Ethernet packet filter set(s) information.

At step 1913 (in FIGS. 19A and 19B), the (R)AN 105 may send, to the AMF 155, a message (e.g., N2 PDU session response) responding to a session request (e.g., at step 1911). An N2 PDU session response may comprise one or more of: a PDU session ID, cause information, and/or N2 SM information (e.g., a PDU session ID, (R)AN tunnel information, a list of accepted and/or rejected QoS profiles). The (R)AN 105 may send, to the AMF 155, the Ethernet packet filter set(s) information received from the wireless 100. The (R)AN 105 may send the Ethernet packet filter set(s) information with the message responding to the session request. The (R)AN tunnel information may correspond to the Access Network address of the N3 tunnel corresponding to the PDU session.

At step 1914 (in FIGS. 19A and 19B), the AMF 155 may send, to the SMF 160, a message (e.g., Nsmf_PDUSession_UpdateSMContext request) requesting session information (e.g., N2 SM information). The AMF 155 may forward the N2 SM information received from the (R)AN 105 (e.g., at step 1913) to the SMF 160. The message to the SMF 160 may comprise the Ethernet packet filter set(s) information received from the (R)AN 105 (e.g., at step 1913).

At step 1915 (in FIGS. 19A and 19B), the SMF 160 may send, to the UPF 110, a message (e.g., N4 session modification request) requesting a session modification. If PCC is not supported and/or if there is no PCF in the network, the SMF 160 may make one or more policy decisions, for example, based on the information received from the AMF 155 (e.g., Ethernet packet filter set(s) information), subscription information, and/or other information. The SMF 160 may create a service data flow template for one or more policy rules, for example, based on the Ethernet packet filter set(s) information received from the AMF 155. The SMF 160 may initiate an N4 session establishment procedure with the UPF 110, for example, if the N4 session for the PDU session was not previously established. The SMF 160 may initiate an N4 session modification procedure with the UPF 110, for example, if the N4 session for the PDU session was previously established. The SMF 160 may provide AN tunnel information and/or CN tunnel information. It may be necessary for the SMF 160 to provide the CN tunnel information, for example, if the SMF 160 selected CN tunnel information. The SMF 160 may include one or more policies for the PDU session in the message requesting the session modification. The SMF 160 may include, with the one or more policies for the PDU session, the Ethernet packet filter set(s) information that may be received from the PCF 135.

At step 1916 (in FIGS. 19A and 19B), the UPF 110 may send, to the SMF 160, a message (e.g., N4 session modification response) responding to a session modification request (e.g., at step 1915). The UPF 110 may provide a N4 session establishment and/or modification response to the SMF 160. The UPF 110 may perform, using the Ethernet packet filter set(s) information, service flow detection and/or policy enforcement, for example, after and/or upon receiving a user plane data packet.

At step 1917 (in FIGS. 19A and 19B), the SMF 160 may send, to the AMF 155 a message (e.g., Nsmf_PDUSession_UpdateSMContext response) responding to a request for session information (e.g., at step 1914). The message may comprise cause information. After this step, the AMF 155 may forward relevant events to the SMF 160, for example, at a handover where the (R)AN tunnel information may change and/or if the AMF 155 is relocated.

Figure 20A:
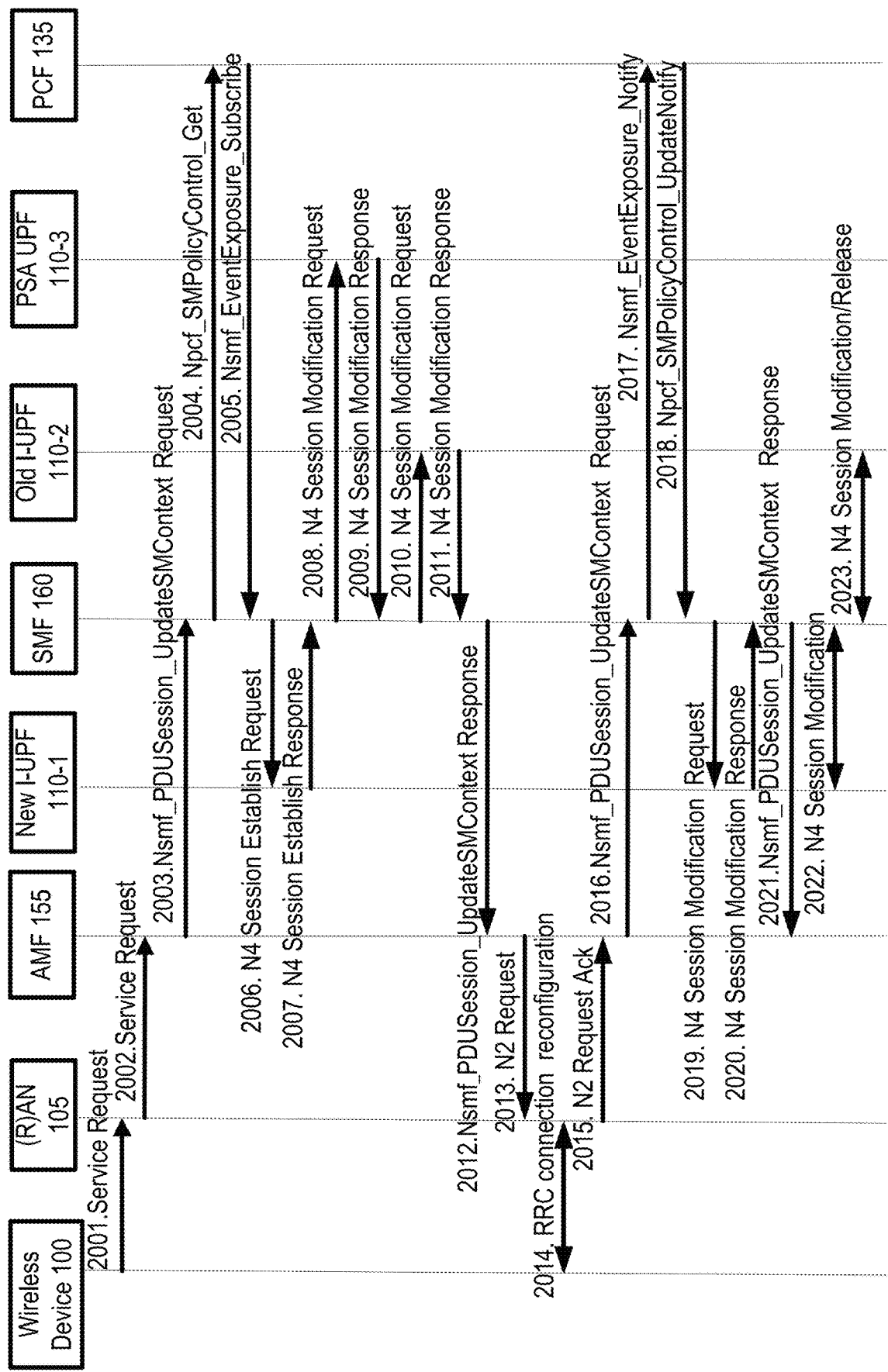
FIGS. 20A and 20B show examples of service request procedures.
Figure 20B:
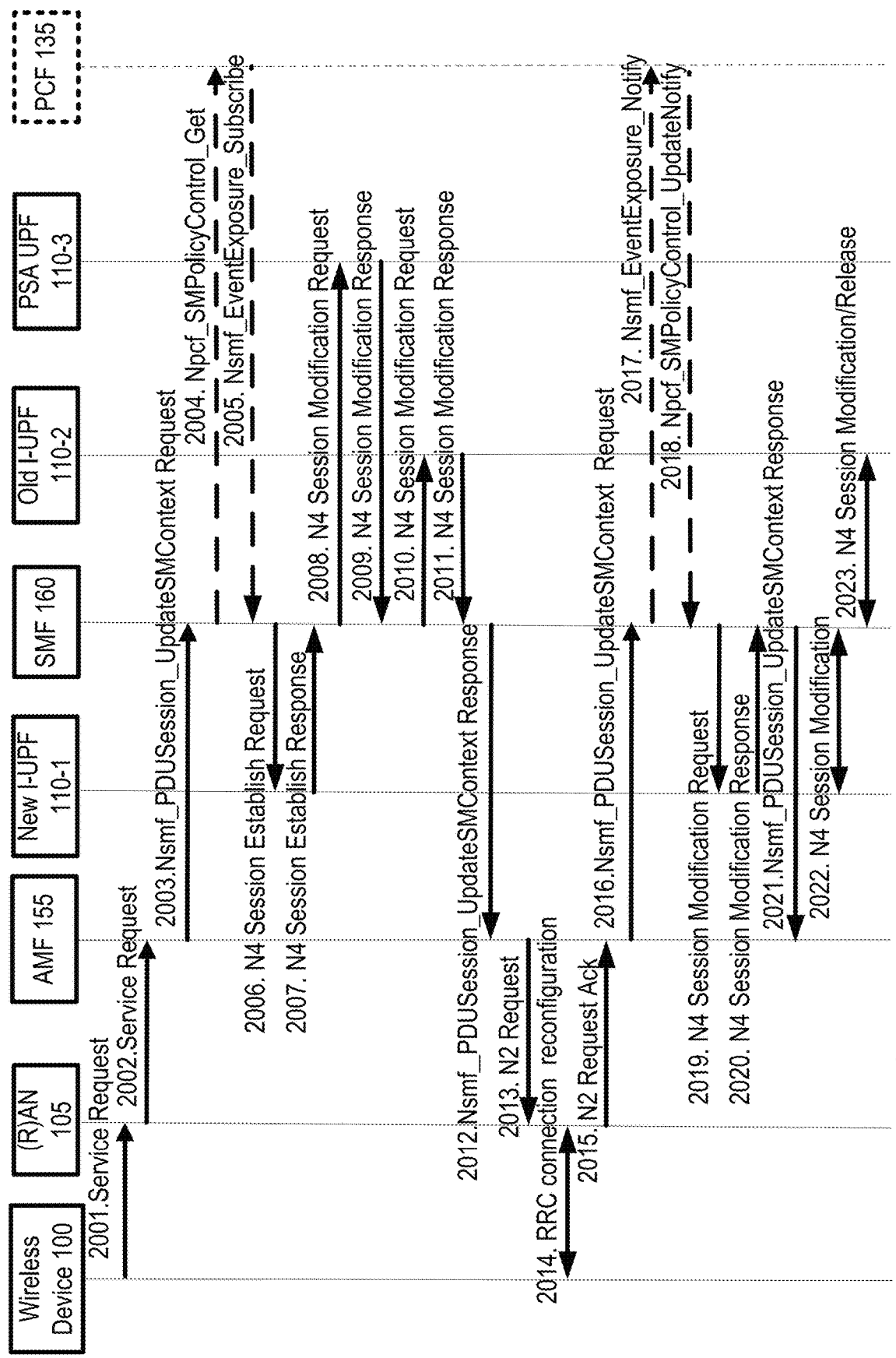

FIGS. 20A and 20B show examples of service request procedures. A wireless device 100 may initiate a service request procedure for an Ethernet type PDU session. FIG. 20A shows service request procedures that may involve a PCF (e.g., PCF 135). FIG. 20B shows service request procedures that may not involve a PCF (e.g., PCF 135). Steps 2001-2023 in FIG. 20A correspond to steps 2001-2023, respectively, in FIG. 20B, unless otherwise indicated.

At step 2001 (in FIGS. 20A and 20B), the wireless device 100 may send, to the (R)AN 105, a message requesting a service. The message may be an AN message. The message may comprise one or more of: AN parameters and/or an MM NAS service request (e.g., PDU session(s) to be activated, security parameters, and/or PDU session status). The AN parameters may comprise an establishment cause (e.g., for an NG-RAN). The establishment cause may provide a reason for requesting the establishment of an RRC connection. The wireless device 100 may send a NAS service request message, destined to the AMF 155, and/or encapsulated in an RRC message to the (R)AN 105. One or more RRC messages may be used to send a 5G-GUTI and/or NAS message. The message to the (R)AN 105 requesting a service may comprise one or more of: the Ethernet packet filter sets for a PDU session (e.g., indicated by a PDU session ID), and/or Ethernet packet filter set(s) on a per wireless device basis (e.g., which may be indicated by one or more wireless device identities), on a per data network basis (e.g., which may be an APN indicated by a DNN), and/or on a per network slice basis (e.g., which may be indicated by one or more S-NSSAI). The Ethernet packet filter set may comprise one or more of: a source MAC address and/or a destination MAC address; Ethertype (e.g., as set forth in IEEE 802.3); C-TAG and/or S-TAG VID fields (e.g., as set forth in IEEE 802.1Q); C-TAG and/or S-TAG PCP and/or DEI fields (e.g., as set forth in IEEE 802.1Q); and/or IP packet filter set (e.g., if Ethertype indicates an IPv4 payload and/or an IPv6 payload). The IP packet filter set may comprise one or more of: source IP address, destination IP address, and/or prefix (e.g., for IPv6); source port number and/or destination port number; protocol ID of the protocol above IP and/or a next header type; type of service (e.g., for IPV4), traffic class (e.g., for IPv6), and/or mask; flow label (e.g., for IPV6); and security parameter index.

At step 2002 (in FIGS. 20A and 20B), the (R)AN 105 may send, to the AMF 155, a message requesting service. The message may be an N2 message. The message may comprise N2 parameters and/or an MM NAS service request. The (R)AN 105 may include, in the message requesting service, the Ethernet packet filter set(s) information received from the wireless device 100 (e.g., at step 2001). The N2 parameters may comprise one or more of: 5G-GUTI (e.g., for an NG-RAN), location information, RAT type, and/or establishment cause. The AMF 155 may initiate (e.g., based on the PDU session status) a PDU session release procedure for the PDU sessions associated with the PDU session ID(s) that may be indicated by the wireless device 100 as not being available.

At step 2003 (in FIGS. 20A and 20B), the AMF 155 may send, to the SMF 160, a message (e.g., Nsmf_PDUSession_UpdateSMContext request) requesting information. The message may comprise one or more of: PDU session ID, cause information, wireless device location information, and/or access type. The AMF 155 may send, to the SMF 160, the Ethernet packet filter set(s) information received from the (R)AN 105. The AMF 155 may send the Ethernet packet filter set(s) information with the message requesting information. The Nsmf_PDUSession_UpdateSMContext request procedure may be invoked, for example, if the wireless device 100 identifies one or more PDU sessions that are to be activated in the MM NAS Service Request message.

At step 2004 (in FIG. 20A), the SMF 160 may send, to the PCF 135, a message (e.g., Npcf_SMPolicyControl_Get) requesting policy control information. The SMF 160 may invoke the Npcf_SMPolicyControl_Get operation to obtain one or more policies for one or more PDU sessions, after or in response to receiving the message from the AMF 155 in step 2003. The SMF 160 may send, to the PCF 135, the Ethernet packet filter set(s) information received from the AMF 155. The SMF 160 may send the Ethernet packet filter set(s) information with the message requesting policy control information. While step 2004 is additionally shown in FIG. 20B for reference, this step may not be performed in FIG. 20B, for example, if the PCF 135 is not used for this step. For example, in FIG. 20B, the SMF 160 may determine or obtain one or more policies without communicating with a PCF. Step 2004 may be omitted, for example, if PCC is not supported and/or if there is no PCF in the network. The SMF 160 may make one or more policy decisions, for example, based on the information received from the AMF 155 (e.g., Ethernet packet filter set(s) information), subscription information, and/or other information. The SMF 160 may create the service data flow template for the one or more policy rules, for example, based on the Ethernet packet filter set(s) information received from the AMF 155.

At step 2005 (in FIG. 20A), the PCF 135 may send, to the SMF 160, a message (e.g., Nsmf_EventExposure_Subscribe) responding to a request for policy control information. The PCF 135 may perform one or more steps, for example, after or in response to receiving the message from the SMF 160. The PCF 135 may make one or more policy decisions, for example, based on the information received from the SMF 160 (e.g., Ethernet packet filter set(s) information), subscription information, and/or other information. The PCF may create the service data flow template for the one or more policy rules, for example, based on the Ethernet packet filter set(s) information received from the SMF 160. The PCF 135 may send, to the SMF 160, a message (e.g., a policy response) comprising one or more of:

a QoS policy for the PDU session(s); a charging policy for the PDU session(s); traffic steering control for steering traffic; and/or other policies. The PCF 135 may send, with the message providing one or more policies, the Ethernet packet filter set(s) information. The PCF 135 may subscribe one or more event(s) in the SMF 160, for example, by invoking the Nsmf_EventExposure_Subscribe operation. While step 2005 is additionally shown in FIG. 20B for reference, this step may not be performed in FIG. 20B, for example, if the PCF 135 is not used for this step. For example, in FIG. 20B, the SMF 160 may determine or obtain one or more policies without communicating with a PCF. Step 2005 may be omitted, for example, if PCC is not supported and/or if there is no PCF in the network At step 2006 (in FIGS. 20A and 20B), the SMF 160 may select a new UPF (e.g., new I-UPF 110-1) to act as an intermediate UPF for a PDU session. The SMF 160 may send, to the new I-UPF 110-1, a message (e.g., N4 session establish request) requesting session establishment. The session establishment request message may comprise information for packet detection, data forwarding, enforcement, and/or reporting rules to be installed on the new I-UPF 110-1. The session establishment request message may be sent with the Ethernet packet filter set(s) information. The PDU session anchor addressing information (e.g., on N9) for the PDU Session may be provided to the new I-UPF 110-1. The SMF 160 may include a data forwarding indication, for example, if a service request is triggered by the network and/or if a new I-UPF 110-1 is selected by the SMF 160 to replace the old I-UPF 110-2.

At step 2007 (in FIGS. 20A and 20B), the new UPF 110-1 may send, to the SMF 160, a message (e.g., N4 session establish response) responding to a session establishment request (e.g., at step 2006). The new I-UPF 110-1 may provide CN DL tunnel information for a PSA UPF 110-3 (e.g., which may be acting as a PDU session anchor) and/or UL tunnel information (e.g., CN N3 tunnel information) to the SMF 160, for example, if the new I-UPF 110-1 allocates CN tunnel information. The new I-UPF 110-1 (e.g., acting as an N3 terminating point) may send CN DL tunnel information to the SMF 160 for the old I-UPF 110-2, for example, if a data forwarding indication is received by the new I-UPF 110-1. The new I-UPF 110-1 may perform (e.g., based on the Ethernet packet filter set(s) information) service flow detection and/or policy enforcement, after and/or upon receiving a user plane data packet.

At step 2008 (in FIGS. 20A and 20B), the SMF 160 may send, to the PSA UPF 110-3, a message (e.g., N4 session modification request) requesting a session modification. The SMF 160 may send an N4 session modification request message to a PDU session anchor (PSA) (e.g., UPF 110-3), for example, if the SMF 160 selects a new UPF to act as intermediate UPF for the PDU session. The message requesting a session modification may provide the DL tunnel information from the new I-UPF 110-1. The SMF 160 may send, to the PSA UPF 110-3, information for packet detection, data forwarding, enforcement, and/or reporting rules. The SMF 160 may send (e.g., with the message requesting a session modification) the Ethernet packet filter set(s) information to the PSA UPF 110-3. The PSA UPF 110-3 may perform (e.g., based on the Ethernet packet filter set(s) information), service flow detection and/or policy enforcement, after and/or upon receiving the user plane data packet.

At step 2009 (in FIGS. 20A and 20B), the PSA UPF 110-3 may send, to the SMF 160, a message (e.g., N4 session modification response) that may respond to a session modification request (e.g., at step 2008).

At step 2010 (in FIGS. 20A and 20B), the SMF 160 may send, to the old I-UPF 110-2, a message (e.g., N4 session modification request) requesting a session modification. The message may comprise a new I-UPF 110-1 address and/or a new I-UPF 110-1 DL tunnel ID. The SMF 160 may send the N4 session modification request message to the old I-UPF 110-2, for example, if the service request is triggered by the network and/or if a new I-UPF 110-1 is selected by the SMF 160 to replace the old I-UPF 110-2. The message requesting the session modification may provide the DL tunnel information from the new I-UPF 110-1, which may be acting as an N3 terminating point.

At step 2011 (in FIGS. 20A and 20B), the old I-UPF 110-2 may send, to the SMF 160, a message (e.g., N4 session modification response) responding to a session modification request (e.g., at step 2010). The old I-UPF 110-2 may forward its buffered data to the new I-UPF 110-1, which may be acting as N3 terminating point.

At step 2012 (in FIGS. 20A and 20B), the SMF 160 may send, to the AMF 155, a message (e.g., Nsmf_PDUSession_UpdateSMContext response) responding to a message requesting information (e.g., at step 2003). The message responding to the request may comprise N1 SM information (e.g., PDU session ID(s) and/or PDU session re-establishment indication), N2 SM information (e.g., PDU session ID(s), QoS profile(s), CN N3 tunnel information, and/or S-NSSAI), and/or cause information. The SMF 160 may determine whether UPF reallocation is performed, for example, after or in response to receiving a message (e.g., Nsmf_PDUSession_UpdateSMContext request in step 2013) from the AMF 155 and/or after determining that the message from the AMF 155 comprises cause information that includes an establishment of user plane resources. The SMF 160 may determine whether UPF relocation is performed, for example, based on the wireless device 100 location information, UPF service area, and/or one or more policies (e.g., operator policies). The SMF 160 may generate N2 SM information and/or send a response (e.g., Nsmf_PDUSession_UpdateSMContext response) to the AMF 155 to establish the user plane(s), for example, for a PDU Session that the SMF 160 has determined is still being served by the current UPF (e.g., the PSU UPF 110-3 and/or the old I-UPF 110-2). The N2 SM information may comprise information that the AMF 155 may provide to the (R)AN 105. The SMF 160 may send, via the AMF 155, a message (e.g., Nsmf_P-DUSession_UpdateSMContext response) comprising N1 SM information for the wireless device 100, for example, for a PDU session that the SMF 160 may have determined to require a UPF relocation for the PSA-UPF 110-3. The N1 SM information may comprise a corresponding PDU session ID and/or a PDU session re-establishment indication.

At step 2013 (in FIGS. 20A and 20B), the AMF 155 may send, to the (R)AN 105, a request message (e.g., N2 request). The request message may comprise one or more of: N2 SM information received from the SMF 160, a security context, an AMF signaling connection ID, a handover restriction list, an MM NAS service accept, a list of recommended cells, tracking areas (TAs), and/or NG-RAN node identifiers. The AMF 155 may include, in or with the request message, at least one N2 SM information from the SMF 160, for example, if a procedure is triggered for PDU session user plane activation.

At step 2014 (in FIGS. 20A and 20B), the (R)AN 105 and/or the wireless device 100 may send one or more messages to the other for a connection reconfiguration (e.g., RRC connection reconfiguration). The (R)AN 105 may perform RRC connection reconfiguration with the wireless device 100, for example, based on one or more of: QoS information for the QoS flows of the PDU sessions comprising activated UP connections, and/or data radio bearers. The (R)AN 105 may forward an MM NAS service accept to the wireless device 100. The wireless device 100 may locally delete context of PDU sessions that may not be available (e.g., that may not be available in the 5GC). The wireless device 100 may initiate (e.g., after the service request procedure is complete) PDU session re-establishment for such unavailable PDU session(s) and/or other PDU sessions, for example, if the N1 SM information is present in the service accept and/or indicates one or more PDU sessions should be re-established. The wireless device 100 may send, to the (R)AN 105, a message comprising one or more of: the Ethernet packet filter sets for a PDU session (e.g., indicated by a PDU session ID) and/or Ethernet packet filter set(s) on a per wireless device basis (e.g., which may be indicated by one or more wireless device identities), on a per data network basis (e.g., which may be an APN indicated by a DNN), and/or on a per network slice basis (e.g., which may be indicated by one or more S-NSSAI). An Ethernet packet filter set may comprise one or more of: a source MAC address and/or a destination MAC address; an Ethertype (e.g., as set forth in IEEE 802.3); a C-TAG and/or S-TAG VID fields (e.g., as set forth in IEEE 802.1Q); a C-TAG and/or S-TAG PCP and/or DEI fields (e.g., as set forth in IEEE 802.1Q); and/or an IP packet filter set (e.g., if Ethertype indicates an IPv4 payload and/or an IPV6 payload). The IP packet filter set may comprise one or more of: a source IP address, a destination IP address, and/or a prefix (e.g., for IPv6); a source port number and/or a destination port number; a protocol ID of the protocol above IP and/or a next header type; a type of service (e.g., for IPV4), a traffic class (e.g., for IPV6), and/or a mask; a flow label (e.g., for IPV6); and/or a security parameter index. The wireless device 100 may send the same Ethernet packet filter set(s) information as in step 2001. Additionally or alternatively, the wireless device 100 may send updated Ethernet packet filter set(s) information that may differ from the Ethernet packet filter set(s) information send at step 2001. The (R)AN 105 may use the updated Ethernet packet filter set(s) information for one or more steps.

At step 2015 (in FIGS. 20A and 20B), the (R)AN 105 may send, to the AMF 155, a message (e.g., N2 request acknowledgment) acknowledging a request (e.g., at step 2013). The message acknowledging the request may comprise N2 SM information. The N2 SM information may comprise one or more of: RAN tunnel information, a list of accepted QoS flows for the PDU sessions having activated UP connections, and/or a list of rejected QoS flows for the PDU Sessions having activated UP connections. The (R)AN 105 may include, in or with the message to the AMF 155 acknowledging the request, the Ethernet packet filter set(s) information received from the wireless device 100 (e.g., at step 2001 and/or at step 2014).

At step 2016 (in FIGS. 20A and 20B), the AMF 155 may send, to the SMF 160, a message (e.g., Nsmf_PDUSession_UpdateSMContext request) requesting information. The message may request the information (and/or updated information) corresponding to the information requested at step 2003. The message at step 2016 may request N2 SM information (e.g., RAN tunnel information) and/or RAT type) per accepted PDU session. The AMF 155 may include, in or with the message at step 2016, the Ethernet packet filter set(s) information received from the (R)AN 105 (e.g., at step 2002 and/or step 2015).

At step 2017 (in FIG. 20A), the SMF 160 may send, to the PCF 135, a message (e.g., Nsmf_EventExposure_Notify) reporting one or more events. The SMF 160 may invoke, for example, the Nsmf_EventExposure_Notify service operation, to report one or more events to the PCF 135 that may have been previously subscribed. While step 2017 is additionally shown in FIG. 20B for reference, this step may not be performed in FIG. 20B, for example, if the PCF 135 is not used for this step. For example, in FIG. 20B, the SMF 150 may determine one or more policies without communicating with a PCF. Step 2017 may be omitted, for example, if PCC is not supported and/or if there is no PCF in the network.

At step 2018 (in FIG. 20A), the PCF 135 may send, to the SMF 160, a message (e.g., Npcf_SMPolicyControl_UpdateNotify) updating one or more policies. The PCF 135 may provide one or more updated policies to the SMF 160 by invoking the Npcf_SMPolicyControl_UpdateNotify service operation. The PCF 135 may provide an authorized session-AMBR and/or an authorized 5QI and/or ARP to the SMF 160. The PCF 135 may provide the one or more policies with the Ethernet packet filter set(s) information. While step 2018 is additionally shown in FIG. 20B for reference, this step may not be performed in FIG. 20B, for example, if the PCF 135 is not used for this step. For example, in FIG. 20B, the SMF 160 may determine one or more policies without communicating with a PCF. Step 2018 may be omitted, for example, if PCC is not supported and/or if there is no PCF in the network. The SMF 160 may make one or more policy decisions, for example, based on information received from the AMF 155 (e.g., Ethernet packet filter set(s) information), subscription information, and/or other information. The SMF 160 may create the service data flow template for one or more policy rules based on the Ethernet packet filter set(s) information received from the AMF 155.

At step 2019 (in FIGS. 20A and 20B), the SMF 160 may send, to the new UPF 110-1, a message (e.g., N4 session modification request) requesting a session modification. The SMF 160 may initiate an N4 session modification procedure and/or provides RAN tunnel information, for example, if the SMF 160 selected a new UPF (e.g., the new I-UPF 110-1) to act as intermediate UPF for the PDU session. The SMF 160 may provide information for one or more rules for packet detection, data forwarding, enforcement, and/or reporting rules to be installed on the new I-UPF 110-1. The SMF 160 may include the information for the one or more rules in or with the Ethernet packet filter set(s) information.

At step 2020 (in FIGS. 20A and 20B), the new I-UPF 110-1 may send, to the SMF 160, a message (e.g., N4 session modification response) responding to a session modification request (e.g., at step 2019). The message at step 2020 may comprise information (and/or updated information) corresponding to the information provided by the message at step 1916.

At step 2021 (in FIGS. 20A and 20B), the SMF 160 may send, to the AMF 155, a message (e.g., Nsmf_PDUSession_UpdateSMContext response) responding to a request for session information (e.g., at step 2016). The message may comprise cause information.

At step 2022 (in FIGS. 20A and 20B), the SMF 160 and/or the new I-UPF 110-1 may send one or more messages to the other for a session modification (e.g., N4 session modification). The SMF 160 may send an N4 session modification request to new I-UPF 110-1 (which may be acting as an N3 terminating point to release a forwarding tunnel), for example, if the forwarding tunnel has been established and/or if a timer SMF 160 may have set for the forwarding tunnel has expired. The new I-UPF 110-1 may respond to the SMF 160 by sending an N4 session modification response.

At step 2023 (in FIGS. 20A and 20B), the SMF 160 and/or the old I-UPF 110-2 may send one or more messages to the other for a session modification and/or release (e.g., N4 session modification and/or release). The SMF 160 may send to the old I-UPF 110-2 an N4 session modification request providing (R)AN tunnel information, for example, if the SMF 160 determined to continue using the old I-UPF 110-2 before step 2006. The SMF 160 may initiate a resource release by sending an N4 session release request (e.g., release cause) to the old I-UPF 110-2, for example, if the SMF 160 determined to select a new UPF to act as intermediate UPF before step 2006 and/or if the old I-UPF 110-2 is not PSA UPF.

Figure 21:
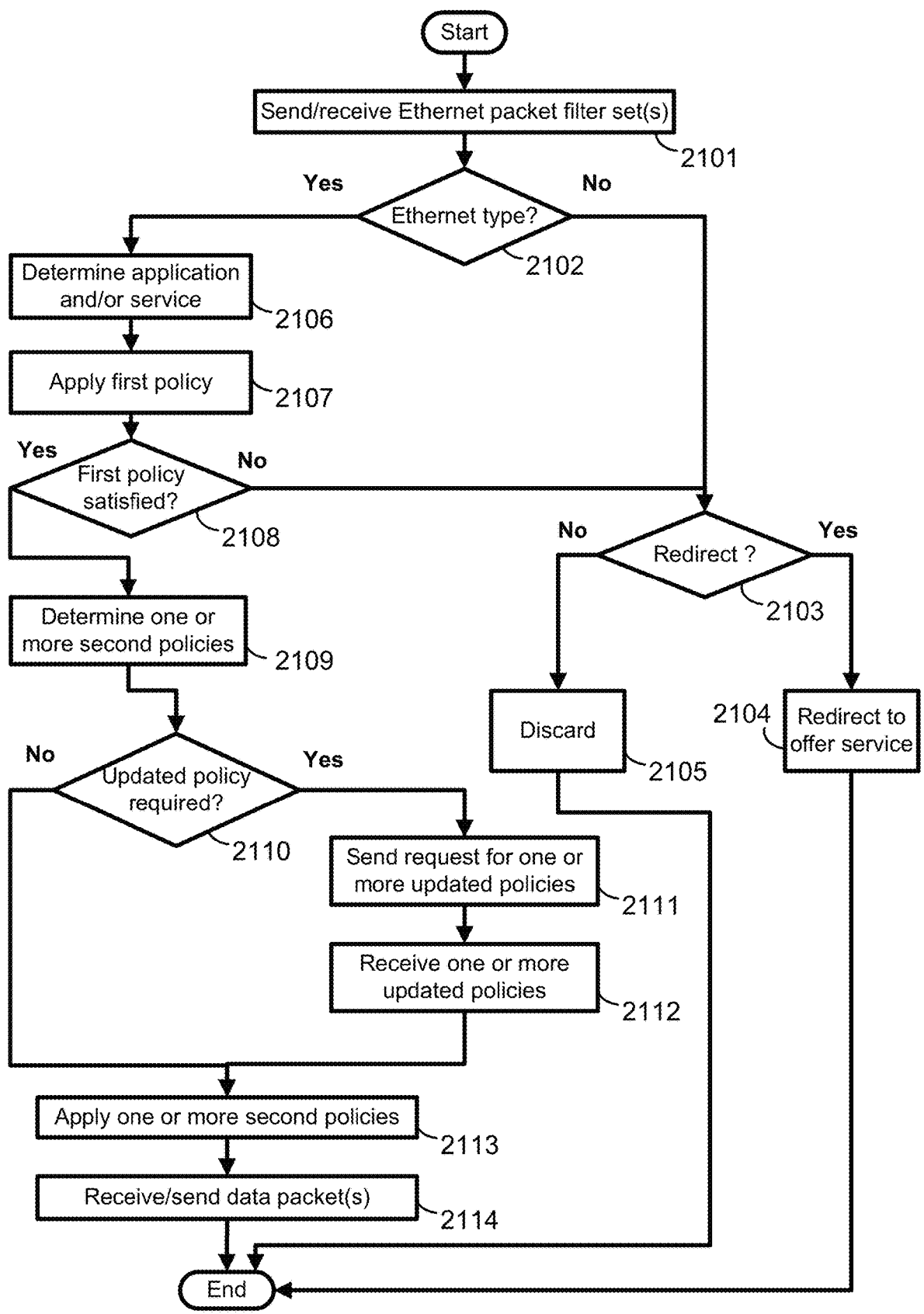
FIG. 21 shows an example of an Ethernet over wireless communications procedure that may be performed by a computing device.

FIG. 21 shows an Ethernet over wireless communications procedure that may be performed, in whole or in part, by one or more computing devices. As examples, the procedure shown in FIG. 21 may be performed by a session management function (e.g., the SMF 160). Additionally or alternatively, at least some of the procedure shown in FIG. 21 may be performed by a policy control function (e.g., PCF 135), a wireless device (e.g., wireless device 100), and/or a data network (e.g., DN 115). Any other computing device may perform one or more portions of the procedures shown in FIG. 21 for Ethernet over wireless communications.

At step 2101, a wireless device (e.g., the wireless device 100) may send, to a session management function (e.g., the SMF 160) one or more messages comprising one or more Ethernet packet filter sets. The Ethernet packet filter sets may comprise one or more of a source MAC address, a destination MAC address, an Ethertype, a virtual local area network tag, and/or an IP packet filter set. The Ethernet packet filter set may be associated with one or more of: a PDU session, the wireless device, a data network, and/or a network slice. The wireless device may send the one or more messages to an access network (e.g., the (R)AN 105), to one or more base stations, and/or to an access and mobility management function (e.g., the AMF 155). The access network may send the one or more messages to the session management function (e.g., via a user plane function such as the UPF 110) and/or the access and mobility management function. The access and mobility management function may send the one or more messages to the session management function. The session management function may receive the one or more messages.

At step 2102, a computing device (e.g., a session management function) may determine whether the one or more Ethernet packet filter sets comprise a request for an Ethernet type PDU session. The computing device may make such a determination based on an Ethertype in the Ethernet packet filter sets. If the computing device determines that at least one of the Ethernet packet filter sets is not associated with a request for an Ethernet type PDU session, the procedure may continue to step 2103. If the computing device determines that at least one of the Ethernet packet filter sets is associated with a request for an Ethernet type PDU session, the procedure may continue to step 2106.

At step 2103, the computing device (e.g., a session management function) may determine whether to redirect the wireless device. For example, if the one or more messages from step 2101 indicate a type of service that is not supported for the wireless device (e.g., based on one or more policies or an availability of one or more applications), the computing device may send a message to the wireless device indicating one or more options for the wireless device to obtain support for the type of service (e.g., updating one or more policies to include a registration of one or more services associated with the type, or identifying another computing device that may provide services for the type). If the computing device determines to redirect the wireless device (e.g., based on an indication from the wireless device requesting redirection), at step 2104, the computing device may redirect the wireless device to an offer for initiating service of the type of service not presently supported for the wireless device. If the computing device determines not to redirect the wireless device (e.g., based on a timer expiration or receiving an indication from the wireless device declining redirection), at step 2105, the computing device may discard the Ethernet packet filter set(s) associated with the type that is not supported for the wireless device. After step 2104 and/or step 2105, the procedure may end.

At step 2106, the computing device (e.g., a session management function) may determine an application and/or service for Ethernet over wireless communications for the wireless device, for example, if a type of a session request associated indicated by the one or more messages is confirmed, at step 2102, to be an Ethernet type. The computing device may determine at least one policy rule (e.g., a QoS rule), one or more parameters for the at least one policy rule (e.g., QoS parameters), and/or a policy decision (e.g., whether QoS is satisfied), based on the one or more Ethernet packet filter sets. The computing device may determine an application and/or type of service based on a MAC address (e.g., a destination MAC address and/or a source MAC address) in the one or more Ethernet packet filter sets. The destination MAC address may indicate an application server that may be associated with a one or more applications and/or services. The source MAC address may indicate a location and/or a profile associated with the wireless device that may indicate one or more applications and/or services.

At step 2107, the computing device (e.g., a session management function) may apply a first policy. The first policy may comprise one or more rules. A rule may be a policy rule (e.g., a rule associated with a policy), a charging rule (e.g., a rule associated with a charging policy), or a policy and charging rule (e.g., a policy and charging control rule (PCC)). A policy rule may comprise, for example, one or more of a: quality of service (QOS) rule, a gating rule, a traffic detection rule, a traffic steering control rule, and/or any other rule that may be associated with a user, device, and/or service. A QoS rule may be based on one or more priority levels (e.g., high priority, low priority, or any other level of priority). A priority level may be associated with a particular value or range of values for a bandwidth, latency, and/or allowance and retention (ARP). A gating rule may be based on a packet type (e.g., Ethertype) or a service access level (e.g., user and/or device authorization to access one or more services using Ethernet over wireless communications). A traffic detection rule may be based on a determination of whether signal traffic that may be associated with an Ethernet PDU session may be satisfied for a request for the Ethernet PDU session. The traffic detection rule may comprise detecting a service flow based on receiving a user plane data packet. A traffic steering control rule may comprise directing traffic associated with an Ethernet PDU session for optimal network performance.

At step 2108, the computing device (e.g., a session management function and/or a user plane function) may determine whether the first policy is satisfied. For example, based on whether the first policy is satisfied (e.g., a gating rule), the computing device may allow or discard packets. If the first policy is not satisfied, the procedure may continue to step 2103 described above. If the first policy is satisfied, the procedure may continue to step 2109.

At step 2109, the computing device (e.g., a session management function, a policy control function, and/or a user plane function) may determine one or more second policies to apply to the Ethernet packet filter set(s). The one or more second policies may comprise one or more rules, such as a policy rule, a charging rule, and/or a PCC. The one or more second policies may comprise for example, one or more of a: quality of service (QOS) rule, a gating rule, a traffic detection rule, a traffic steering control rule, and/or any other rule that may be associated with a user, device, and/or service, such as described above regarding step 2107. The one or more second policies may comprise at least one charging rule (e.g., a PCC). A charging rule may be associated with charging (e.g., online charging, offline charging, and/or converged charging) associated with a particular user, device, and/or group of users and/or devices. Charging information may be based on one or more ratings (e.g., cost-per-service associated with one or more users and/or devices) and/or addresses (e.g., source MAC address of the wireless device and/or destination MAC address of an application server associated with the service requested by the wireless device). The computing device may store and/or maintain at least some information about one or more charging rules that may be associated with a wireless device. Additionally or alternatively, the computing device (e.g., a session management function) may obtain one or more charging rules and/or updates to one or more charging rules from a second computing device (e.g., a policy control function such as the PCF 135).

At step 2110, the computing device (e.g., a session management function) may determine whether the one or more second policies requires an updated policy. If at least one of the one or more second policies require an update (e.g., based on the computing device not having at least one of the one or more second policies and/or not having a recent version of at least one of the one or more second policies), the procedure may continue to step 2111. If at least one of the one or more second policies do not require an update, the procedure may continue to step 2113.

At step 2111, the computing device (e.g., a session management function) may send a request for one or more updated policies. The computing device may send the request to a second computing device (e.g., a policy control function). The request for one or more updated policies may comprise a request for a policy and charging control rule and/or the one or more Ethernet packet filter sets for a data flow. The computing device (e.g., a session management function) may send a message to a third computing device (e.g., a user plane function such as UPF 110) comprising the one or more Ethernet packet filter sets for the data flow and/or one or more parameters indicating a policy rule. The message to the third computing device (e.g., a user plane function) may comprise a request to establish a user plane session.

At step 2112, the computing device (e.g., a session management function) may receive, from the second computing device (e.g., a policy control function), a response message comprising one or more updated policies. The one or more updated policies may comprise at least one charging policy (e.g., a PCC) corresponding to the requested policy and charging control rule. The computing device (e.g., a session management function) may send the one or more updated policies to the third computing device (e.g., a user plane function). The computing device (e.g., a session management function) may receive from the third computing device (e.g., a user plane function) a message indicating that the third computing device has received the message from the computing device. The message from the third computing device (e.g., a user plane function) may comprise a user plane data packet. The third computing device (e.g., a user plane function) may enforce the policy rule and/or the policy and charging control rule sent at step 2111, for example, based on quality of service parameters associated with information in the one or more Ethernet packet filter sets.

At step 2113, the computing device (e.g., a user plane function and/or a session management function) may apply the one or more second policies to the Ethernet packet filter set(s). For example, the computing device may provide for an Ethernet PDU session requested by the wireless device to the extent the request complies with the policy rules of the one or more second policies, and/or the computing device may associate charging information with the Ethernet PDU session requested by the wireless device.

At step 2114, the computing device (e.g., a user plane function, an access network, and/or a session management function) may send and/or receive data packets associated with the Ethernet PDU session requested by the wireless device. The wireless device may receive the data packets associated with the Ethernet PDU session requested by the wireless device. After step 2114, the Ethernet PDU session requested by the wireless device may end and the procedure shown in FIG. 21 may end.

Figure 22:
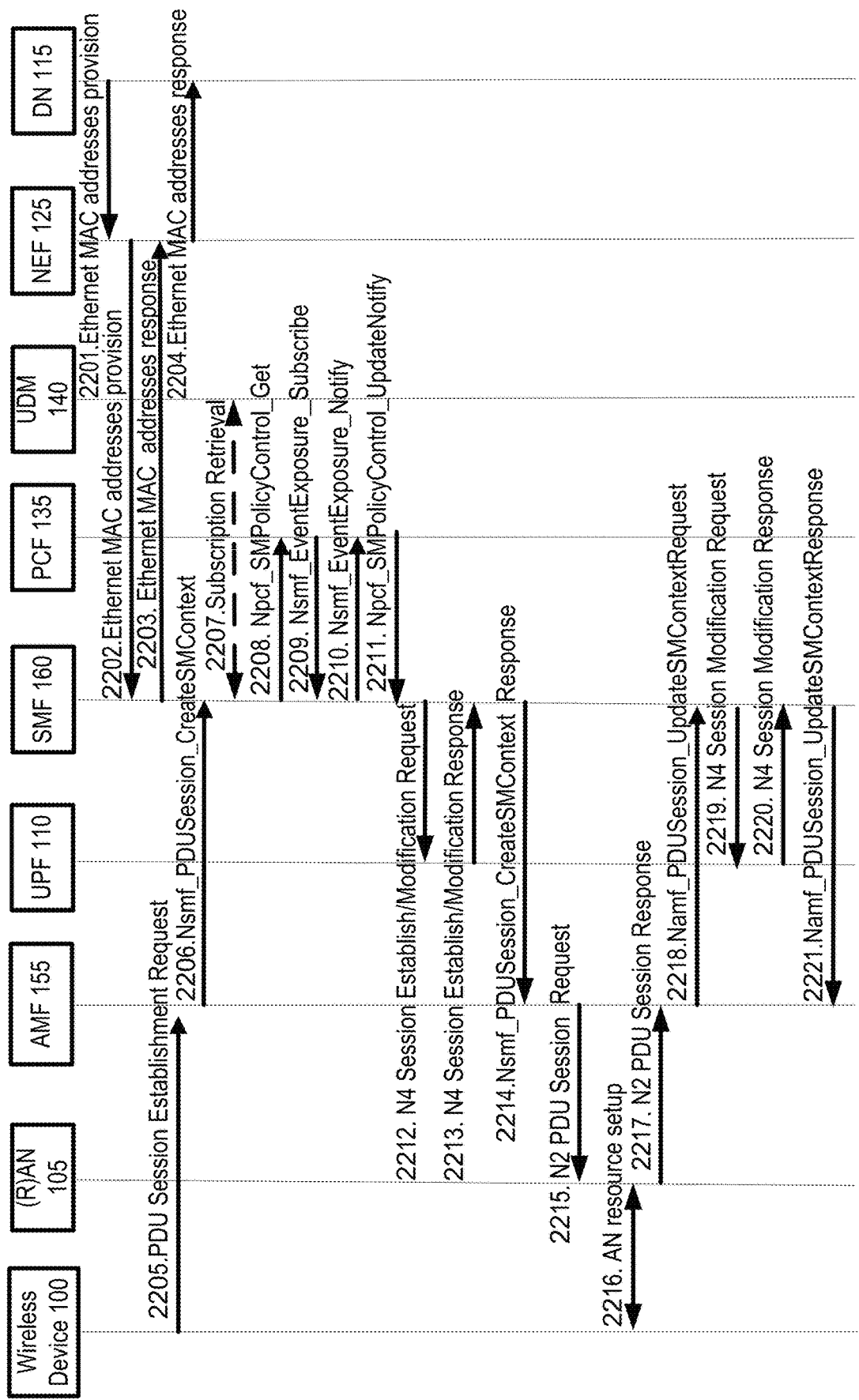
FIG. 22 shows an example of procedures involving a network exposure function.

FIG. 22 shows an example of procedures involving a network exposure function (NEF) in which a data network (DN) may send, to an NEF, one or more Ethernet packet filter set(s) information, wireless device identities and/or identifiers, and/or addresses (e.g., source MAC addresses and/or destination MAC addresses).

At step 2201, the DN 115 may send, to the NEF 125, a first message (e.g., Ethernet MAC addresses provision). The first message may comprise one or more Ethernet MAC addresses. Additionally or alternatively, the first message may comprise one or more of: wireless device identities and/or identifiers (e.g., wireless device NAI, SUPI, 5G-GUTI, and/or other identifiers); data network name (DNN) and/or an APN; PDU session ID(s); S-NSSAI (e.g., indicating a network slice); and/or Ethernet packet filter sets per wireless device (e.g., which may be indicated by one or more wireless device identities), per data network (e.g., which may be an APN indicated by a DNN), per network slice (e.g., which may be indicated by an S-NSSAI); and/or per PDU session (e.g., which may be indicated by a PDU session ID). An Ethernet packet filter set may comprise one or more of: a source MAC address and/or a destination MAC address; an Ethertype (e.g., as set forth in IEEE 802.3); Customer-VLAN tag (C-TAG) and/or Service-VLAN tag (S-TAG) VID fields (e.g., as set forth in IEEE 802.1Q); C-TAG and/or S-TAG PCP and/or DEI fields (e.g., as set forth in IEEE 802.1Q); and IP packet filter set (e.g., if Ethertype indicates an IPv4 payload and/or an IPV6 payload). An IP packet filter set may comprise one or more of: a source IP address, a destination IP address, and/or a prefix (e.g., for IPV6); a source port number and/or a destination port number; a protocol ID of the protocol above IP and/or a next header type; a type of service (e.g., for IPV4), a traffic class (e.g., for IPV6), and/or mask; a flow label (e.g., for IPV6); and/or a security parameter index.

At step 2202, the NEF 125 may perform one or more steps, for example, after or in response to receiving the first message from the DN 115. The NEF 125 may select an SMF (e.g., the SMF 160). The NEF 125 may select an SMF by using an NRF, for example, by providing one or more of the following information, that may be received from the DN 115, to the NRF: wireless device identity and/or identifier; data network name (DNN); PDU session ID; and/or S-NSSAI. The NEF 125 may send, to a selected SMF (e.g., the SMF 160), a second message (e.g., Ethernet MAC addresses provision). The second message may comprise some or all of the information in the first message received from the DN 115 at step 2201.

At step 2203, the SMF 160 may send, to the NEF 125, a third message (e.g., Ethernet MAC addresses response). The SMF 160 may store information received from the second message (e.g., MAC addresses and/or Ethernet packet filter set(s) information) and/or send to the NEF 125 the third message (e.g., Ethernet MAC addresses response) after or in response to receiving the second message from the NEF 125 at step 2202.

At step 2204, the NEF 125 may send, to the DN 115, a fourth message (e.g., Ethernet MAC addresses response). The NEF 125 may send to the DN 115 the fourth message (e.g., Ethernet MAC addresses response), for example, after or in response to receiving the third message from the SMF 160 at step 2203. The fourth message may comprise some or all of the information in the third message received from the SMF 160 at step 2203.

Steps 2201-2204 may occur at any time, including at a time that may or may not be associated with steps 2205-2221. For example, steps 2201-2204 may occur periodically, as part of a procedure to initiate communications with the DN 115 and/or any device, as part of a procedure to configure one or more devices for communications in a network, as part of a procedure to provide network updates, and/or as part of any other procedure.

At step 2205, a wireless device 100 may send, to the AMF 155, a message (e.g., PDU session establishment request) requesting establishment of a session. The session may comprise an Ethernet type PDU session (e.g., Ethernet over wireless communications). The wireless device 100 may initiate a PDU session establishment procedure, for example, by sending to an AMF 155 an NAS Message. The NAS message may comprise one or more of: an S-NSSAI, a DNN, a PDU session ID, a request type, and/or an N1 SM container. The N1 SM container may comprise a PDU session establishment request. The NAS Message and/or an N1 SM container may comprise one or more wireless device identities and/or identifiers (e.g., SUPI, 5G-GUTI, and/or others). The wireless device 100 may initiate the wireless device requested PDU session establishment procedure, for example, by the transmission of a NAS message containing a PDU session establishment request within an N1 SM container. The PDU session establishment request may comprise one or more of: a PDU type (e.g., Ethernet), an SSC mode, protocol configuration options, and/or a PDU session ID that may be generated by the wireless device 100.

At step 2206, the AMF 155 may send, to the SMF 160, a message (e.g., Namf_PDUSession_CreateSMContext) for a session. The AMF 155 may perform one or more steps, for example, after or in response to receiving the message at step 2205. The AMF 155 may select an SMF (e.g., the SMF 160). The AMF 155 may select an SMF (e.g., SMF 160) using an NRF, for example, by providing one or more of the following information, that may be received from the wireless device 100, to the NRF: wireless device identity and/or identifier; data network name (DNN); PDU session ID; and/or S-NSSAI. The NRF may select an SMF based on information that the NRF receives from the AMF 155, which may comprise the same information that the AMF 155 received from the wireless device 100 (e.g., at step 2206). The NRF may select an SMF based on the same NRF selection procedure in step 2202. The NRF may select an SMF based on a comparison of information the NRF received from the AMF 155 (e.g., at step 2206) with information the NRF received from the NEF 125 (e.g., at step 2202). The AMF 155 may send, to the SMF 160, a message (e.g., Namf_PDUSession_CreateSMRequest) comprising one or more of: a SUPI, a DNN, a S-NSSAI, a PDU session ID, an AMF ID, a request type, an N1 SM container (e.g., PDU session establishment request), user and/or device location information, an access type, and/or a PEI. The N1 SM container may comprise a PDU session establishment request.

At step 2207, the SMF 160 and/or the UDM 140 may send one or more messages to the other, for example, for a subscription retrieval. The SMF 160 may correlate, compare, and/or map information received from the AMF 155 (e.g., at step 2206) with information received from the NEF 125 (e.g., at step 2202), for example, after or in response to receiving the message from the AMF 155. The SMF 160 may correlate and/or compare addresses and/or Ethernet packet filter set(s) that may have been received from the NEF 125, with one or more of the following information that may have been received from the AMF 155: wireless device identities and/or identifiers; data network name (DNN); PDU session ID; and/or S-NSSAI. The SMF 160 may register with the UDM 140, for example, if the SMF 160 has not yet registered and/or if subscription data is not available. The SMF 160 may retrieve subscription data. The SMF 160 may subscribe to be notified, for example, if subscription data is modified. The SMF 160 may select a UPF and/or trigger a PDU session establishment authentication and/or authorization, for example, if the SMF 160 may be required to perform secondary authorization and/or authentication at an establishment (e.g., by a DN-AAA server) of a PDU session.

At step 2208, the SMF 160 may send, to the PCF 135, a message (e.g., Npcf_SMPolicyControl_Get) requesting policy control information. The SMF 160 may invoke an operation (e.g., Npcf_SMPolicyControl_Get) to establish a PDU session with the PCF 135 and/or to obtain policy, charging, and/or PCC rules for the PDU session. The message requesting policy control information may comprise one or more of: information received from the AMF 155 (e.g., at step 2205), and/or Ethernet packet filter set(s) information per the PDU session (e.g., indicated by a PDU session ID), per wireless device (e.g., which may be indicated by one or more wireless identities and/or identifiers), per data network (e.g., which may be an APN indicated by a DNN), and/or per network slice (e.g., which may be indicated by an S-NSSAI).

At step 2209, the PCF 135 may send, to the SMF 160, a message (e.g., Nsmf_EventExposure_Subscribe). The PCF 135 may perform one or more steps, for example, after or in response to receiving the message from the SMF 160 (e.g., at step 2208). The PCF 135 may determine one or more policy decisions. The one or more policy decisions may be based on information received from the SMF 160 (e.g., Ethernet packet filter set(s) information), subscription information, and/or other information. The PCF 135 may create a service data flow template for one or more policy rules, for example, based on Ethernet packet filter set(s) information received from the SMF 160 (e.g., at step 2206). The PCF 135 may send to the SMF 160 a message (e.g., policy response) comprising one or more of: a QoS policy for the PDU session; a charging policy for the PDU session; traffic steering control for steering traffic; and/or other policies. The PCF 135 may send, to the SMF 160, the Ethernet packet filter set(s) information with one or more policies. The PCF 135 may subscribe one or more event in the SMF 160, for example, by invoking the Nsmf_EventExposure_Subscribe operation.

At step 2210, the PCF 135 may send, to the SMF 160, a message (e.g., Nsmf_EventExposure_Notify) reporting one or more events. The SMF 160 may invoke the Nsmf_EventExposure_Notify service operation, for example, to report one or more events to the PCF 135 that has been previously subscribed.

At step 2211, the SMF 160 may send, to the PCF 135, a message (e.g., Npcf_SMPolicyControl_UpdateNotify) providing information. The information may comprise policy information, charging information, and/or PCC information. The PCF 135 may provide one or more updated policies to the SMF 160 by invoking the Npcf_SMPolicyControl_UpdateNotify service operation. The PCF 135 may provide authorized session-AMBR and/or authorized 5QI and/or ARP to the SMF 160.

At step 2212, the SMF 160 may send, to the UPF 110, a message (e.g., N4 session establish and/or modification request) requesting session establishment and/or modification. The SMF 160 may initiate an N4 session establishment procedure with the selected UPF 110, for example, if a request type indicates an initial request and/or if a PDU session establishment authentication and/or authorization was not previously performed. The SMF 160 may initiate an N4 session modification procedure with the selected UPF 110, for example, if a request type does not indicate an initial request and/or if a PDU session establishment authentication and/or authorization was previously performed. The SMF 160 may send an N4 session establishment and/or modification request to the UPF 110. The SMF 160 may provide packet detection, enforcement, and/or reporting rules that may be installed on the UPF 110 for the PDU Session. The SMF 160 may provide the Ethernet packet filter set(s) information with or in one or more message for the packet detection, enforcement, and/or reporting rules. The CN tunnel information may be provided to the UPF 110 in this step, for example, if CN tunnel information is allocated by the SMF 160.

At step 2213, the UPF 110 may send, to the SMF 160, a message (e.g., N4 session establish/modification response) responding to a session establish and/or modification request (e.g., at step 2212). The UPF 110 may acknowledge the SMF 160 by sending an N4 session establishment and/or modification response. The CN tunnel information may be provided to the SMF 160 in this step, for example, if CN tunnel information is allocated by the UPF 110. The UPF 110 may perform service flow detection and/or policy enforcement using Ethernet packet filter set(s) information, for example, after or upon receiving a user plane data packet. The message responding to the session establish and/or modification request may comprise Ethernet packet filter set(s) information.

At step 2214, the SMF 160 may send, to the AMF 155, a message (e.g., Nsmf_PDUSession_CreateSM response) for a session. The message at step 2214 may respond to the message at step 2206. The message for the session may comprise one or more of: cause information, N2 SM information (e.g., PDU session ID, QoS profile(s), CN tunnel information, S-NSSAI, and/or session-AMBR), and/or an N1 SM container (e.g., a PDU session establishment accept. The PDU session establishment accept may comprise one or more of: a QoS rule, an SSC mode, an S-NSSAI, allocated address (e.g., for IPV4), and/or session-AMBR. The N2 SM information may comprise information that the AMF 155 may forward to the (R)AN 105, which may comprise CN tunnel information corresponding to a Core Network address of the N3 tunnel corresponding to the PDU session. The QoS profile may provide the (R)AN 105 with the mapping between QoS parameters and QoS flow identifiers. Multiple QoS profiles may be provided to the (R)AN 105. The PDU session ID may be used by AN signaling (e.g., with the wireless device 100) to indicate to the wireless device 100 an association between an AN resource and a PDU session for the wireless device 100.

At step 2215, the AMF 155 may send, to the (R)AN 105, a message (e.g., N2 PDU session request) requesting a session. (N2 SM information, NAS message (PDU Session ID, N1 SM container (PDU session establishment accept))). The AMF 155 may send the NAS message containing PDU Session ID and PDU session establishment accept targeted to the wireless device 100 and the N2 SM information received from the SMF 160 within the N2 PDU session request to the (R)AN 105.

At step 2216, the (R)AN 105 and/or the wireless device 100 may send one or more messages to the other for an AN resource setup. The (R)AN 105 may issue an AN specific signaling exchange with the wireless device 100. The AN specific signaling exchange may be related to information received from SMF 160 (e.g., at steps 2214 and/or 2215). For example, a connection reconfiguration (e.g., an RRC connection reconfiguration for a 3GPP RAN) may be performed. The wireless device 100 may establish the necessary RAN resources related to QoS rules for the PDU session request. The (R)AN 105 may allocate (R)AN N3 tunnel information for the PDU session. The (R)AN 105 may forward a NAS message and/or one or more of a: PDU session ID and/or an N1 SM container (e.g., PDU session establishment accept). The (R)AN 105 may provide the NAS message to the wireless device 100, for example, if the necessary RAN resources have been established and/or if the allocation of (R)AN tunnel information has been successful.

At step 2217, the (R)AN 105 may send, to the AMF 155, a message (e.g., N2 PDU session response) responding to a session request (e.g., at step 2215). The message responding to the session request may comprise one or more of: a PDU session ID, cause information, and/or N2 SM information. The N2 SM information may comprise one or more of: a PDU session ID, (R)AN tunnel information, and/or a list of accepted and/or rejected QoS profiles. The (R)AN tunnel information may correspond to the access network address of an N3 tunnel corresponding to the PDU session.

At step 2218, the AMF 155 may send, to the SMF 160, a message (e.g., Nsmf_PDUSession_UpdateSMContext Request) requesting information. The message requesting information may comprise N2 SM information. The AMF 155 may forward N2 SM information received from the (R)AN 105 (e.g., at step 2217) to the SMF 160.

At step 2219, the SMF 160 may send, to the UPF 110, a message (e.g., N4 session modification request) requesting a session modification. The SMF 160 may perform one or more actions, for example, after or in response to receiving the message at step 2218. The SMF 160 may initiate an N4 session establishment procedure with the UPF 110, for example, if the N4 session for the PDU session was not previously established. The SMF 160 may initiate an N4 session modification procedure with the UPF 110, for example, if the N4 session for this PDU session was previously established. The SMF 160 may provide AN tunnel information and CN tunnel information. The CN tunnel information may be required to be provided, for example, if the SMF 160 selected CN tunnel information. The message requesting a session modification may comprise one or more policies for the PDU session. The Ethernet packet filter set(s) information may be included in or with the one or more policies.

At step 2220, the UPF 110 may send, to the SMF 160, a message (e.g., N4 session modification response) responding to a session modification request (e.g., received at step 2219). The UPF 110 may provide an N4 session establishment and/or modification response to the SMF 160. The UPF may perform the service flow detection and policy enforcement using Ethernet packet filter set (s) information, for example, after or upon receiving a user plane data packet.

At step 2221, the SMF 160 may send, to the AMF 155, a message (e.g., Nsmf_PDUSession_UpdateSMContext response) responding to a request for information (e.g., received at step 2218). The message at step 2221 may comprise cause information. After step 2221, the AMF 155 may forward one or more relevant events to the SMF 160, for example, at handover, if the (R)AN tunnel information changes, and/or if the AMF 155 is relocated.

Figure 23:
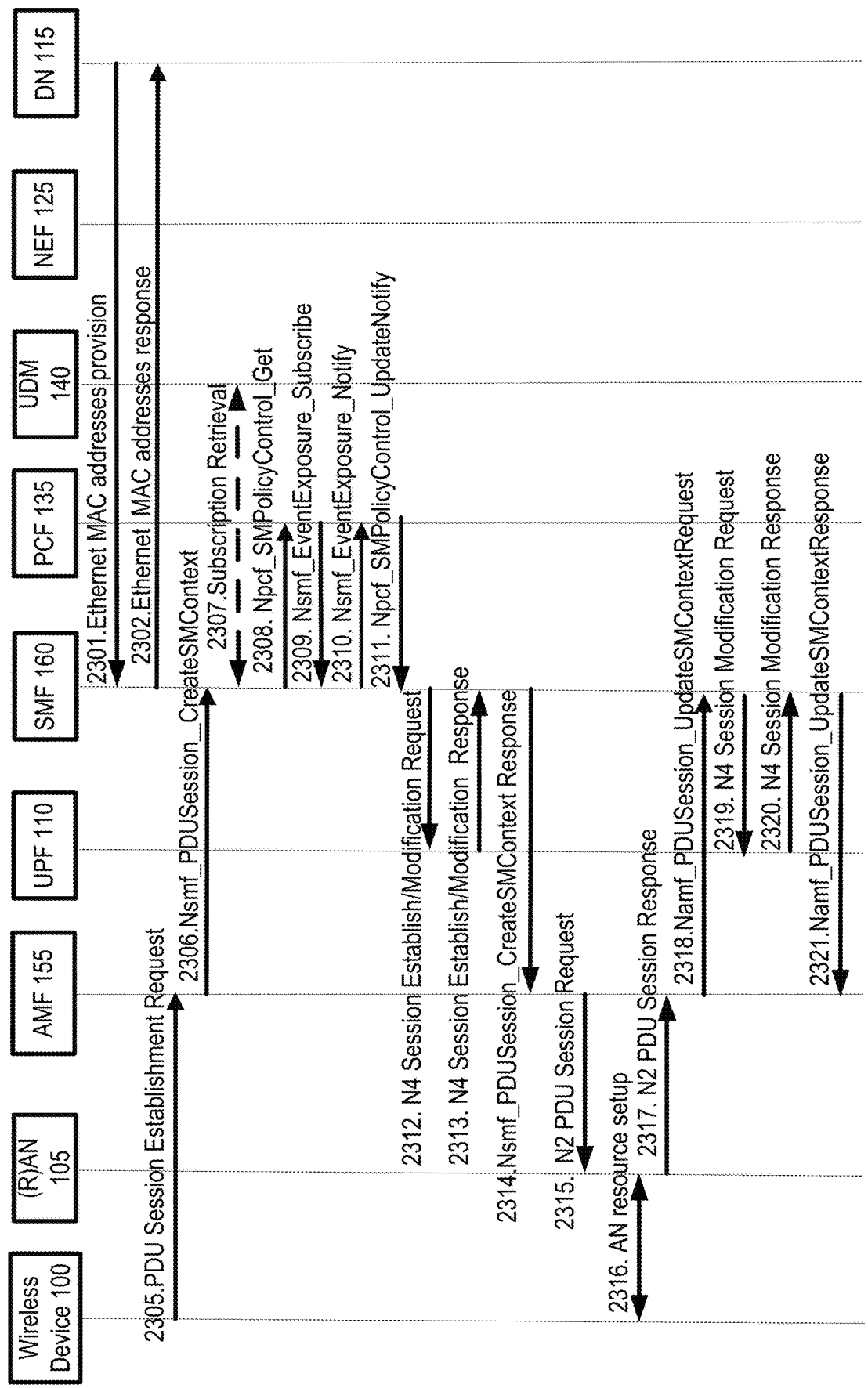
FIG. 23 shows an example of procedures involving a session management function.

FIG. 23 shows an example of procedures involving a session management function (SMF) in which a data network (DN) may send, to an SMF, one or more Ethernet packet filter set(s) information, wireless device identities and/or identifiers, and/or addresses (e.g., source MAC addresses and/or destination MAC addresses).

At step 2301, the DN 115 may perform one or more of the following steps. The DN 115 may select an SMF (e.g., the SMF 160). The DN 115 may select an SMF using an NRF, for example, by providing one or more of the following information to the NRF: wireless device identity and/or identifier (e.g., NAI, SUPI, 5G-GUTI); data network name (DNN) and/or an APN; PDU session ID; and/or S-NSSAI (e.g., which may indicate a network slice). The DN 115 may send, to the SMF 160, a first message (e.g., Ethernet MAC addresses provision). The first message may comprise one or more Ethernet MAC addresses. Additionally or alternatively, the first message may comprise one or more of: wireless device identities and/or identifiers (e.g., wireless device NAI, SUPI, 5G-GUTI, and/or other identifiers); data network name (DNN) and/or an APN; PDU session ID(s); S-NSSAI (e.g., indicating a network slice); and/or Ethernet packet filter sets per wireless device (e.g., which may be indicated by one or more wireless device identities), per data network (e.g., which may be an APN indicated by a DNN), per network slice (e.g., which may be indicated by an S-NSSAI); and/or per PDU session (e.g., which may be indicated by a PDU session ID). An Ethernet packet filter set may comprise one or more of: a source MAC address and/or a destination MAC address; an Ethertype (e.g., as set forth in IEEE 802.3); Customer-VLAN tag (C-TAG) and/or Service-VLAN tag (S-TAG) VID fields (e.g., as set forth in IEEE 802.1Q); C-TAG and/or S-TAG PCP and/or DEI fields (e.g., as indicated in IEEE 802.1Q); and IP packet filter set (e.g., if Ethertype indicates an IPV4 payload and/or an IPv6 payload). An IP packet filter set may comprise one or more of: a source IP address, a destination IP address, and/or a prefix (e.g., for IPV6); a source port number and/or a destination port number; a protocol ID of the protocol above IP and/or a next header type; a type of service (e.g., for IPV4), a traffic class (e.g., for IPV6), and/or a mask; a flow label (e.g., for IPV6); and/or security parameter index.

At step 2302, the SMF 160 may send, to the DN 115, a second message (e.g., Ethernet MAC addresses response). The SMF 160 may send to the DN 115 the second message (e.g. Ethernet MAC addresses response), for example, after or in response to receiving the first message from the DN 115 (e.g., at step 2301).

Steps 2301-2302 may occur at any time, including at a time that may or may not be associated with steps 2305-2321. For example, steps 2301-2302 may occur periodically, as part of a procedure to initiate communications with the DN 115 and/or any device, as part of a procedure to configure one or more devices for communications in a network, as part of a procedure to provide network updates, and/or as part of any other procedure.

At step 2305, a wireless device 100 may send, to the AMF 155, a message (e.g., PDU session establishment request) requesting establishment of a session. The session may comprise an Ethernet type PDU session (e.g., Ethernet over wireless communications). The wireless device 100 may initiate a PDU session establishment procedure, for example, by sending to an AMF 155 an NAS Message. The NAS message may comprise one or more of: an S-NSSAI, a DNN, a PDU session ID, a request type, and/or an N1 SM container. The N1 SM container may comprise a PDU session establishment request. The NAS Message and/or an N1 SM container may comprise one or more wireless device identities and/or identifiers (e.g., SUPI, 5G-GUTI, and/or others). The wireless device 100 may initiate the wireless device requested PDU session establishment procedure, for example, by the transmission of a NAS message containing a PDU session establishment request within an N1 SM container. The PDU session establishment request may comprise one or more of: a PDU type (e.g., Ethernet), an SSC mode, protocol configuration options, and/or a PDU session ID that may be generated by the wireless device 100.

At step 2306, the AMF 155 may send, to the SMF 160, a message (e.g., Namf_PDUSession_CreateSMContext) for a session. The AMF 155 may perform one or more steps, for example, after or in response to receiving the message at step 2305. The AMF 155 may select an SMF (e.g., the SMF 160). The AMF 155 may select an SMF using an NRF, for example, by providing one or more of the following information, that may be received from the wireless device 100, to the NRF: wireless device identity and/or identifier; data network name (DNN); PDU session ID; and/or S-NSSAI. The NRF may select an SMF based on information that the NRF receives from the AMF 155, which may comprise the same information that the AMF 155 received from the wireless device 100 (e.g., at step 2306). The NRF may select an SMF based on the same NRF selection procedure in step 2301. The NRF may select an SMF based on a comparison of information the NRF received from the AMF 155 (e.g., at step 2306) with information the NRF received from the DN 115 (e.g., at step 2301). The AMF 155 may send, to the SMF 160, a message (e.g., Namf_PDUSession_CreateSMRequest) comprising one or more of: a SUPI, a DNN, a S-NSSAI, a PDU session ID, an AMF ID, a request type, an N1 SM container, a user location information, an access type, and/or a PEI. The N1 SM container may comprise a PDU session establishment request.

At step 2307, the SMF 160 and/or the UDM 140 may send one or more messages to the other, for example, for a subscription retrieval. The SMF 160 may correlate, compare, and/or map information received from the AMF 155 (e.g., at step 2306) with the information received from the DN 115 (e.g., at step 2301), for example, after or in response to receiving the message from the AMF 155. The SMF 160 may correlate and/or compare addresses and/or Ethernet packet filter set(s) that may have been received from the DN 115, with one or more of the following information that may have been received from the AMF 155: wireless device identities and/or identifiers; data network name (DNN); PDU session ID; and/or S-NSSAI. The SMF 160 may register with the UDM 140, for example, if the SMF 160 has not yet registered and/or if subscription data is not available. The SMF 160 may retrieve subscription data. The SMF 160 may subscribe to be notified, for example, if subscription data is modified. The SMF 160 may select a UPF and/or trigger a PDU session establishment authentication and/or authorization, for example, if the SMF 160 may be required to perform secondary authorization and/or authentication at an establishment (e.g., by a DN-AAA server) of a PDU session.

Steps 2308-2321 correspond to steps 2208-2221, respectively, as described above.

Figure 24:
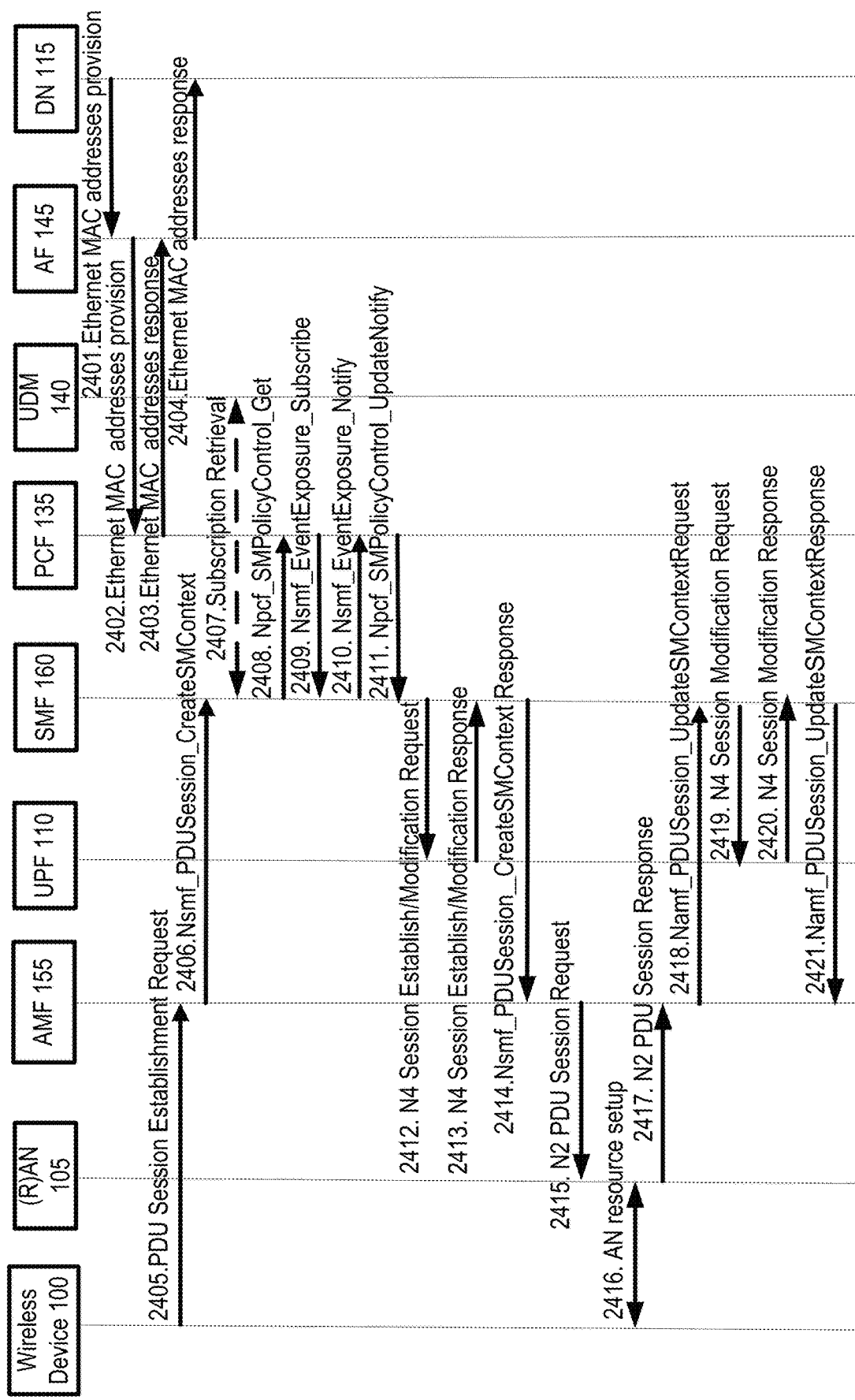
FIG. 24 shows an example of procedures involving an application function.

FIG. 24 shows an example of procedures involving an application function (AF) in which a data network (DN) may send, to an AF, one or more Ethernet packet filter set(s) information, wireless device identities and/or identifiers, and/or addresses (e.g., source MAC addresses and/or destination MAC addresses).

At step 2401, the DN 115 may send to, the AF 145, a first message (e.g., Ethernet MAC addresses provision). The first message may comprise one or more Ethernet MAC addresses. Additionally or alternatively, the first message may comprise one or more of: wireless device identities and/or identifiers (e.g., wireless device NAI, SUPI, 5G-GUTI, and/or other identifiers); data network name (DNN) and/or an APN; PDU session ID(s); S-NSSAI (e.g., indicating a network slice); and/or Ethernet packet filter sets per wireless device (e.g., which may be indicated by one or more wireless device identities), per data network (e.g., which may be an APN indicated by a DNN), per network slice (e.g., which may be indicated by an S-NSSAI); and/or per PDU session (e.g., which may be indicated by a PDU session ID). An Ethernet packet filter set may comprise one or more of: a source MAC address and/or a destination MAC address; an Ethertype (e.g., as set forth in IEEE 802.3); Customer-VLAN tag (C-TAG) and/or Service-VLAN tag (S-TAG) VID fields (e.g., as set forth in IEEE 802.1Q); C-TAG and/or S-TAG PCP and/or DEI fields (e.g., as indicated in IEEE 802.1Q); and IP packet filter set (e.g., if Ethertype indicates an IPV4 payload and/or an IPV6 payload). An IP packet filter set may comprise one or more of: a source IP address, a destination IP address, and/or a prefix (e.g., for IPV6); a source port number and/or a destination port number; a protocol ID of the protocol above IP and/or a next header type; a type of service (e.g., for IPv4), a traffic class (e.g., for IPV6), and/or a mask; a flow label (e.g., for IPV6); and/or security parameter index.

At step 2402, the AF 145 may perform one or more steps, for example, after or in response to receiving the first message from the DN 115. The AF 145 may select a PCF (e.g., the PCF 135). The AF 145 may select a PCF by using an NRF, for example, by providing one or more of the following information, that may be received from the DN 115, to the NRF: wireless device identity and/or identifier; data network name (DNN); PDU session ID; and/or S-NSSAI. The AF 145 may send, to a selected PCF (e.g., the PCF 135), a second message (e.g., Ethernet MAC addresses provision). The second message may comprise some or all of the information in the first message received from the DN 115 at step 2401.

At step 2403, the PCF 135 may send, to the AF 145, a third message (e.g., Ethernet MAC addresses response). The PCF 135 may store information received from the second message (e.g., MAC addresses and/or Ethernet packet filter set(s) information) and/or send to the AF 145 the third message (e.g., Ethernet MAC addresses response), after or in response to receiving the second message from the PCF 135 at step 2402.

At step 2404, the AF 145 may send, to the DN 115, a fourth message (e.g., Ethernet MAC addresses response). The AF 145 may send to the DN 115 the fourth message (e.g., Ethernet MAC addresses response), for example, after or in response to receiving the third message from the PCF 135 at step 2403. The fourth message may comprise some or all of the information in the third message received from the PCF 135 at step 2403.

Steps 2401-2404 may occur at any time, including at a time that may or may not be associated with steps 2405-2421. For example, steps 2401-2404 may occur periodically, as part of a procedure to initiate communications with the DN 115 and/or any device, as part of a procedure to configure one or more devices for communications in a network, as part of a procedure to provide network updates, and/or as part of any other procedure.

At step 2405, the wireless device 100 may send, to the AMF 155, a message (e.g., PDU session establishment request) requesting establishment of a session. The session may comprise an Ethernet type PDU session (e.g., Ethernet over wireless communications). The wireless device may initiate a PDU session establishment procedure, for example, by sending to an AMF 155 an NAS Message. The NAS message may comprise one or more of: an S-NSSAI, a DNN, a PDU session ID, a request type, and/or an N1 SM container.

The N1 SM container may comprise a PDU session establishment request. The NAS Message and/or an N1 SM container may comprise one or more wireless device identities and/or identifiers (e.g., SUPI, 5G-GUTI, and/or others). The wireless device 100 may initiate the wireless device requested PDU session establishment procedure, for example, by the transmission of a NAS message containing a PDU session establishment request within an N1 SM container. The PDU session establishment request may comprise one or more of: a PDU type (e.g., Ethernet), an SSC mode, protocol configuration options, and/or a PDU session ID that may be generated by the wireless device 100.

At step 2406, the AMF 155 may send, to the SMF 160, a message (e.g., Nsmf_PDUSession_CreateSMContext) for a session. The AMF 155 may perform one or more steps, for example, after or in response to receiving the message at step 2405. The AMF 155 may select an SMF (e.g., the SMF 160). The AMF 155 may select an SMF such as described above regarding step 2405. The AMF 155 may send, to the SMF 160, a message (e.g., Nsmf_PDUSession_CreateSMRequest) comprising one or more of: a SUPI, a DNN, a S-NSSAI, a PDU session ID, AMF ID, a request type, an N1 SM container, user and/or device location information, an access type, and/or a PEI. The N1 SM container may comprise a PDU session establishment request.

At step 2407, the SMF 160 and/or the UDM 140 may send one or more messages to the other, for example, for a subscription retrieval. The SMF 160 may register with the UDM 140, for example, if the SMF 160 has not previously registered and/or if subscription data is not available. The SMF 160 may retrieve subscription data and subscribes to be notified, for example, if subscription data is modified. The SMF 160 may select a UPF and/or trigger a PDU session establishment authentication and/or authorization, for example, if the SMF 160 may be required to perform secondary authorization and/or authentication at an establishment (e.g., by a by a DN-AAA server) of a PDU session. The SMF 160 may perform some or all of step 2307 described above.

At step 2408, the SMF 160 may send, to the PCF 135, a message (e.g., Npcf_SMPolicyControl_Get) requesting policy control information. The SMF 160 may perform one or more of the following steps, for example, after or in response to step 2407. The SMF 160 may select a PCF (e.g., the PCF 136). The SMF 160 may select a PCF using an NRF, for example, by providing one or more of the following information, that may be received from the AMF 155, to the NRF: wireless device identity and/or identifier; data network name (DNN); PDU session ID; and/or S-NSSAI. The NRF may select a PCF based on the same NRF selection procedure in step 2402. The NRF may select a PCF based on a comparison of information the NRF received from the SMF 160 (e.g., at step 2406) with information the NRF received from the AF 145 in (e.g., at step 2402). The NRF may select the same PCF 135 as at step 2402. The SMF 160 may invoke the Npcf_SMPolicyControl_Get operation to establish a PDU session with the PCF 135 and/or obtain policy, charging, and/or PCC rules for the PDU session. The message requesting policy control information may comprise information received from the AMF 155 (e.g., wireless device identities and/or identifiers, DNN, PDU session ID, and/or S-NSSAI).

At step 2409, the PCF 135 may send, to the SMF 160, a message (e.g., Nsmf_EventExposure_Subscribe). The PCF 135 may perform one or more steps, for example, after or in response to receiving the message from the SMF 160 (e.g., at step 2408). The PCF 135 may correlate, compare, and/or map information received from the AF 145 (e.g., at step 2402) with the information received from the SMF 160. The PCF 135 may correlate and/or compare addresses and/or Ethernet packet filter set(s) that may have been received from the AF 145, with one or more of the following information received from the SMF 160: wireless device identities and/or identifiers; data network name (DNN); PDU session ID; and/or S-NSSAI. The PCF 135 may determine one or more policy decisions. The one or more policy decisions may be based on information received from the AF 145 (e.g., Ethernet packet filter set(s) information), information received from the SMF 160, and/or other information. The PCF may create a service data flow template for one or more policy rules, for example, based on Ethernet packet filter set(s) information received from the SMF 160 (e.g., at step 2406). The PCF 135 may send to the SMF 160 a message (e.g., policy response) by providing one or more of: a QoS policy for the PDU session; a charging policy for the PDU session; traffic steering control for steering traffic; and/or other policies. The PCF 135 may send, to the SMF 160, the Ethernet packet filter set(s) information with one or more policies. The PCF 135 may subscribe one or more events in the SMF 160, for example, by invoking the Nsmf_EventExposure_Subscribe operation.

Steps 2410-2421 correspond to steps 2210-2221, respectively, as described above.

Figure 25:
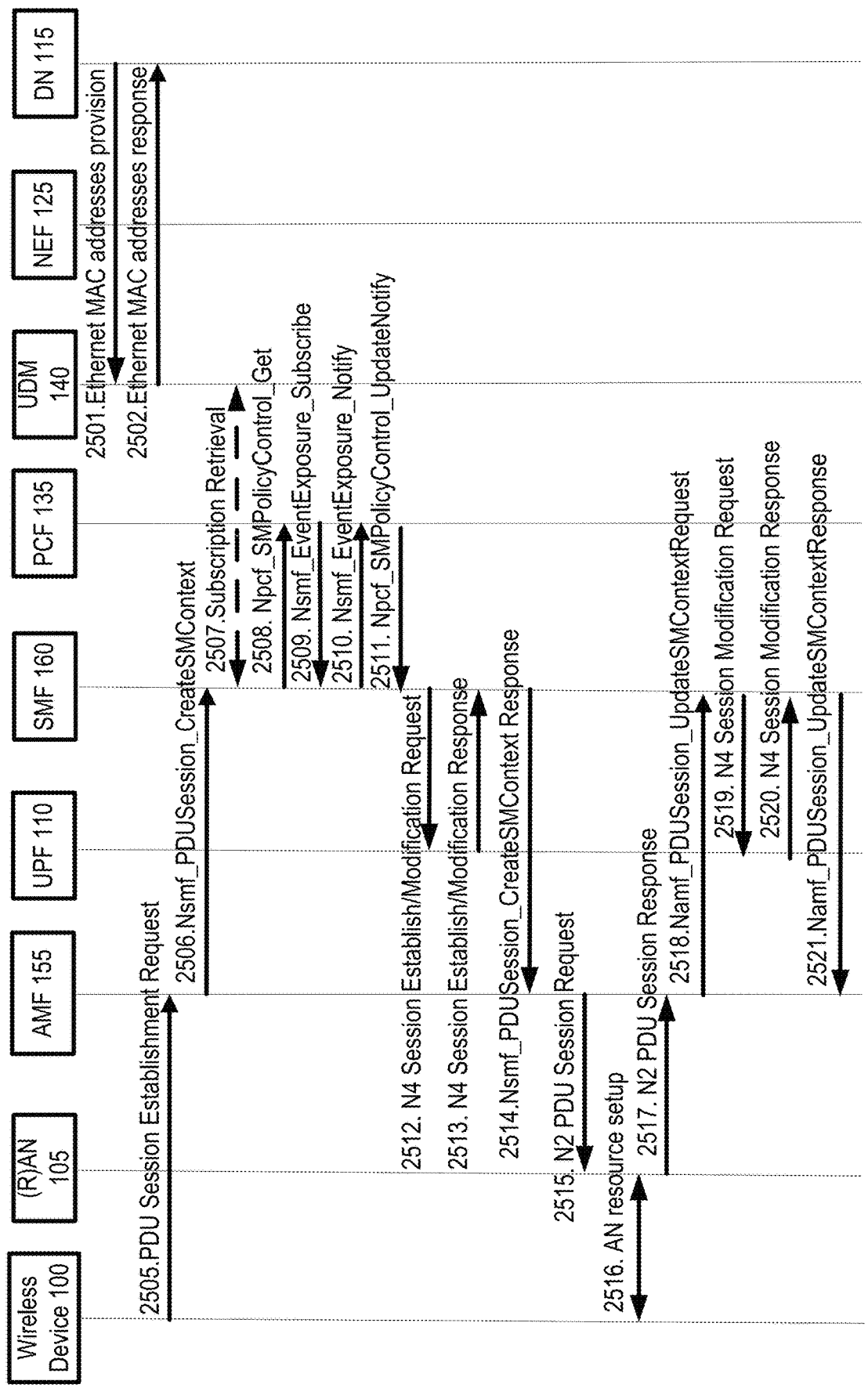
FIG. 25 shows an example of procedures involving a unified data management.

FIG. 25 shows an example of procedures involving a unified data management (UDM) in which a data network (DN) may send, to a UDM, one or more Ethernet packet filter set(s) information, wireless device identities and/or identifiers, and/or addresses (e.g., source MAC addresses and/or destination MAC addresses).

At step 2501, the DN 115 may send, to the UDM 140, a first message (e.g., Ethernet MAC addresses provision). The first message may comprise one or more Ethernet MAC addresses. Additionally or alternatively, the first message may comprise one or more of: wireless device identities and/or identifiers (e.g., wireless device NAI, SUPI, 5G-GUTI, and/or other identifiers); data network name (DNN) and/or an APN; PDU session ID(s); S-NSSAI (e.g., indicating a network slice); and/or Ethernet packet filter sets per wireless device (e.g., which may be indicated by one or more wireless device identities), per data network (e.g., which may be an APN indicated by a DNN), per network slice (e.g., which may be indicated by an S-NSSAI); and/or per PDU session (e.g., which may be indicated by a PDU session ID). An Ethernet packet filter set may comprise one or more of: a source MAC address and/or a destination MAC address; an Ethertype (e.g., as set forth in IEEE 802.3); Customer-VLAN tag (C-TAG) and/or Service-VLAN tag (S-TAG) VID fields (e.g., as set forth in IEEE 802.1Q); C-TAG and/or S-TAG PCP and/or DEI fields (e.g., as indicated in IEEE 802.1Q); and IP packet filter set (e.g., if Ethertype indicates an IPV4 payload and/or an IPV6 payload). An IP packet filter set may comprise one or more of: a source IP address, a destination IP address, and/or a prefix (e.g., for IPV6); a source port number and/or a destination port number; a protocol ID of the protocol above IP and/or a next header type; a type of service (e.g., for IPV4), a traffic class (e.g., for IPV6), and/or a mask; a flow label (e.g., for IPV6); and/or security parameter index.

At step 2502, the UDM 140 may send, to the DN 115, a second message (e.g., Ethernet MAC addresses response). The UDM 140 may store received information (e.g., addresses and/or Ethernet packet filter set(s) information) and/or send to the DN 115 a response message (e.g., Ethernet MAC addresses response), for example, after or in response to receiving the first message from the DN 115.

Steps 2501-2502 may occur at any time, including at a time that may or may not be associated with steps 2505-2521. For example, steps 2501-2502 may occur periodically, as part of a procedure to initiate communications with the DN 115 and/or any device, as part of a procedure to configure one or more devices for communications in a network, as part of a procedure to provide network updates, and/or as part of any other procedure.

At step 2505, the wireless device 100 may send, to the AMF 155, a message (e.g., PDU establishment request) requesting establishment of a session. The session may comprise an Ethernet type PDU session (e.g., Ethernet over wireless communications). The wireless device 100 may initiate a PDU session establishment procedure, for example, by sending to an AMF 155 an NAS Message. The NAS message may comprise one or more of: an S-NSSAI, a DNN, a PDU session ID, a request type, and/or an N1 SM container. The N1 SM container may comprise a PDU session establishment request. The NAS Message and/or an N1 SM container may comprise one or more wireless device identities and/or identifiers (e.g., SUPI, 5G-GUTI, and/or others). The wireless device 100 may initiate the wireless device requested PDU session establishment procedure, for example, by the transmission of a NAS message containing a PDU session establishment request within an N1 SM container. The PDU session establishment request may comprise one or more of: a PDU type (e.g., Ethernet), an SSC mode, protocol configuration options, and/or a PDU session ID that may be generated by the wireless device 100.

At step 2506, the AMF 155 may send, to the SMF 160, a message (e.g., Namf_PDUSession_CreateSMContext) for a session. The AMF 155 may perform one or more steps, for example, after or in response to receiving the message at step 2505. The AMF 155 may select an SMF (e.g., the SMF 160) and send to the SMF 160 a message (e.g., Nsmf_PDUSession_CreateSMRequest) comprising one or more of: a SUPI, a DNN, a S-NSSAI, a PDU session ID, an AMF ID, a request type, an N1 SM container, user location information, an access type, and/or a PEI. The N1 SM container may comprise a PDU session establishment request.

At step 2507, the SMF 160 and/or the UDM 140 may send one or more messages to the other, for example, for a subscription retrieval. The SMF 160 may send, to the UDM 140, a message to obtain subscription data, for example, after or in response to the message received from the AMF 155. The SMF 160 may send, to the UDM 140, at least one message comprising one or more of: wireless device identities and/or identifiers; data network name (DNN); PDU session ID; and/or S-NSSAI. The UDM 140 may correlate, compare, and/or map information received from the DN 115 (e.g., at step 2501) with information received from the SMF 160, after or in response to receiving the message from the SMF 160. The SMF 160 may correlate and/or compare addresses and/or Ethernet packet filter set(s) that may have been received from the DN 115, with one or more of the following information received from the SMF 160: wireless device identities and/or identifiers; data network name (DNN); PDU session ID; and/or S-NSSAI. The UDM 140 may send, to the SMF 160, subscription data with or in a message comprising Ethernet packet filter set(s) received from the DN 115. The SMF 160 may correlate and/or compare information received from the UDM 140 with information received from the AMF 155, for example, after or in response to receiving the information from the UDM 140. For example, the SMF 160 may correlate and/or compare addresses and/or Ethernet packet filter set(s) received from the UDM 140 with one or more of the following information that may be received from the AMF 155: wireless device identities and/or identifiers; data Network Name (DNN); PDU session ID; and/or S-NSSAI.

At step 2508, the SMF 160 may send, to the PCF 135, a message (e.g., Npcf_SMPolicyControl_Get) requesting policy control information. The SMF 160 may invoke the Npcf_SMPolicyControl_Get operation, for example, to establish a PDU session with the PCF 135 and/or obtain policy, charging, and/or PCC rules for the PDU session. The message requesting policy control information may comprise Ethernet packet filter set(s) information per the PDU session (e.g., which may be indicated by a PDU session ID), per wireless device (e.g., which may be indicated by one or more wireless device identities), per data network (e.g., which may be an APN indicated by a DNN), and/or per network slice (e.g., which may be indicated by an S-NSSAI).

Steps 2509-2521 correspond to steps 2209-2221, respectively, as described above.

Figure 26:
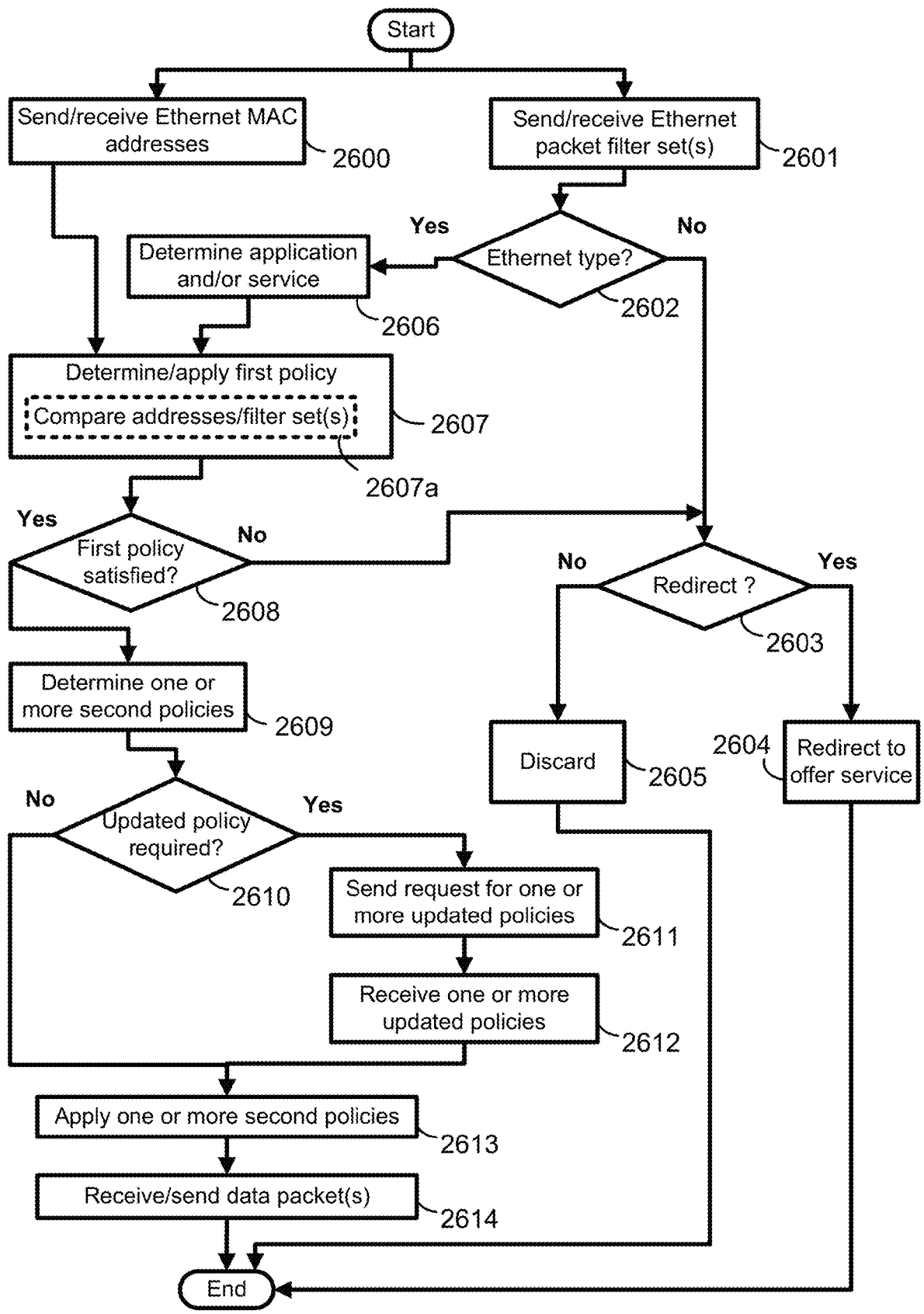
FIG. 26 shows an example of an Ethernet over wireless communications procedure that may be performed by a computing device.

FIG. 26 shows an Ethernet over wireless communications procedure that may be performed, in whole or in part, by one or more computing devices. As examples, the procedure shown in FIG. 26 may be performed by a session management function (e.g., the SMF 160). Additionally or alternatively, at least some of the procedure shown in FIG. 26 may be performed by a policy control function (e.g., PCF 135), a unified data management (e.g., UDM 140), a network exposure function (e.g., NEF 125), an access and mobility management function (e.g., AMF 155), a network repository function (e.g., NRF), an access network (e.g., (R)AN 105), a wireless device (e.g., wireless device 100), and/or a data network (e.g., DN 115). The data network may be remote from a network for the wireless device (e.g., a 5GC). The data network may be in a second network (e.g., that may be controlled by a second network operator) outside of a first network (e.g., that may be controlled by a first operator). The data network may be a DN-AAA server. Any other computing device (e.g., such as shown in FIGS. 22-25) may perform one or more portions of the procedures shown in FIG. 26 for Ethernet over wireless communications.

At step 2600, a data network (e.g., DN 115) may send, to a computing device (e.g., the NEF 125, the AF 145, the UDM 140, the PCF 135, the SMF 160, or any other device such as shown in FIGS. 22-25), one or more Ethernet MAC addresses (e.g., source Ethernet MAC addresses and/or destination Ethernet MAC addresses). The computing device may send the one or more Ethernet MAC addresses to one or more second computing devices (e.g., the UDM 140, the PCF 135, and/or the SMF). The one or more second computing devices may send the one or more Ethernet MAC addresses to a session management function (e.g., the SMF 160). The one or more Ethernet MAC addresses may be included in one or more Ethernet packet filter sets that may be sent at step 2600. Step 2600 may comprise one or more of steps 2201-2204, 2301-2302, 2401-2404, and/or 2501-2502, described above. Step 2600 may occur at any time, including at a time that may or may not be associated with steps 2601-2614, described below. For example, step 2600 may occur periodically, as part of a procedure to initiate communications with the DN 115 and/or any device, as part of a procedure to configure one or more devices for communications in a network, as part of a procedure to provide network updates, and/or as part of any other procedure. Additionally or alternatively, step 2600 may be performed before, during, or after step 2601 and/or step 2602, described below.

At step 2601, a wireless device (e.g., the wireless device 100) may send, to a computing device (e.g., the (R)AN 105, the AMF 155, the UPF 110, the SMF 160, and/or the PCF 135) one or more messages comprising one or more Ethernet packet filter sets. The wireless device may send the one or more messages to a session management function via one or more of a radio access network (e.g., the (R)AN 105), an access and mobility management function (e.g., the AMF 155), and/or a user plane function (e.g., the UPF 110). The Ethernet packet filter sets may comprise one or more of a source Ethernet MAC address, a destination Ethernet MAC address, an Ethertype, a virtual local area network tag, and/or an IP packet filter set. The Ethernet packet filter set may be associated with one or more of: a PDU session, the wireless device, a data network, and/or a network slice. The wireless device may send the one or more messages to an access network (e.g., the (R)AN 105), to one or more base stations, and/or to an access and mobility management function (e.g., the AMF 155). The access network may send the one or more messages to the session management function (e.g., via a user plane function such as the UPF 110) and/or the access and mobility management function. The access and mobility management function may send the one or more messages to the session management function. The session management function may receive the one or more messages. The session management function may receive the one or more Ethernet MAC addresses. Step 2601 may comprise one or more of steps 2205, 2206, 2305, 2306, 2405, 2406, 2505, and/or 2506, described above.

At step 2602, a computing device (e.g., a session management function or any device shown in FIGS. 22-25) may determine whether the one or more Ethernet packet filter sets comprise a request for an Ethernet type PDU session. The computing device may make such a determination based on an Ethertype in the Ethernet packet filter sets. If the computing device determines that at least one of the Ethernet packet filter sets is not associated with a request for an Ethernet type PDU session, the procedure may continue to step 2603. If the computing device determines that at least one of the Ethernet packet filter sets is associated with a request for an Ethernet type PDU session, the procedure may continue to step 2606.

At step 2603, the computing device (e.g., a session management function or any device shown in FIGS. 22-25) may determine whether to redirect the wireless device. For example, if the one or more messages from step 2601 indicate a type of service that is not supported for the wireless device (e.g., based on one or more policies or an availability of one or more applications), the computing device may send a message to the wireless device indicating one or more options for the wireless device to obtain support for the type of service (e.g., updating one or more policies to include a registration of one or more services associated with the type, or identifying another computing device that may provide services for the type). If the computing device determines to redirect the wireless device (e.g., based on an indication from the wireless device requesting redirection), at step 2604, the computing device may redirect the wireless device to an offer for initiating service of the type of service not presently supported for the wireless device. If the computing device determines not to redirect the wireless device (e.g., based on a timer expiration or receiving an indication from the wireless device declining redirection), at step 2605, the computing device may discard the Ethernet packet filter set(s) associated with the type that is not supported for the wireless device. After step 2604 and/or step 2605, the procedure may end.

At step 2606, the computing device (e.g., a session management function or any device shown in FIGS. 22-25) may determine an application and/or service for Ethernet over wireless communications for the wireless device, for example, if a type of a session request associated indicated by the one or more messages is confirmed, at step 2602, to be an Ethernet type. The computing device may determine at least one policy rule (e.g., a QoS rule), one or more parameters for the at least one policy rule (e.g., QoS parameters), and/or a policy decision (e.g., whether QoS is satisfied), based on the one or more Ethernet packet filter sets. The computing device may determine an application and/or type of service based on an Ethernet MAC address (e.g., a destination Ethernet MAC address and/or a source Ethernet MAC address) in the one or more Ethernet packet filter sets received at step 2601 and/or in the one or more Ethernet MAC addresses received at step 2600. The destination Ethernet MAC address may indicate an application server that may be associated with a one or more applications and/or services. The source Ethernet MAC address may indicate a location and/or a profile associated with the wireless device that may indicate one or more applications and/or services.

At step 2607, the computing device (e.g., a session management function or any device shown in FIGS. 22-25) may determine and/or apply a first policy. The first policy may comprise one or more rules. A rule may be a policy rule (e.g., a rule associated with a policy), a charging rule (e.g., a rule associated with a charging policy), or a policy and charging rule (e.g., a policy and charging control rule (PCC)). A policy control function (e.g., PCF 135) may determine the first policy (e.g., a PCC) and/or may send the first policy to the computing device (e.g., SMF 160). The first policy may be determined based on the one or more Ethernet MAC addresses (e.g., one or more source Ethernet MAC addresses and/or one or more destination Ethernet MAC addresses). The first policy may comprise a PCC comprising the one or more Ethernet source MAC addresses and a QoS policy. A policy rule may comprise, for example, one or more of a: quality of service (QOS) rule, a gating rule, a traffic detection rule, a traffic steering control rule, and/or any other rule that may be associated with a user, device, and/or service. A policy may comprise one any one or more rules. For example, a QoS policy may comprise a QoS rule. A QoS rule may be based on one or more priority levels (e.g., high priority, low priority, or any other level of priority). A priority level may be associated with a particular value or range of values for a bandwidth, latency, and/or allowance and retention (ARP). A gating rule may be based on a packet type (e.g., Ethertype) or a service access level (e.g., user and/or device authorization to access one or more services using Ethernet over wireless communications). A traffic detection rule may be based on a determination of whether signal traffic that may be associated with an Ethernet PDU session may be satisfied for a request for the Ethernet PDU session. The traffic detection rule may comprise detecting a service flow based on receiving a user plane data packet. A traffic steering control rule may comprise directing traffic associated with an Ethernet PDU session for optimal network performance. Additionally or alternatively, at optional step 2607a, the computing device may compare, correlate, and/or map the one or more Ethernet MAC addresses with the one or more Ethernet packet filter sets. For example, the computing device may compare one or more source Ethernet MAC addresses with information in an Ethernet packet filter set. A PCC (such as the first policy or one or more second policies) may be based on the comparison. If a source Ethernet MAC address matches an Ethernet MAC address in the Ethernet packet filter set (or does not match an address in a disallowed list in the Ethernet packet filter set), one or more Ethernet packets may be sent to the wireless device. If a source Ethernet MAC address does not match an Ethernet MAC address in the Ethernet packet filter set (or matches an address in a disallowed list in the Ethernet packet filter set), one or more Ethernet packets may not be sent to the wireless device and/or may be discarded. Step 2607a may be performed as part of applying the first policy at step 2607 and/or as a separate step (e.g., before, during, or after step 2607). Step 2607 and/or step 2607a may correspond to one or more of steps 2206, 2207, 2306, 2307, 2406-2409, and/or 2506-2509.

At step 2608, the computing device (e.g., a session management function or any device shown in FIGS. 22-25) may determine whether the first policy is satisfied. For example, based on whether the first policy is satisfied (e.g., a gating rule), the computing device may allow or discard packets. If the first policy is not satisfied, the procedure may continue to step 2603 described above (e.g., for packet discard and/or redirection to offering a service). If the first policy is satisfied, the procedure may continue to step 2609.

At step 2609, the computing device (e.g., a session management function or any device shown in FIGS. 22-25) may determine one or more second policies to apply to the Ethernet packet filter set(s). The one or more second policies may comprise one or more rules, such as a policy rule, a charging rule, and/or a PCC. The one or more second policies may comprise for example, one or more of a: quality of service (QOS) rule, a gating rule, a traffic detection rule, a traffic steering control rule, and/or any other rule that may be associated with a user, device, and/or service, such as described above regarding step 2607. The one or more second policies may comprise at least one charging rule (e.g., a PCC). A charging rule may be based on charging (e.g., online charging, offline charging, and/or converged charging) associated with a particular service, application, user, device, and/or group of users and/or devices. Charging information may be based on one or more ratings (e.g., cost-per-service associated with one or more users and/or devices) and/or addresses (e.g., source Ethernet MAC address of the wireless device and/or destination Ethernet MAC address of an application server associated with the service requested by the wireless device). The computing device may store and/or maintain at least some information about one or more charging rules that may be associated with a wireless device. Additionally or alternatively, the computing device may obtain one or more charging rules and/or updates to one or more charging rules from a second computing device (e.g., a policy control function such as the PCF 135).

At step 2610, the computing device (e.g., a session management function or any device shown in FIGS. 22-25) may determine whether the one or more second policies requires an updated policy. If at least one of the one or more second policies require an update (e.g., based on the computing device not having at least one of the one or more second policies and/or not having a recent version of at least one of the one or more second policies), the procedure may continue to step 2611. If at least one of the one or more second policies do not require an update, the procedure may continue to step 2613.

At step 2611, the computing device (e.g., a session management function or any device shown in FIGS. 22-25) may send a request for one or more updated policies. The computing device may send the request to a second computing device (e.g., a policy control function). The request for one or more updated policies may comprise a request for a policy and charging control rule and/or the one or more Ethernet packet filter sets for a data flow. The computing device (e.g., a session management function) may send a message to a third computing device (e.g., a user plane function such as UPF 110) comprising the one or more Ethernet packet filter sets for the data flow and/or one or more parameters indicating a policy rule. The message to the third computing device (e.g., a user plane function) may comprise a request to establish a user plane session.

At step 2612, the computing device (e.g., a session management function or any device shown in FIGS. 22-25) may receive, from the second computing device (e.g., a policy control function), a response message comprising one or more updated policies. The one or more updated policies may comprise at least one charging policy (e.g., a PCC) corresponding to the requested policy and charging control rule. The computing device (e.g., a session management function) may send the one or more updated policies to the third computing device (e.g., a user plane function). The computing device (e.g., a session management function) may receive from the third computing device (e.g., a user plane function) a message indicating that the third computing device has received the message from the computing device. The message from the third computing device (e.g., a user plane function) may comprise a user plane data packet. The third computing device (e.g., a user plane function) may enforce the policy rule and/or the policy and charging control rule sent at step 2611, for example, based on quality of service parameters associated with information in the one or more Ethernet packet filter sets.

At step 2613, a computing device (e.g., a user plane function, a session management function, and/or any device shown in FIGS. 22-25) may apply the one or more second policies to the Ethernet packet filter set(s). For example, the computing device may provide for an Ethernet PDU session requested by the wireless device to the extent the request complies with the policy rules of the one or more second policies, and/or the computing device may associate charging information with the Ethernet PDU session requested by the wireless device.

At step 2614, the computing device (e.g., a user plane function, an access network, a session management function, and/or or any device shown in FIGS. 22-25) may send and/or receive data packets associated with the Ethernet PDU session requested by the wireless device. The wireless device may receive the data packets associated with the Ethernet PDU session requested by the wireless device. After step 2614, the Ethernet PDU session requested by the wireless device may end and the procedure shown in FIG. 26 may end.

One or more features of the disclosure may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features of the disclosure, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a UE, a base station, and the like) to enable operation of multi-carrier communications described herein. The device, or one or more devices such as in a system, may include one or more processors, memory, interfaces, and/or the like. Other examples may comprise communication networks comprising devices such as base stations, wireless devices or user equipment (UE), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, e.g., any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
receiving, by a session management function from a wireless device, a first message for establishment of a packet data unit (PDU) session, wherein the first message comprises at least one Ethernet medium access control (MAC) address for the wireless device;
receiving, by the session management function from a policy control function, a second message comprising a policy and charging control (PCC) rule, wherein the PCC rule is based on the at least one Ethernet MAC address; and
sending, by the session management function to a user plane function, a third message comprising Ethernet packet filter set information, wherein the Ethernet packet filter set information comprises the at least one Ethernet MAC address.

2. The method of claim 1, wherein the receiving the first message comprises receiving the first message via an access and mobility management function.

3. The method of claim 1, wherein the PCC rule comprises at least one of:
a quality of service policy;
a charging policy;
a traffic steering control policy; or
a traffic detection rule.

4. The method of claim 1, further comprising:
detecting, based on receiving a user plane data packet, a service flow.

5. The method of claim 1, wherein the first message further comprises at least one of:
an Ethertype;
a virtual local area network tag; or
an Internet Protocol packet filter set.

6. The method of claim 1, wherein the first message further comprises information for Ethernet packet detection, and wherein the information for Ethernet packet detection is associated with at least one of:
the PDU session;
a data network; or
a network slice.

7. The method of claim 1, wherein the first message comprises the Ethernet packet filter set information, and wherein the Ethernet packet filter set information comprises the at least one Ethernet MAC address.

8. The method of claim 1, further comprising sending, by the session management function to the policy control function, a request for the PCC rule, wherein the request comprises the at least one Ethernet MAC address.

9. The method of claim 1, wherein the third message further comprises information for Ethernet packet detection.

10. The method of claim 1, further comprising receiving, by the session management function, a fourth message indicating the establishment of the PDU session.

11. A session management function comprising:
one or more processors; and
memory storing instructions that, when executed by the one or more processors, cause the session management function to:
receive, from a wireless device, a first message for establishment of a packet data unit (PDU) session, wherein the first message comprises at least one Ethernet medium access control (MAC) address for the wireless device;
receive, from a policy control function, a second message comprising a policy and charging control (PCC) rule, wherein the PCC rule is based on the at least one Ethernet MAC address; and
send, to a user plane function, a third message comprising Ethernet packet filter set information, wherein the Ethernet packet filter set information comprises the at least one Ethernet MAC address.

12. The session management function of claim 11, wherein the instructions, when executed by the one or more processors, cause the session management function to receive the first message via an access and mobility management function.

13. The session management function of claim 11, wherein the PCC rule comprises at least one of:
- a quality of service policy;
- a charging policy;
- a traffic steering control policy; or
- a traffic detection rule.

14. The session management function of claim 11, wherein the instructions, when executed by the one or more processors, further cause the session management function to detect, based on receiving a user plane data packet, a service flow.

15. The session management function of claim 11, wherein the first message further comprises at least one of:
- an Ethertype;
- a virtual local area network tag; or
- an Internet Protocol packet filter set.

16. The session management function of claim 11, wherein the first message further comprises information for Ethernet packet detection, and wherein the information for Ethernet packet detection is associated with at least one of:
- the PDU session;
- a data network; or
- a network slice.

17. The session management function of claim 11, wherein the first message comprises the Ethernet packet filter set information, and wherein the Ethernet packet filter set information comprises the at least one Ethernet MAC address.

18. The session management function of claim 11, wherein the instructions, when executed by the one or more processors, further cause the session management function to send, to the policy control function, a request for the PCC rule, wherein the request comprises the at least one Ethernet MAC address.

19. The session management function of claim 11, wherein the third message further comprises information for Ethernet packet detection.

20. The session management function of claim 11, wherein the instructions, when executed by the one or more processors, further cause the session management function to receive a fourth message indicating establishment of the PDU session.

21. A system comprising:
a wireless device configured to:
  send a first message for establishment of a packet data unit (PDU) session, wherein the first message comprises at least one Ethernet medium access control (MAC) address for the wireless device; and
a session management function configured to:
  receive, from a policy control function, a second message comprising a policy and charging control (PCC) rule, wherein the PCC rule is based on the at least one Ethernet MAC address; and
  send, to a user plane function, a third message comprising Ethernet packet filter set information, wherein the Ethernet packet filter set information comprises the at least one Ethernet MAC address.

22. The system of claim 21, wherein the session management function is configured to receive the first message via an access and mobility management function.

23. The system of claim 21, wherein the PCC rule comprises at least one of:
- a quality of service policy;
- a charging policy;
- a traffic steering control policy; or
- a traffic detection rule.

24. The system of claim 21, wherein the session management function is further configured to detect, based on receiving a user plane data packet, a service flow.

25. The system of claim 21, wherein the first message further comprises at least one of:
- an Ethertype;
- a virtual local area network tag; or
- an Internet Protocol packet filter set.

26. The system of claim 21, wherein the first message further comprises information for Ethernet packet detection, and wherein the information for Ethernet packet detection is associated with at least one of:
- the PDU session;
- a data network; or
- a network slice.

27. The system of claim 21, wherein the first message comprises the Ethernet packet filter set information, and wherein the Ethernet packet filter set information comprises the at least one Ethernet MAC address.

28. The system of claim 21, wherein the session management function is further configured to send, to the policy control function, a request for the PCC rule, wherein the request comprises the at least one Ethernet MAC address.

29. The system of claim 21, wherein the third message further comprises information for Ethernet packet detection.

30. The system of claim 21, wherein the session management function is further configured to receive a fourth message indicating establishment of the PDU session.

* * * * *